United States Patent
Schmitz et al.

(10) Patent No.: US 10,961,967 B1
(45) Date of Patent: Mar. 30, 2021

(54) FUEL INJECTOR SYSTEMS, FUEL INJECTORS, FUEL INJECTOR NOZZLES, AND METHODS FOR MAKING FUEL INJECTOR NOZZLES

(71) Applicant: Microfabrica Inc., Van Nuys, CA (US)

(72) Inventors: Gregory P. Schmitz, Los Gatos, CA (US); Ming Ting Wu, San Jose, CA (US); Uri Frodis, Los Angeles, CA (US); Eli Baldwin, Clawson, MI (US); Gabriel Jacobsohn, Rockville, MD (US)

(73) Assignee: Microfabrica Inc., Van Nuys, CA (US)

(*) Notice: Subject to any disclaimer, the term of this patent is extended or adjusted under 35 U.S.C. 154(b) by 0 days.

(21) Appl. No.: 16/551,652

(22) Filed: Aug. 26, 2019

Related U.S. Application Data

(63) Continuation-in-part of application No. 16/218,411, filed on Dec. 12, 2018.
(Continued)

(51) Int. Cl.
*F02M 61/04* (2006.01)
*F02M 61/18* (2006.01)
(Continued)

(52) U.S. Cl.
CPC ............ *F02M 61/186* (2013.01); *C25D 7/00* (2013.01); *F02M 61/04* (2013.01); *F02M 61/14* (2013.01);
(Continued)

(58) Field of Classification Search
CPC ...... F02M 61/186; F02M 61/04; F02M 61/14; F02M 61/165; F02M 61/168;
(Continued)

(56) References Cited

U.S. PATENT DOCUMENTS 3,406,910 A 10/1968 Simmons
3,441,223 A 4/1969 Lapera
(Continued)

FOREIGN PATENT DOCUMENTS

CA 2595061 AA 1/2009
GB 806443 A 12/1958
(Continued)

OTHER PUBLICATIONS

Kyoung-Su Im, Seong-Kyun Cheong, Christopher F. Powell, Ming-Chia D. Lai, and Jin Wang, "Unraveling the Geometry Dependence of In-Nozzle Cavitation in High-Pressure Injectors", Scientific Reports, Jun. 25, 2013, pp. 1-5, volume 3:2067 DOI:10.1038/srep02067.

*Primary Examiner* — Hieu T Vo
(74) *Attorney, Agent, or Firm* — Dennis R. Smalley

(57) ABSTRACT

Embodiments are directed to fuel injectors for internal combustion engines (e.g. engines with reciprocating pistons and with compression-ignition or spark-ignition, Wankel engines, turbines, jets, rockets, and the like) and more particularly to improved nozzle configurations for use as part of such fuel injectors. Other embodiments are directed to enabling fabrication technology that can provide for formation of nozzles with complex configurations and particularly for technologies that form structures via multiple layers of selectively deposited material or in combination with fabrication from a plurality of layers where critical layers are planarized before attaching additional layers thereto or forming additional layers thereon. Other embodiments are directed to methods and apparatus for integrating such nozzles with injector bodies.

20 Claims, 35 Drawing Sheets

Related U.S. Application Data

(60) Provisional application No. 62/597,905, filed on Dec. 12, 2017, provisional application No. 62/667,370, filed on May 4, 2018, provisional application No. 62/722,831, filed on Aug. 24, 2018.

(51) Int. Cl.
*F02M 61/14* (2006.01)
*F02M 61/16* (2006.01)
*C25D 7/00* (2006.01)
*B33Y 80/00* (2015.01)

(52) U.S. Cl.
CPC ........ *F02M 61/165* (2013.01); *F02M 61/168* (2013.01); *F02M 61/184* (2013.01); *F02M 61/1833* (2013.01); *F02M 61/1886* (2013.01); *B33Y 80/00* (2014.12); *F02M 2200/27* (2013.01); *F02M 2200/80* (2013.01); *F02M 2200/9038* (2013.01)

(58) Field of Classification Search
CPC ............ F02M 61/1833; F02M 61/184; F02M 61/1886; F02M 2200/27; F02M 2200/80; F02M 2200/9038; B33Y 80/00; C25D 7/00
See application file for complete search history.

(56) References Cited

U.S. PATENT DOCUMENTS

| | | | |
|---|---|---|---|
| 3,443,760 A | 5/1969 | Simmons | |
| 3,943,904 A * | 3/1976 | Byrne | F02M 27/08 123/470 |
| 5,190,637 A | 3/1993 | Guckel | |
| 5,435,884 A | 7/1995 | Simmons et al. | |
| 6,027,630 A | 2/2000 | Cohen | |
| 6,136,243 A | 10/2000 | Mehregany et al. | |
| 6,311,473 B1 | 11/2001 | Benjamin et al. | |
| 6,321,541 B1 | 11/2001 | Wrubel et al. | |
| 6,427,447 B1 | 8/2002 | Sowa | |
| 6,533,954 B2 | 3/2003 | Mansour et al. | |
| 6,550,696 B2 | 4/2003 | Mansour et al. | |
| 6,711,898 B2 | 3/2004 | Laing et al. | |
| 6,718,770 B2 | 4/2004 | Laing et al. | |
| 6,763,663 B2 | 7/2004 | Mansour et al. | |
| 6,790,377 B1 | 9/2004 | Cohen | |
| 6,854,703 B2 | 2/2005 | Parker et al. | |
| 7,021,562 B2 | 4/2006 | Mansour et al. | |
| 7,028,483 B2 | 4/2006 | Mansour et al. | |
| 7,109,118 B2 | 9/2006 | Cohen et al. | |
| 7,195,989 B2 | 3/2007 | Lockard et al. | |
| 7,198,704 B2 | 4/2007 | Cohen et al. | |
| 7,229,542 B2 | 6/2007 | Bang | |
| 7,235,166 B2 | 6/2007 | Cohen et al. | |
| 7,239,219 B2 | 7/2007 | Brown et al. | |
| 7,252,861 B2 | 8/2007 | Smalley | |
| 7,288,178 B2 | 10/2007 | Cohen et al. | |
| 7,290,394 B2 | 11/2007 | Lehtinen | |
| 7,368,044 B2 | 5/2008 | Cohen et al. | |
| 7,498,714 B2 | 3/2009 | Lockard et al. | |
| 7,501,328 B2 | 3/2009 | Lockard et al. | |
| 7,611,616 B2 | 11/2009 | Cohen et al. | |
| 7,966,819 B2 | 6/2011 | Bishara et al. | |
| 8,001,761 B2 | 8/2011 | Myers, Jr. et al. | |
| 8,020,384 B2 | 9/2011 | Pelletier et al. | |
| 8,197,249 B1 | 6/2012 | Nguyen | |
| 8,312,727 B2 | 11/2012 | Bishara et al. | |
| 8,464,539 B2 | 6/2013 | Pelletier et al. | |
| 8,616,003 B2 | 12/2013 | Hollon et al. | |
| 9,617,991 B2 | 4/2017 | Friedman | |
| 9,810,186 B2 | 11/2017 | Mansour et al. | |
| 10,047,959 B2 * | 8/2018 | Patel | F02C 7/222 |
| 2003/0221968 A1 | 12/2003 | Cohen et al. | |
| 2004/0000489 A1 | 1/2004 | Zhang et al. | |
| 2004/0004001 A1 | 1/2004 | Cohen et al. | |
| 2004/0065550 A1 | 4/2004 | Zhang | |
| 2004/0065555 A1 | 4/2004 | Zhang | |
| 2004/0134772 A1 | 7/2004 | Cohen et al. | |
| 2004/0146650 A1 | 7/2004 | Lockard et al. | |
| 2005/0029109 A1 | 2/2005 | Zhang et al. | |
| 2005/0067292 A1 | 3/2005 | Thompson et al. | |
| 2005/0072681 A1 | 4/2005 | Cohen et al. | |
| 2005/0230261 A1 | 10/2005 | Cohen et al. | |
| 2007/0075158 A1 | 4/2007 | Pelletier et al. | |
| 2008/0050524 A1 | 2/2008 | Kumar et al. | |
| 2012/0152501 A1 | 6/2012 | Harvey et al. | |
| 2012/0258409 A1 | 10/2012 | Mansour et al. | |
| 2016/0332724 A1 | 11/2016 | Mehring | |

FOREIGN PATENT DOCUMENTS

| | | |
|---|---|---|
| GB | 870896 A | 6/1961 |
| GB | 1193365 A | 5/1970 |
| GB | 2451144 A1 | 1/2009 |
| WO | 2007104599 A1 | 9/2007 |
| WO | 2013109272 A1 | 7/2013 |
| WO | 2016138271 A1 | 9/2016 |

\* cited by examiner

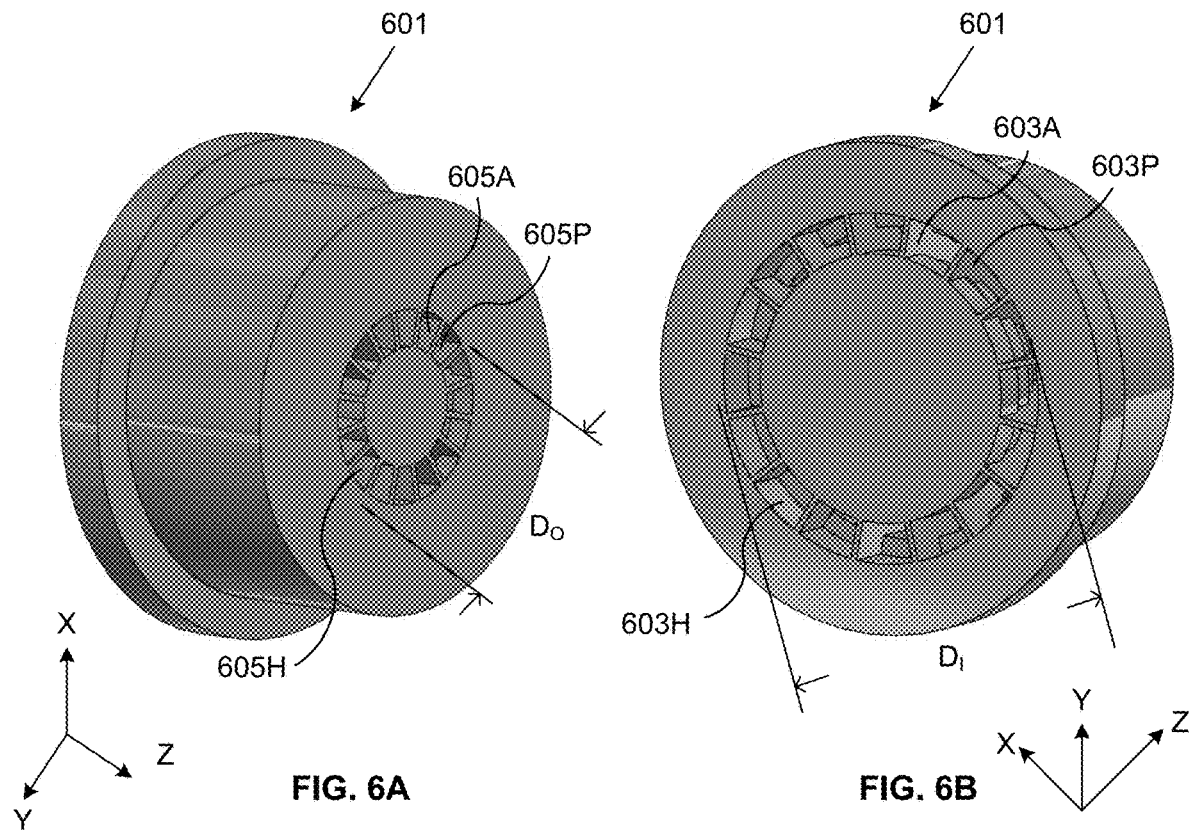
FIG. 6A
FIG. 6B
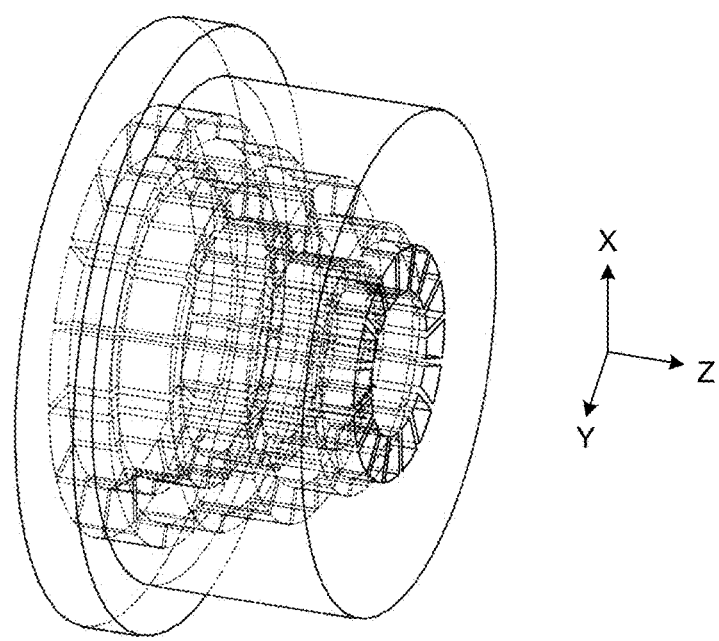
FIG. 6C

FIG. 7A  FIG. 7B

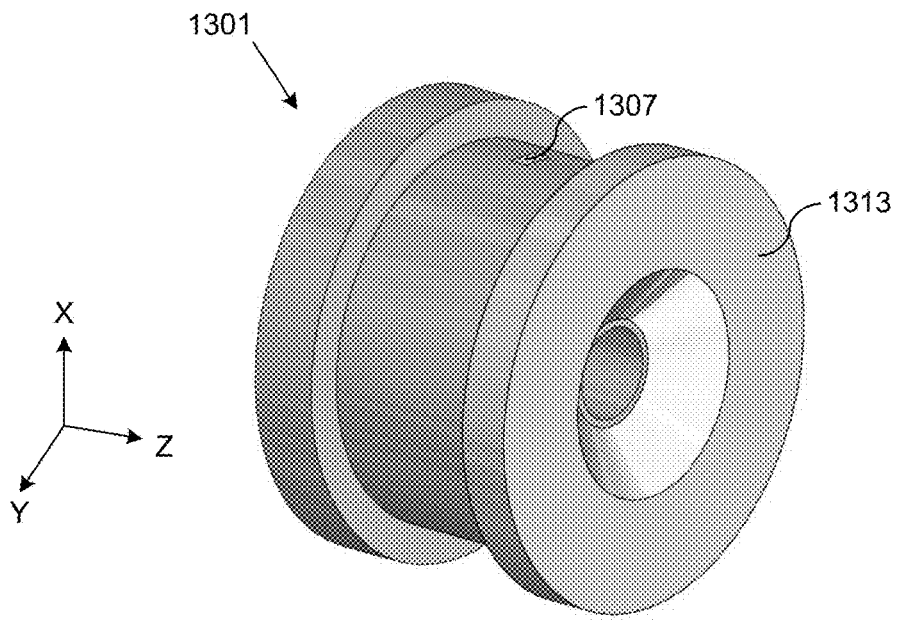
FIG. 13A
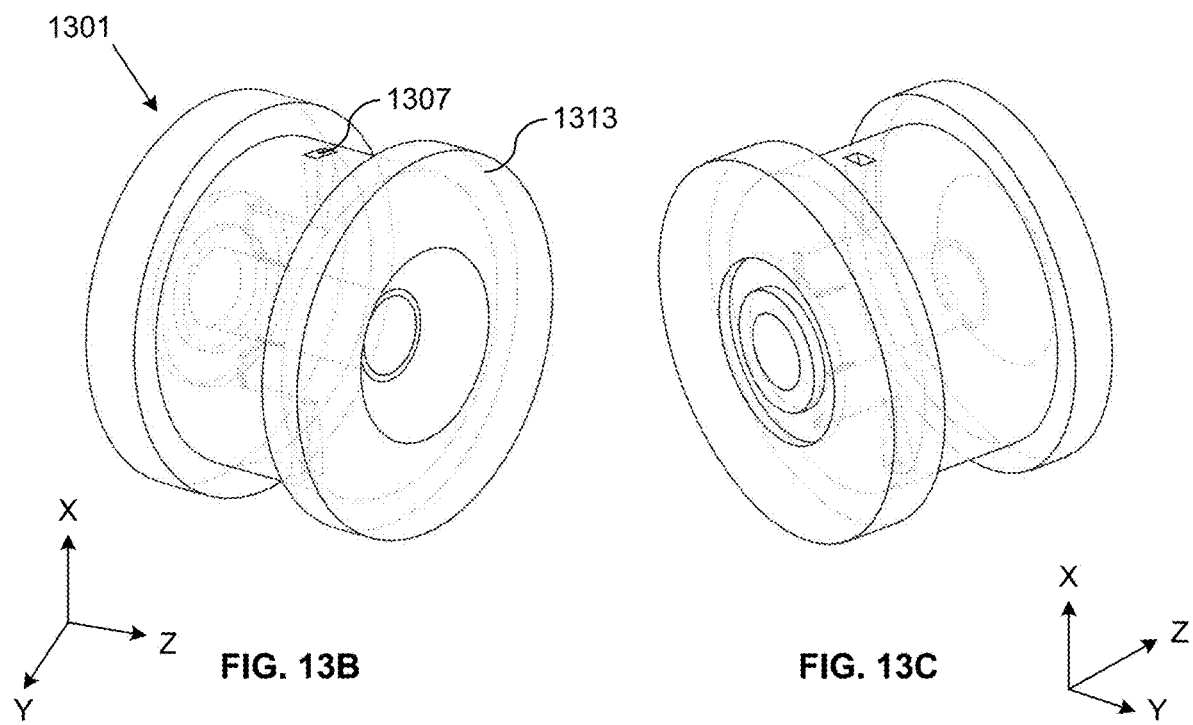
FIG. 13B  FIG. 13C

2201-R  2202-R  2203-L

2201-R  2202-L  2203-L

FUEL INJECTOR SYSTEMS, FUEL INJECTORS, FUEL INJECTOR NOZZLES, AND METHODS FOR MAKING FUEL INJECTOR NOZZLES

RELATED APPLICATIONS

The instant application is a continuation-in-part of U.S. patent application Ser. No. 16/218,411, filed on Dec. 12, 2018, which claims benefit of U.S. Provisional Patent Application No. 62/597,905, filed Dec. 12, 2017; U.S. Provisional Patent Application No. 62/667,370, filed May 4, 2018; and U.S. Provisional Patent Application No. 62/722,831, filed Aug. 24, 2018. The instant application also claims benefit of 62/722,831, filed on Aug. 24, 2018. These referenced applications, as with all patents, applications, and other materials mentioned herein, are incorporated herein by reference as if set forth in full herein.

FIELD OF THE INVENTION

The present invention relates generally to the field of fuel injectors for internal combustion engines (e.g. reciprocating with compression-ignition or spark-ignition, Wankel, turbine, jet, and the like) and more particularly to improved nozzle configurations for such fuel injectors as well as methods for making such improved nozzles. In some embodiments, additive fabrication methods are advantageously used to make such nozzles or nozzle inserts from a plurality of adhered layers which provide the nozzles or at least portions of the nozzles with stair-stepped configurations. One example of such an additive fabrication method uses multi-layer, multi-material electrochemically fabricating methods where each layer is adhered to previously formed layers during the formation of the layer or is formed and then adhered to previously formed layers.

BACKGROUND OF THE INVENTION

Fuel Injectors

Various types of fuel injectors and fuel injecting systems have been proposed and implemented in the past. FIGS. 1A and 1B illustrate a sample fuel injector capable of transition between closed and open states. FIG. 1A depicts the injector in a closed or non-injecting state while FIG. 1B depicts the injector in an open or injecting state. In this simple example, the fuel injector consists of:
(1) a body that includes:
  (a) a fluid flow channel,
  (b) a spring stop region,
  (c) a spring seat region,
  (d) a valve seat,
  (e) a filter region, and
  (f) an actuation coil region, and
  (g) a dispensing nozzle;
(2) a filter;
(3) an electrical connector, i.e. a power input;
(4) an electromagnetic coil, i.e. an actuation element;
(5) a movable plunger that includes:
  (a) a shaft body,
  (b) a magnet (or other actuator responsive element),
  (c) a spring stop, and
  (d) a valve plug, and
(6) a spring.

In the depicted device, fuel flows into the top of the device from a fuel channel or fuel rail, enters a flow channel and passes through a filter that removes particulate matter, the fuel then flows through the channel around the outside of the plunger, past the magnet, the spring and the spring seat, and if allowed by the valve, the fuel flows past the open valve plug and seat and encounters a valve nozzle that helps shape the output flow of the fuel. In some injectors, a pocket (known as a sac or fuel sac) exists between the inlet side of the nozzle orifice and the valve plug when the value plug is fully seated against the valve seat. When the valve plug pulls back from the valve seat fuel flows into this pocket and through the nozzle orifice. In some uses the ejected fuel may enter an injection port (indirect injection) where a valve will open and close to control the fuel supply that enters a combustion region (e.g. a piston cylinder) or alternatively it may be directly injected (direct injection) into the combustion region. The valve on the fuel injector is opened by the periodic actuation of the electromagnet coil (or other actuator) which interacts with the magnet (or other actuator responsive element) to move the plunger up (to open the valve). The valve is closed upon deactivation of the coil which allows the spring force that pushes down on the spring stop to push the plunger and its valve plug against the valve seat.

Other fuel injectors may include only a portion of the components set forth in the example of FIGS. 1A and 1B. For example, fuel injectors for turbine engines may be of a substantially continuous flow type where fuel flow control (e.g. open or closed) may be separated from a nozzle region in which case the fuel injector itself may be limited to an injection orifice and fuel flow channels that feed the orifice. In some implementations the fuel injectors may also include air flow passages that interact with the fuel that is ejected from the nozzle.

Multi-Layer, Multi-Material Electrochemical Fabrication:

An electrochemical fabrication technique for forming three-dimensional structures from a plurality of adhered multi-material layers has been and is being commercially pursued by Microfabrica® Inc. (formerly MEMGen Corporation) of Van Nuys, Calif. under the process names EFAB™ and MICA FREEFORM®, respectively.

Various electrochemical fabrication techniques were described in U.S. Pat. No. 6,027,630, issued on Feb. 22, 2000 to Adam Cohen. Some embodiments of this electrochemical fabrication technique allow the selective deposition of a material using a mask that includes a patterned conformable material on a support structure that is independent of the substrate onto which plating will occur. When desiring to perform an electrodeposition using the mask, the conformable portion of the mask is brought into contact with a substrate, but not adhered or bonded to the substrate, while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. such masks have come to be known as INSTANT MASKS™ and the process known as INSTANT MASKING™ or INSTANT MASK™ plating. Selective depositions using conformable contact mask plating may be used to form single selective deposits of material or may be used in a process to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p 244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFAB™)", Chapter 19 of The MEMS Handbook, edited by Mohamed Gad-El-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

An electrochemical deposition process for forming multilayer structures may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate. Typically this material is either a structural material or a sacrificial material.
2. Then, blanket depositing at least one additional material by electrodeposition so that the additional deposit covers both the regions that were previously selectively deposited onto, and the regions of the substrate that did not receive any previously applied selective depositions. Typically this material is the other of a structural material or a sacrificial material.
3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to an immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed. The removed material is a sacrificial material while the material that forms part of the desired structure is a structural material.

One method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated (the pattern of conformable material is complementary to the pattern of material to be deposited). In such a process, at least one CC mask is used for each unique cross-sectional pattern that is to be plated.

The support for a CC mask may be a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for multiple CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In some implementations, a single structure, part or device may be formed during execution of the above noted steps or in other implementations (i.e. batch processes) multiple identical or different structures, parts, or devices, may be built up simultaneously.

In preparation for performing the selective deposition of the first operation, the conformable portion of the CC mask is placed in registration with and pressed against a selected portion of (1) the substrate, (2) a previously formed layer, or (3) a previously deposited material forming a portion of a layer that is being formed. The pressing together of the CC mask and relevant substrate, layer, or material occurs in such a way that all openings, in the conformable portions of the CC mask contain plating solution. The conformable material of the CC mask that contacts the substrate, layer, or material acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 2A-2C. FIG. 2A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 2A also depicts a substrate 6, separated from mask 8, onto which material will be deposited during the process of forming a layer. CC mask plating selectively deposits material 22 onto substrate 6 by simply pressing the insulator against the substrate and then electrodepositing material through apertures 26a and 26b in the insulator as shown in FIG. 2B. After deposition, the CC mask is separated, preferably non-destructively, from the substrate 6 as shown in FIG. 2C.

The CC mask plating process is distinct from a "through-mask" plating process in that, in a through-mask plating process the separation of the masking material from the substrate would occur destructively. Furthermore in a through mask plating process, openings in the masking material are typically formed while the masking material is in contact with and adhered to the substrate. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 2D-2G. FIG. 2D shows an anode 12' separated from a mask 8' that includes a patterned conformable material 10' and a support structure 20. FIG. 2D also depicts substrate 6 separated from the mask 8'. FIG. 2E illustrates the mask 8' being brought into contact with the substrate 6. FIG. 2F illustrates the deposit 22' that results from conducting a current from the anode 12' to the substrate 6. FIG. 2G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the substrate on which plating is to occur (e.g. separate from a three-dimensional (3D) structure that is being formed). CC masks may be formed in a variety of ways, for example, using a photolithographic process. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 3A-3F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformable portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 3A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 3B. FIG. 3C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 3D. After repetition of this process for all layers, the multi-layer structure 20 formed of the second material 4 (i.e. structural material) is embedded in first material 2 (i.e. sacrificial material) as shown in FIG. 3E. The embedded structure is etched to yield the desired device, i.e. structure 20, as shown in FIG. 3F.

Various components of an exemplary manual electrochemical fabrication system 32 are shown in FIGS. 4A-4C. The system 32 consists of several subsystems 34, 36, 38, and 40. The substrate holding subsystem 34 is depicted in the upper portions of each of FIGS. 4A-4C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 4A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 4B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 4C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between them of about 1 to 5 um, may be formed by electroplating the parts of the device while in an unassembled, and preferably pre-aligned state. In such embodiments, the individual parts can be moved into operational relationship with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal Layers". This patent teaches the formation of metal structure utilizing through mask exposures. A first layer of a primary metal is electroplated onto an exposed plating base to fill a void in a photoresist (the photoresist forming a through mask having a desired pattern of openings), the photoresist is then removed and a secondary metal is electroplated over the first layer and over the plating base. The exposed surface of the secondary metal is then machined down to a height which exposes the first metal to produce a flat uniform surface extending across both the primary and secondary metals. Formation of a second layer may then begin by applying a photoresist over the first layer and patterning it (i.e. to form a second through mask) and then repeating the process that was used to produce the first layer to produce a second layer of desired configuration. The process is repeated until the entire structure is formed and the secondary metal is removed by etching. The photoresist is formed over the plating base or previous layer by casting and patterning of the photoresist (i.e. voids formed in the photoresist) are formed by exposure of the photoresist through a patterned mask via X-rays or UV radiation and development of the exposed or unexposed areas.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial layer of sacrificial material (i.e. a layer or coating of a single material) on the substrate so that the structure and substrate may be detached if desired. In such cases after formation of the structure the sacrificial material forming part of each layer of the structure may be removed along with the initial sacrificial layer to free the structure. Substrate materials mentioned in the '637 patent include silicon, glass, metals, and silicon with protected semiconductor devices. A specific example of a plating base includes about 150 angstroms of titanium and about 300 angstroms of nickel, both of which are sputtered at a temperature of 160° C. In another example, it is indicated that the plating base may consist of 150 angstroms of titanium and 150 angstroms of nickel where both are applied by sputtering.

Electrochemical fabrication provides the ability to form prototypes and commercial quantities of miniature objects, parts, structures, devices, and the like at reasonable costs and in reasonable times. In fact, electrochemical fabrication is an enabler for the formation of many structures that were hitherto impossible to produce. Electrochemical fabrication opens the spectrum for new designs and products in many industrial fields. Even though electrochemical fabrication offers this new capability and it is understood that electrochemical fabrication techniques can be combined with designs and structures known within various fields to produce new structures, certain uses for electrochemical fabrication provide designs, structures, capabilities and/or features not known or obvious in view of the state of the art.

Needs in the Field

A need exists in fuel injectors and fuel injector systems for improved nozzle configurations that can lead to improved fuel atomization, improved fuel combustion, and thus improved fuel efficiency. A need also exists for integrating such improved nozzles into injector bodies when the nozzles are not formed as part of those injector bodies.

A need exists for improved batch manufacturing methods that produce nozzles that provide more consistent operational characteristics. A need exists for fuel injection nozzles having improved characteristics, reduced fabrication times, reduced fabrication costs, simplified fabrication processes, greater versatility in device design, improved selection of materials, improved material properties, more cost effective and less risky production of such devices, and/or more independence between geometric configuration and the selected fabrication process.

SUMMARY OF THE INVENTION

It is an object of some embodiments of the invention to provide an improved fuel injector nozzle configurations, fuel injectors having such improved nozzles, fuel injector systems having improved performance provided by such nozzles, engines having improved performance provided by such nozzles, and/or improved methods for fabricating such nozzles.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case regarding some aspects.

In a first aspect of the invention, an improved fuel injector includes: (a) a body that includes a fluid flow channel, a spring stop region, a spring seat region, a valve seat, and a dispensing nozzle; (b) a filter located in the fluid flow channel between an inlet of the channel and the nozzle; (c) a power input; (d) an actuation element functionally connected to the power input; (e) a movable plunger that includes a shaft body, an actuator responsive element, a spring stop, and a valve plug, wherein the plunger is biased by the spring to cause the fluid flow path to be blocked by the valve plug being in contact with the valve seat, and wherein upon excitation the actuation element can move the plunger to open the fluid flow path by separating the valve plug from the valve seat to allow fuel to flow from the inlet of the channel through the nozzle, wherein the improvement comprises a nozzle including one or more features selected from the group consisting of: (1) a multi-layer structure comprising a plurality of adhered electrodeposited layers with each layer representing a cross-section of the nozzle; (2) a plurality of stair-stepped features defining a plurality of discrete layer levels that are stacked along a build axis (e.g. the Z-axis); (3) a plurality of inlets connected to a corresponding plurality of outlets where the inlets have on average a wider cross-sectional spacing than do the outlets; (4) a plurality of inlets connected to a corresponding plurality of outlets where the inlets have on average a spacing from a central axis of the nozzle that is larger than an average spacing of the outlets from the central axis; (5) a plurality of inlets connected to a corresponding plurality of outlets where the inlets have on average a narrower cross-sectional spacing than do the outlets; (6) a plurality of inlets connected to a corresponding plurality of outlets where the inlets have on average a spacing from a central axis of the nozzle that is smaller than an average spacing of the outlets from the central axis; (7) a plurality of channels connecting a plurality of inlets to a plurality of outlets where each of the channels comprises a plurality of stair-step transitions along a channel path between a respective inlet and outlet; (8) a monolithic body structure formed without assembly of discrete components; (9) a plurality of inlets each with a maximum cross-sectional dimension selected from the group consisting of: (i) <=40 ums, (ii) <=30 ums, (iii) <=20 ums, (iv) <=10 ums, (v) <=5 ums; (10) a plurality of outlets with maximum cross-sectional dimensions selected from the group consisting of (i) <=40 ums, (ii) <=30 ums, (iii) <=20 ums, (iv) <=10 ums, (v) <=5 ums; (11) stair steps defined by tops and bottoms of layers that are stacked along an axis extending from an inlet to an outlet; (12) a plurality of air injection or air flow passages that each extend from a surface of the nozzle to at least one fuel flow channel within the nozzle; (13) a plurality of air injection or air flow passages that each extend from a surface of the nozzle to at least one fuel flow channel within the nozzle, wherein each of the air injection or air flow passages has a cross-sectional dimension, which is nominally perpendicular to an air flow direction, that is smaller than that of the at least one fuel flow channel, and wherein each air injection or air flow passage and the at least one fuel flow channel have an orientation relative to each other that provides for a common velocity component of fluid flow; (14) a plurality of air injection or air flow passages with air inlets that are larger than air outlets; (15) a stair stepped fuel inlet with a narrowing cross-section; (16) a stair stepped fuel flow path with a restriction along the fuel flow path and an air inlet located downstream of the restriction and recessed from the restriction; (17) a fuel flow path that extends along a plurality of paths with each path forming a spiral path from the inlet to the outlet; (18) a fuel flow path that is bounded on the sides for a majority of a length of the path by a first metal and by a second more abrasion resistive metal at the outlet of the path; (19) a fuel flow path that is bounded on the sides for a majority of a length of the path by a first metal and by a second a higher melting temperature material (e.g. a ceramic or tungsten) in an outlet region of the path; (20) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers, wherein the relatively large fuel flow channel has a cross-sectional area that is selected from the group consisting of: (i) at least 4 times larger than the relatively small cross-sectional outlet paths, (ii) at least 10 times larger than the relatively small cross-sectional outlet paths; (iii) at least 20 times larger than the relatively small cross-sectional outlet paths, and (iv) at least 50 times larger than the relatively small cross-sectional outlet paths; (21) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relative large fuel flow channel is larger than an MFS while the size of the relatively small cross-sectional outlets is smaller than an MFS for a given layer thickness and build process that was used in forming the nozzles; (22) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relative large flow channel is at least 10 times larger than the relatively small cross-sectional outlet paths which have at least one cross-sectional dimension selected from the group consisting of (i) <=20 ums, (ii) <=10 ums, and (iii) <=5 ums; (23) a multi-layer structure comprising a plurality of adhered electrodeposited layers with each layer representing a cross-section of the nozzle wherein at least one layer containing an outlet has a surface defined by at least one planarization operation; and (24) a plurality of stair-stepped features defining a plurality of discrete layer levels that are stacked on along build axis (e.g. the Z-axis) wherein at least one layer containing an outlet has a surface that is defined by at least one planarization operation.

In a second aspect of the invention an improved fuel injector, includes: (a) a body that includes at least one fluid flow channel end in at least one nozzle having orifice, wherein the improvement comprises a nozzle including one or more features selected from the group consisting of: (1) a multi-layer structure comprising a plurality of adhered electrodeposited layers with each layer representing a cross-section of the nozzle; (2) a plurality of stair-stepped features defining a plurality of discrete layer levels that are stacked on along build axis (e.g. the Z-axis); (3) a plurality of inlets connected to a corresponding plurality of outlets where the inlets have on average a wider cross-sectional spacing than do the outlets; (4) a plurality of inlets connected to a corresponding plurality of outlets where the inlets have on average a spacing from a central axis of the nozzle that is larger than an average spacing of the outlets from the central axis; (5) a plurality of inlets connected to a corresponding plurality of outlets where the inlets have on average a narrower cross-sectional spacing than do the outlets; (6) a plurality of inlets connected to a corresponding plurality of outlets where the inlets have on average a spacing from a central axis of the nozzle that is smaller than an average spacing of the outlets from the central axis; (7) a plurality of channels connecting a plurality of inlets to a plurality of outlets where each of the channels comprises a plurality of stair-step transitions along channel paths between the inlets and the outlets; (8) a monolithic body structure formed without assembly of discrete components; (9) a plurality of inlets each with a maximum cross-sectional dimension selected from the group consisting of: (i) <=40 ums, (ii) <=30 ums, (iii) <=20 ums, (iv) <=10 ums, (v) <=5 ums; (10) a plurality of outlets each with a maximum cross-sectional dimension selected from the group consisting of: (i) <=40 ums, (ii) <=30 ums, (iii) <=20 ums, (iv) <=10 ums, (v) <=5 ums; (11) stair steps defined by tops and bottoms of layers that are stacked along an axis extending from an inlet to an outlet; (12) a plurality of air injection or air flow passages that extend from a surface of the nozzle to at least one fuel flow channel within the nozzle; (13) a plurality of air injection or air flow passages that each extend from a surface of the nozzle to at least one fuel flow channel within the nozzle, wherein each of the air injection or air flow passages has a cross-sectional dimension, which is nominally perpendicular to an air flow direction, that is smaller than that of the at least one fuel flow channel, and wherein the air passage and the fuel flow channel have an orientation relative to each other that provides for a common velocity component of fluid flow; (14) a plurality of air injection or air flow passages with air inlets that are larger than air outlets; (15) a stair stepped fuel inlet with a narrowing cross-section; (16) a stair stepped fuel flow path with a restriction along the fuel flow path and an air inlet located downstream of the restriction and recessed from the restriction; (17) a fuel flow path that extends along a plurality of paths with each path forming a spiral path from the inlet to the outlet; (18) a fuel flow path that is bounded on the sides for a majority of a length of the path by a first metal and by a second more abrasion resistive metal at the outlet of the path; (19) a fuel flow path that is bounded on the sides for a majority of a length of the path by a first metal and by a second a higher melting temperature material (e.g. a ceramic or tungsten) in an outlet region of the path; (20) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers, wherein the relatively large fuel flow channel has a cross-sectional area that is selected from the group consisting of (i) at least 4 times larger than the relatively small cross-sectional outlet paths, (ii) at least 10 times larger than the relatively small cross-sectional outlet paths; (iii) at least 20 times larger than the relatively small cross-sectional outlet paths, and (iv) at least 50 times larger than the relatively small cross-sectional outlet paths; (21) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relatively large fuel flow channel is larger than an MFS while the size of the relatively small cross-sectional outlets is smaller than an MFS for a given layer thickness and build process that was used in forming the nozzles; and (22) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relatively large flow channel is at least 10 times larger than the relatively small cross-sectional outlet paths which have at least one cross-sectional dimension selected from the group consisting of (i) <=20 ums, (ii) <=10 ums, and (iii) <=5 ums; (23) a multi-layer structure comprising a plurality of adhered electrodeposited layers with each layer representing a cross-section of the nozzle wherein at least one layer containing an outlet has a surface defined by at least one planarization operation; and (24) a plurality of stair-stepped features defining a plurality of discrete layer levels that are stacked along a build axis (e.g. the Z-axis) wherein at least one layer containing an outlet has a surface that is defined by at least one planarization operation.

In a third aspect of the invention, an improved fuel injector includes: (a) a body that includes at least one fluid flow channel and at least one nozzle having an orifice, and which may optionally include none of or one or more of (i) a spring stop region, a spring seat region, a valve seat, and a valve plug; (ii) a filter located in the fluid flow channel between an inlet of the channel and the nozzle; (iii) a power input and an actuation element functionally connected to the power input; (iv) a spring stop region, a spring seat region, a valve seat, and a valve plug; a power input and an actuation element functionally connected to the power input; a movable plunger that includes a shaft body, an actuator responsive element, a spring stop, and a valve plug, wherein the plunger is biased by the spring to cause the fluid flow path to be blocked by the valve plug being in contact with the valve seat, and wherein upon excitation the actuation element can move the plunger to open the fluid flow path by separating the valve plug from the valve seat to allow fuel to flow from the inlet of the channel through the nozzle; wherein the improvement comprises a nozzle including one or more features selected from the group consisting of: (1) a nozzle orifice including at least one a rifling protrusion; (2) a nozzle orifice including a plurality of rifling protrusions; (3) a nozzle orifice including a plurality of stair stepped rifling protrusions; (4) at least two orifices with each including at least one rifling protrusion, and wherein at least two different rifling orientations are used; (5) a nozzle orifice having an inlet in proximity to at least two sac guide elements that direct fluid flow over a common orifice; (6) a plurality of orifices wherein a single sac guide element directs fluid over at least two of the orifices; (7) a plurality of orifices wherein a single sac guide is used in directing fluid over a given orifice; (8) at least one orifice wherein at least one sac guide is used in directing fluid over a given orifice of the at least one orifice wherein the sac guide comprises a stair stepped structure; and (9) at least one orifice having a counterbore region near an exit of the orifice wherein air is directed from an outlet side inlet channel to introduce air into a fluid flow coming from the orifice via a venturi effect.

In a fourth aspect of the invention an improved internal combustion engine includes: (1) at least one combustion chamber; an energy transfer mechanism to convert the force of combustion into rotatory motion; a source of oxygen (e.g. the atmosphere, or a container of oxygen); and an ignition system (e.g. a spark, pressure, flame, laser, or the like) for combusting the fuel in the combustion chamber; wherein the improvement comprises a fuel injection system comprising the improved fuel injector of the first, second or third aspects.

Numerous variations of the fourth aspect of the invention exist and include for example: (1) the engine being selected from the group consisting of (A) a piston engine comprising one or more cylinders with fuel ignited by a spark plug, (A) a piston engine comprising one or more cylinders with fuel ignited by pressure, (C) a Wankel engine, (D) a jet engine, (E) a turbojet engine, (F) a ram jet engine, and (G) a rocket engine; (2) the fuel injector ejecting fluid into a location selected from the group consisting of: (A) directly into a combustion chamber, and (2) indirectly behind an intake valve.

In a fifth aspect of the invention, a method for making a fuel injector, includes: providing an injector body; providing a plunger with a valve plug; providing an actuator for lifting the valve plug from a valve seat and a return spring for returning the valve plug to the valve seat in absence of actuation; providing a fuel injection nozzle fabricated, at least in part, by a method selected from the group consisting of (1) a multi-material, multi-layer electrochemical fabrication method; (2) a multi-material, multi-layer electrochemical fabrication method including planarization of at least one of the multi-material layers; (3) a multi-material, multi-layer electrochemical fabrication method including planarization of at least one of the multi-material layers, wherein the at least one multi-material layer comprises an exit orifice of the nozzle; (4) a multi-material, multi-layer electrochemical fabrication method including planarization of at least one of the multi-material layers, wherein the at least one multi-material layer comprises an exit orifice of the nozzle and wherein structural material forming the at least one multi-material layer is selectively deposited; and (5) a multi-material, multi-layer electrochemical fabrication method including formation of at least one layer comprising an exit orifice of the nozzle and wherein structural material forming the at least one multi-material layer is selectively deposited; providing at least one nozzle retainer; assembling the at least one nozzle retainer and the nozzle to form a nozzle assembly; joining the nozzle assembly to the injector body; and assembling the injector body, the plunger, the actuator, and the spring.

Numerous variations of the fifth aspect are possible and include, for example: (1) the nozzle assembly being joined to the injector body from a distal end of the injector body; (2) the nozzle assembly being joined to the injector body prior to assembling the plunger into the injector body; (3) the nozzle assembly being joined to the injector body after loading the plunger into the injector body; (4) the nozzle assembly including a nozzle, a proximal retainer, and a distal retainer; (5) the nozzle and the proximal and distal retainers being bonded and sealed using a method selected from the group consisting of: (A) laser welding, (B) press fitting, (C) brazing, and (D) diffusion bonding; (6) the $5^{th}$ variation further including the nozzle assembly being joined to the injector body by a method selected from the group consisting of: (A) laser welding, (B) press fitting, (C) brazing, and (D) diffusion bonding; (7) the at least one nozzle retainer being formed by a different shaping process than that used to form the nozzle; (8) the nozzle has a plurality of fuel passages extending from a proximal to distal end of the nozzle; (9) the nozzle being loaded into the injector body from a proximal side of the injector body and then moved toward the distal end of the injector body within the body, and then joined; (10) the ninth variation wherein the nozzle assembly includes a nozzle, a proximal retainer, and a distal retainer; (11) the tenth variation wherein the nozzle and the proximal and distal retainers are bonded and sealed using a method selected from the group consisting of: (A) laser welding, (B) press fitting, (C) brazing, and (D) diffusion bonding; and (12) the tenth variation wherein the nozzle assembly is joined to the injector body by a method selected from the group consisting of: (A) laser welding, (B) press fitting, (C) brazing, and (D) diffusion bonding.

In a sixth aspect of the invention a method for making a fuel injector, includes: providing an injector body; providing a fuel injection nozzle fabricated, at least in part, by a method selected from the group consisting of (1) a multi-material, multi-layer electrochemical fabrication method; (2) a multi-material, multi-layer electrochemical fabrication method including planarization of at least one of the multi-material layers; (3) a multi-material, multi-layer electrochemical fabrication method including planarization of at least one of the multi-material layers, wherein the at least one multi-material layer comprises an exit orifice of the nozzle; (4) a multi-material, multi-layer electrochemical fabrication method including planarization of at least one of the multi-material layers, wherein the at least one multi-material layer comprises an exit orifice of the nozzle and wherein structural material forming the at least one multi-material layer is selectively deposited; and (5) a multi-material, multi-layer electrochemical fabrication method including formation of at least one layer comprising an exit orifice of the nozzle and wherein structural material forming the at least one multi-material layer is selectively deposited; providing at least one nozzle retainer; assembling the at least one nozzle retainer and the nozzle to form a nozzle assembly; joining the nozzle assembly to the injector body.

In a seventh aspect of the invention, an improved injector, includes (a) a body that includes at least one fluid flow channel and at least one nozzle having an orifice, wherein the improvement comprises a nozzle including one or more features selected from the group consisting of: (1) a multi-layer structure comprising a plurality of adhered electrode-posited layers with each layer representing a cross-section of the nozzle; (2) a plurality of stair-stepped features defining a plurality of discrete layer levels that are stacked along a build axis (e.g. the Z-axis); (3) a plurality of inlets connected to a corresponding plurality of outlets where the inlets have on average a wider cross-sectional spacing than do the outlets; (4) a plurality of inlets connected to a corresponding plurality of outlets where the inlets have on average spacing from a central axis of the nozzle that is larger than an average spacing of the outlets from the central axis; (5) a plurality of inlets connected to a corresponding plurality of outlets where the inlets have on average a narrower cross-sectional spacing than do the outlets; (6) a plurality of inlets connected to a corresponding plurality of outlets where the inlets have on average spacing from a central axis of the nozzle that is smaller than an average spacing of the outlets from the central axis; (7) a plurality of channels connecting a plurality of inlets to a plurality of outlets where each of the channels comprises a plurality of stair-step transitions along a channel path between the respective inlet and the outlet; (8) a monolithic body structure formed without assembly of discrete components; (9) a plurality of inlets each with a maximum cross-sectional dimensions selected from the group consisting of (i) <=40 ums, (ii) <=30 ums, (iii) <=20 ums, (iv) <=10 ums, (v) <=5 ums; (10) a plurality of outlets with maximum cross-sectional dimensions selected from the group consisting of (i) <=40 ums, (ii) <=30 ums, (iii) <=20 ums, (iv) <=10 ums, (v) <=5 ums; (11) stair steps defining at least one of the tops or bottoms of layers that are stacked along an axis extending from an inlet to an outlet; (12) a plurality of gas (e.g. air or oxygen) injection or gas flow passages that each extend from a surface of the nozzle to at least one liquid flow channel within the nozzle; (13) a plurality of gas injection or gas flow passages that each extend from a surface of the nozzle to at least one liquid flow channel within the nozzle, wherein each of the gas injection or gas flow passages has a cross-sectional dimension (which is nominally perpendicular to an gas flow direction) smaller than that of that at least one liquid flow channel, and wherein each of the gas injection or gas flow passages passage and the at least one liquid flow channel have an orientation relative to each other that provides for a common velocity component of fluid flow; (14) a plurality of gas injection or gas flow passages with gas inlets that are larger than gas outlets; (15) a stair stepped liquid inlet with a narrowing cross-section; (16) a stair stepped liquid flow path with a restriction along the liquid flow path and a gas inlet located downstream of the restriction and recessed from the restriction; (17) a liquid flow path that extends along a plurality of paths with each path forming a spiral path from the inlet to the outlet; (18) a liquid flow path that is bounded on the sides for a majority of a length of the path by a first metal and by a second more abrasion resistive metal at the outlet of the path; (19) a liquid flow path that is bounded on the sides for a majority of the length of a channel by a first metal and by a second a higher melting temperature material (e.g. a ceramic or tungsten) in an outlet region of the channel; (20) a liquid flow path that is defined by a relatively large liquid flow channel in cross-sectional dimensional which terminates in a plurality of relatively small cross-sectional outlet paths where the size of each of the outlet paths is defined by the lack of overlap of structural material on two consecutive layers, wherein the relatively large liquid flow channel has a cross-sectional area that is selected from the group consisting of: (i) at least 4 times larger than the relatively small cross-sectional outlet paths, (ii) at least 10 times larger than the relatively small cross-sectional outlet paths; (iii) at least 20 times larger than the relatively small cross-sectional outlet paths, and (iv) at least 50 times larger than the relatively small cross-sectional outlet paths; (21) a liquid flow path that is defined by a relatively large liquid flow channel in cross-sectional dimensional which terminates in a plurality of relatively small cross-sectional outlet paths where the size of each of the outlet paths is defined by the lack of overlap of structural material on two consecutive layers and wherein the relative large liquid flow channel is larger than an MFS while the size of the relatively small cross-sectional outlets is smaller than an MFS for a given layer thickness and build process that was used in forming the nozzles; and (22) a liquid flow path that is defined by a relatively large liquid flow channel in cross-sectional dimensional which terminates in a plurality of relatively small cross-sectional outlet paths where the size of each of the outlet paths is defined by the lack of overlap of structural material on two consecutive layers and wherein the relatively large flow channel is at least 10 times larger than the relatively small cross-sectional outlet paths which have at least one cross-sectional dimension selected from the group consisting of (i) <=20 ums, (ii) <=10 ums, and (iii) <=5 ums; (23) a multi-layer structure comprising a plurality of adhered electrodeposited layers with each layer representing a cross-section of the nozzle wherein at least one layer containing an outlet has a surface defined by at least one planarization operation; and (24) a plurality of stair-stepped features defining a plurality of discrete layer levels that are stacked on along build axis (e.g. the Z-axis) wherein at least one layer containing an outlet has a surface that is defined by at least one planarization operation.

In an eighth aspect of the invention, an improved injector includes: (a) body that includes at least one fluid flow channel and at least one nozzle having an orifice, and which may optionally include none of or one or more of: (i) a spring stop region, a spring seat region, a valve seat, and a valve plug; (ii) a filter located in the fluid flow channel between an inlet of the channel and the nozzle; (iii) a power input and an actuation element functionally connected to the power input; (iv) a spring stop region, a spring seat region, a valve seat, and a valve plug; a power input and an actuation element functionally connected to the power input; a movable plunger that includes a shaft body, an actuator responsive element, a spring stop, and a valve plug, wherein the plunger is biased by the spring to cause the fluid flow path to be blocked by the valve plug being in contact with the valve seat, and wherein upon excitation the actuation element can move the plunger to open the fluid flow path by separating the valve plug from the valve seat to allow liquid to flow from the inlet of the channel through the nozzle; wherein the improvement comprises a nozzle including one or more features selected from the group consisting of: (1) a nozzle orifice including at least one rifling protrusion; (2) a nozzle orifice including a plurality of rifling protrusions; (3) a nozzle orifice including a plurality of stair stepped rifling protrusions; (4) at least two orifices with each including at least one rifling protrusion, and wherein at least two different rifling orientations are used; (5) a nozzle orifice having an inlet in proximity to at least two sac guide elements that direct fluid flow over a common orifice; (6) a plurality of orifices wherein a single sac guide element directs fluid over at least two of the orifices; (7) a nozzle including a plurality of orifices wherein a single sac guide is used in directing fluid over a given orifice; (8) at least one orifice wherein at least one sac guide is used in directing fluid over a given orifice of the at least one orifice wherein the sac guide comprises a stair stepped structure; and (9) at least one orifice having a counterbore region near an exit of the orifice wherein gas is directed from an outlet side inlet channel to introduce gas into a fluid flow coming from the orifice via a venturi effect.

The disclosure of the present invention provides fifteen primary nozzle embodiments with each type of nozzle being formable from successive layers each comprising at least two materials, one of which is a structural material and the other of which is a sacrificial material, and wherein each successive layer of the at least one structural material defines a successive cross-section of the nozzle structure, and wherein the forming of each of the plurality of successive layers includes: (i) depositing a first of the at least two materials; (ii) depositing a second of the at least two materials; and (B) after the forming of the plurality of successive layers, separating at least a portion of the sacrificial material from the structural material to reveal the three-dimensional nozzle. In some such embodiments, the nozzles are formed in a batch process that builds up a plurality of nozzles layer-by-layer simultaneously. In some such embodiments, each nozzle may be limited to one or more fuel ejection orifices and surrounding structural material. In some such embodiments, monolithically formed nozzles may include not only include fuel flow orifices but additionally one or more of fuel injection passages, air flow orifices, and air flow passages. In still other such embodiments, monolithically formed nozzles may include post orifice structures (structures that extend past the orifice or orifices in the dispensing direction) such as cones or other mixing or flow control configurations. In some such embodiments orifice edges may be defined by edges of selectively deposited material where XY dimensions of the orifices and other structural features are the XY dimensions of the selectively deposited material or materials. In some such embodiments where nozzles are formed from the buildup of layers, critical layers (e.g. layers where well defined edge geometries are desired, e.g. exit edges of nozzle orifices) may be subject to planarization operations to set vertical height (e.g. in the Z-direction), with or without an encapsulating or surrounding sacrificial material, to obtain cleaner, better defined, and more reliably formed edges.

Other aspects of the invention will be understood by those of skill in the art upon review of the teachings herein. Other aspects of the invention may involve combinations of the above noted aspects with one another or with various features of the various embodiments of the invention. Other aspects of the invention may involve apparatus that can be used in implementing one or more of the above method aspects of the invention or may be directed to the devices or structures formed by application of such methods. These other aspects of the invention may provide various combinations of the aspects presented above as well as provide other configurations, structures, functional relationships, and processes that have not been specifically set forth above

BRIEF DESCRIPTION OF THE DRAWINGS

FIGS. 6A-6D provide various views of an example fuel injection nozzle which could form part of a fuel injector according to a first embodiment of the invention wherein the nozzle provides a plurality of inlets forming a relative large segmented, cylindrical fuel inlet region (seen in FIG. 6B) having a relatively larger diameter which extends through passages in the nozzle to a plurality of segmented outlets forming a smaller diameter circular arrangement of nozzles (seen in FIG. 6A) where the passages have stepped levels (seen in FIG. 6D such that the exiting fuel is nominally ejected to a fuel collision region or focal point).

FIGS. 7A-7D provide various views of an example fuel injection nozzle which could form part of a fuel injector according to a second embodiment of the invention wherein the nozzle provides a single fuel outlet and single inlet with a plurality of air injection channels located near the inlet to provide enhanced cavitation of fuel, break up of fuel, and/or mixing of fuel and air prior to injection.

FIGS. 13A-13F provide various views of an example fuel injection nozzle which could form part of a fuel injector according to an eighth embodiment of the invention wherein the nozzle provides air injection ports along with a heat shield (that may be formed from a high temperature material, e.g. ceramic or tungsten) around its outlet which may find particular use in direct injection environments.

FIGS. 19A and 19B provide top side isometric views of the nozzle from two different angles with the angle of FIG. 19B being shallower such that the protrusion of the nozzle tip can be seen on the underside of the nozzle. FIGS. 19C-19E provide a side view (FIG. 19C) and two cut side views of the nozzle (FIGS. 19D and 19E) with the cut side views showing the orifice inlet, outlet, counter bore, value seating region, and sac region. FIGS. 19F and 19G provide bottom side isometric views of the nozzle from two different angles with the angle of FIG. 19F being shallower.

DETAILED DESCRIPTION OF PREFERRED EMBODIMENTS

Electrochemical Fabrication in General

FIGS. 2A-2G, 3A-3F, and 4A-4C illustrate various features of one form of electrochemical fabrication. Other electrochemical fabrication techniques are set forth in the '630 patent referenced above, in the various previously incorporated publications, and in various other patents and patent applications incorporated herein by reference. Still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

Figure 1A:
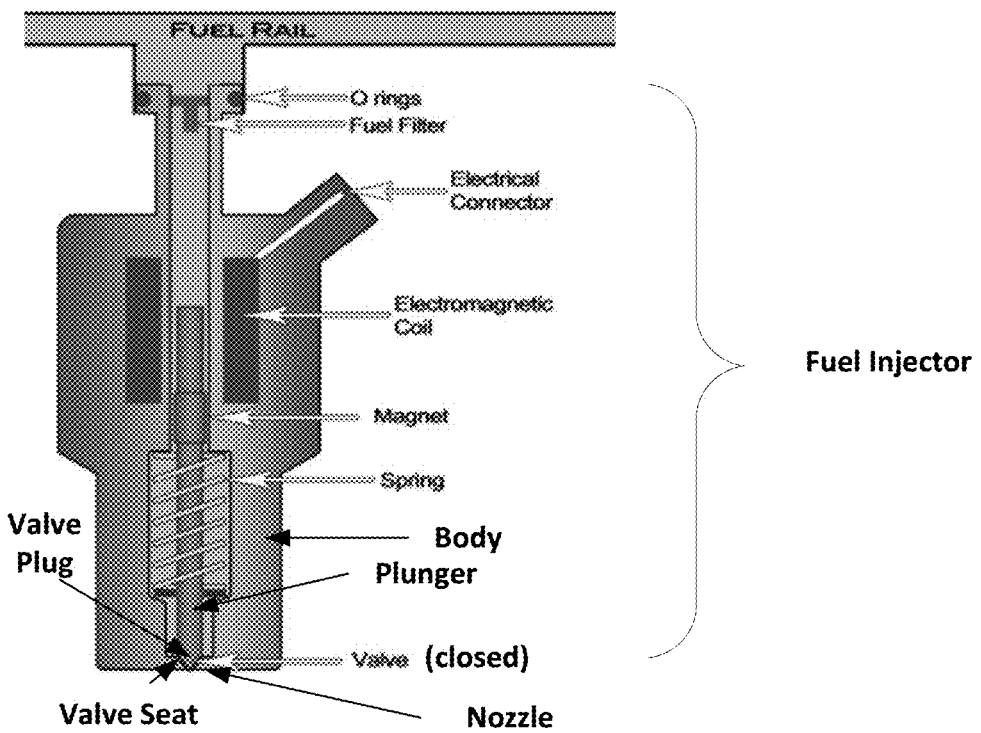
FIGS. 1A and 1B illustrate a sample fuel injector in a closed or non-injecting, state (FIG. 1A) and in an open or fuel injecting state (FIG. 1B) respectively.
Figure 1B:
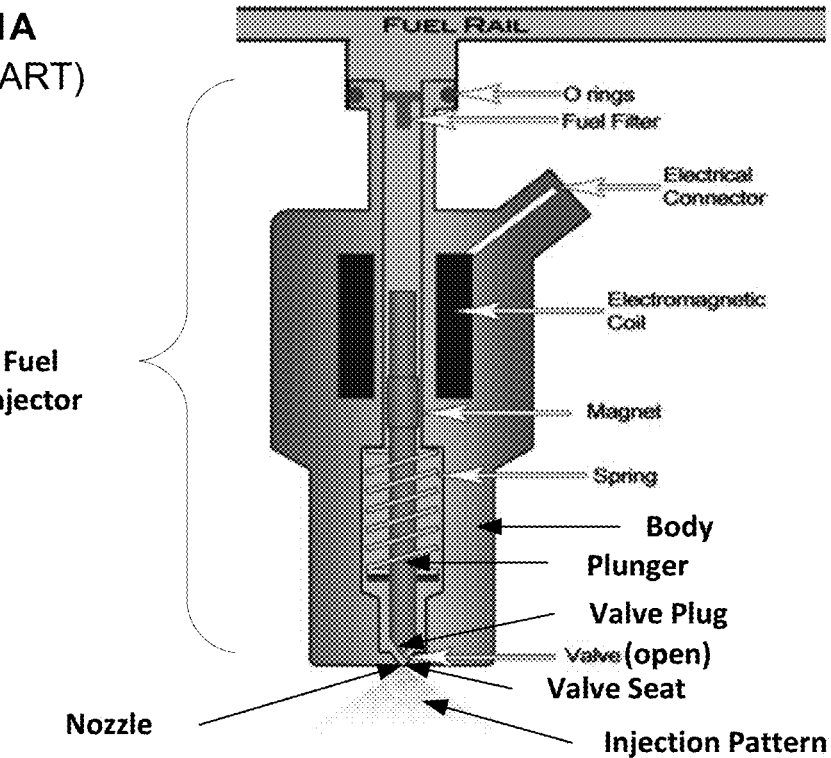
Figure 2A:
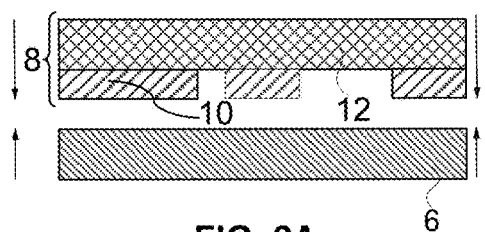
FIGS. 2A-2C schematically depict side views of various stages of a CC mask plating process, while FIGS. 2D-2G schematically depict side views of various stages of a CC mask plating process using a different type of CC mask.
Figure 2B:
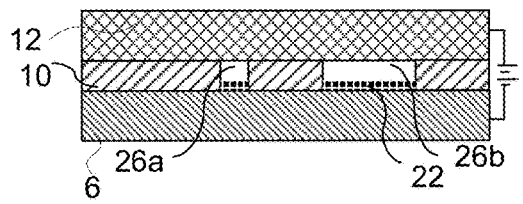
Figure 2C:
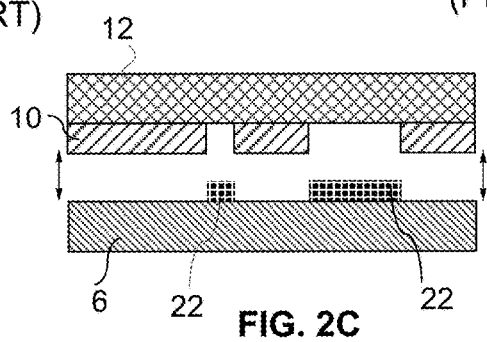
Figure 2D:
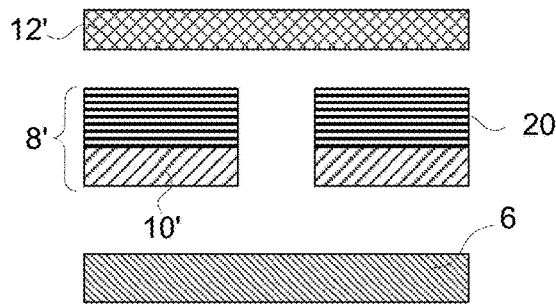
Figure 2E:
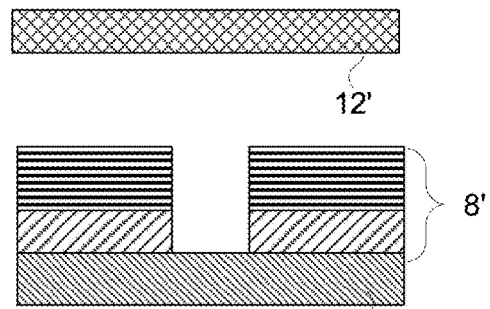
Figure 2F:
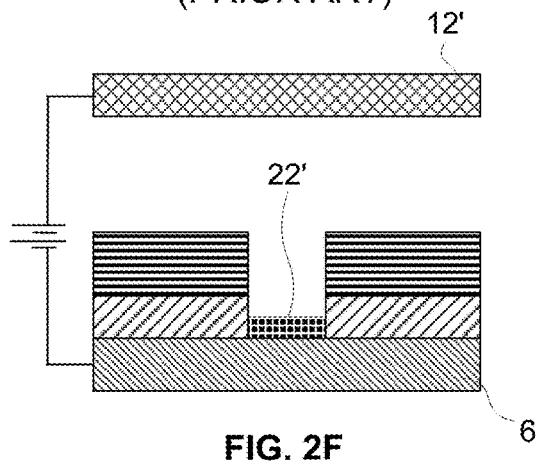
Figure 2G:
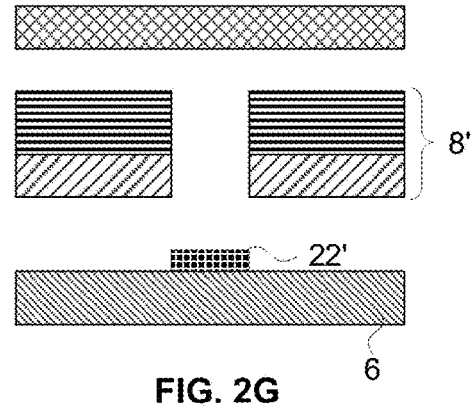
Figure 3A:
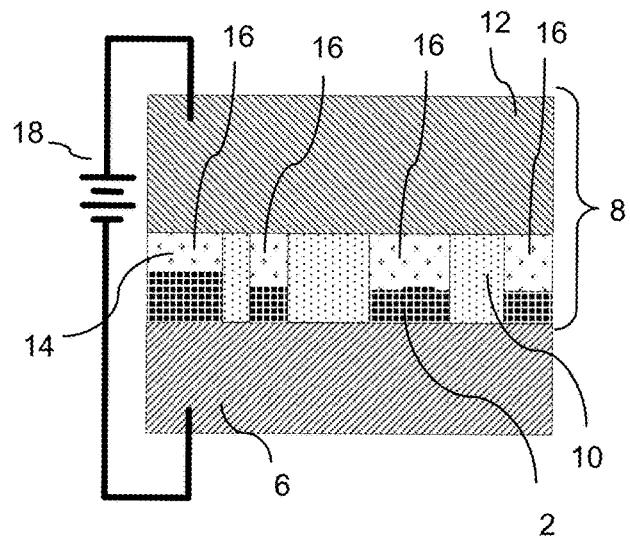
FIGS. 3A-3F schematically depict side views of various stages of an electrochemical fabrication process as applied to the formation of a particular structure where a sacrificial material is selectively deposited while a structural material is blanket deposited.
Figure 3B:
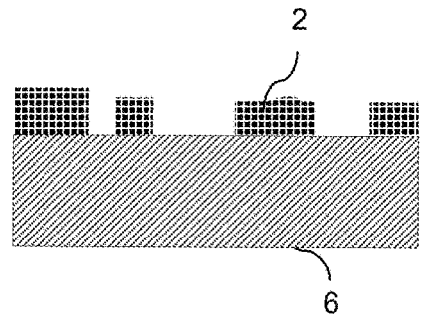
Figure 3C:
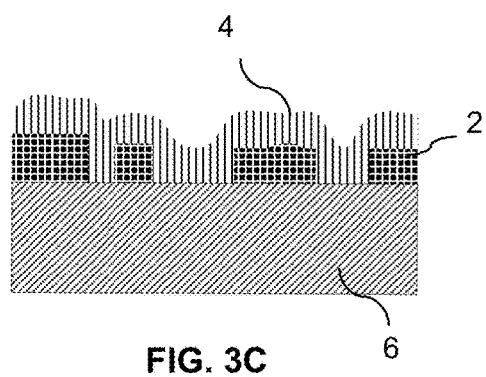
Figure 3D:
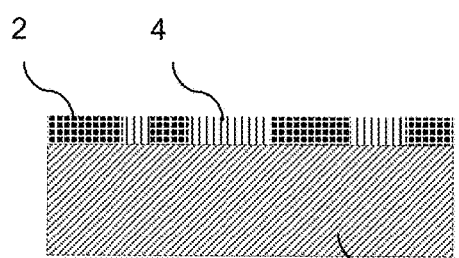
Figure 3E:
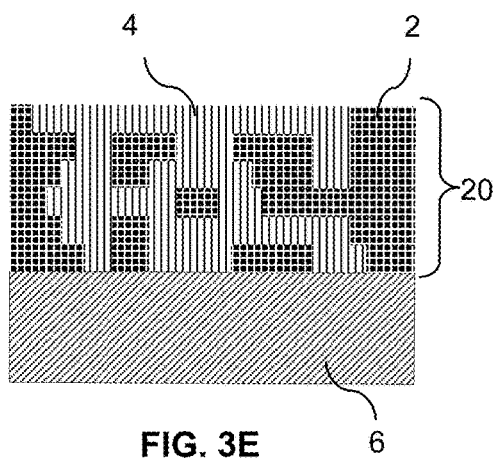
Figure 3F:
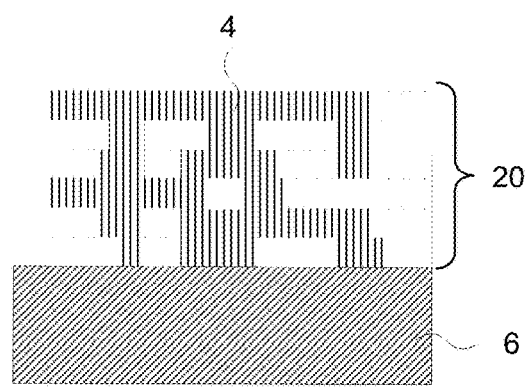
Figure 4A:
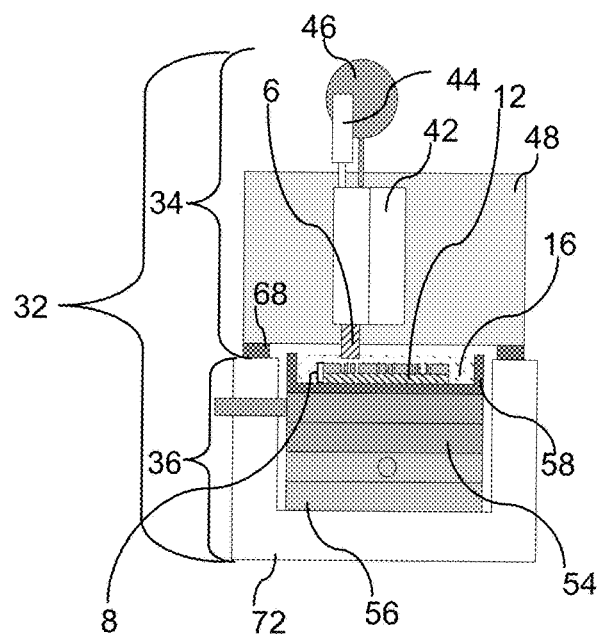
FIGS. 4A-4C schematically depict side views of various example subassemblies that may be used in manually implementing the electrochemical fabrication method depicted in FIGS. 3A-3F.
Figure 4B:
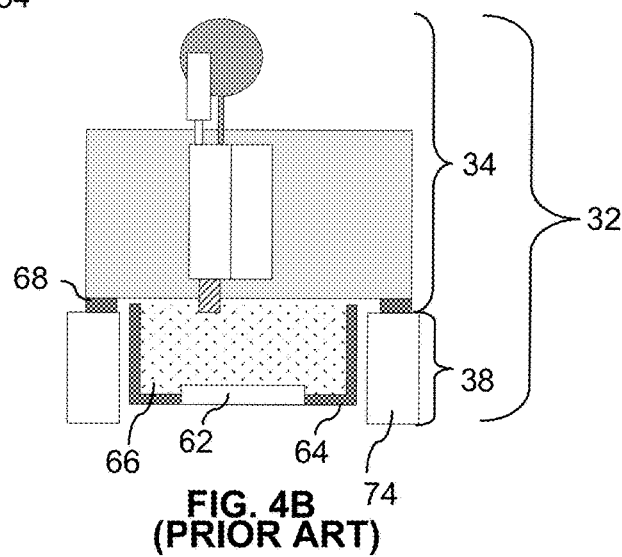
Figure 4C:
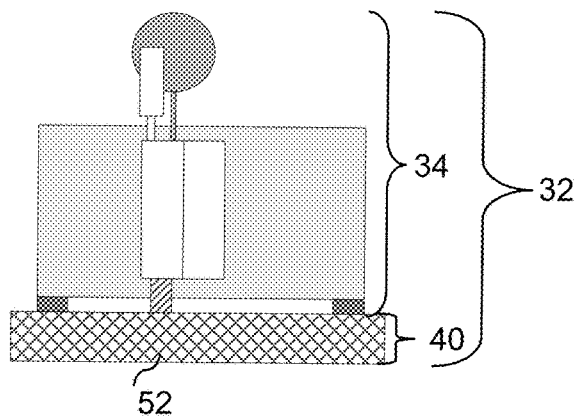
Figure 5A:
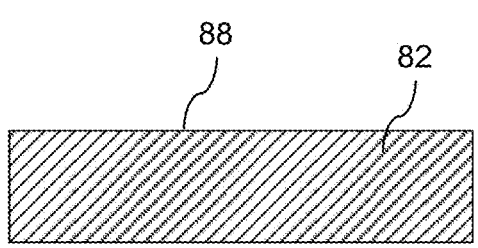
FIGS. 5A-5F schematically depict the formation of a first layer of a structure using adhered mask plating where the blanket deposition of a second material overlays both the openings between deposition locations of a first material and the first material itself
Figure 5B:
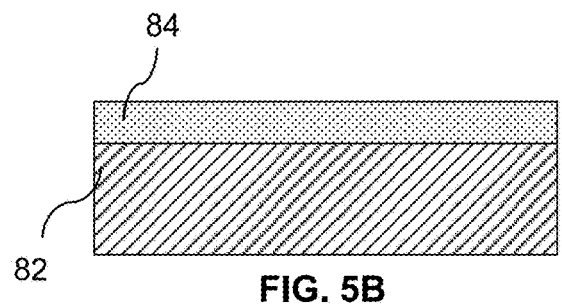
Figure 5C:
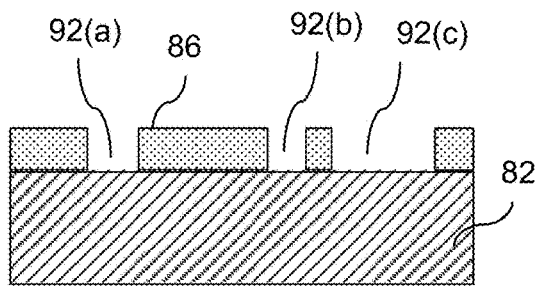
Figure 5D:
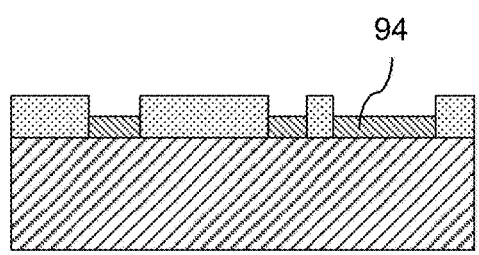
Figure 5E:
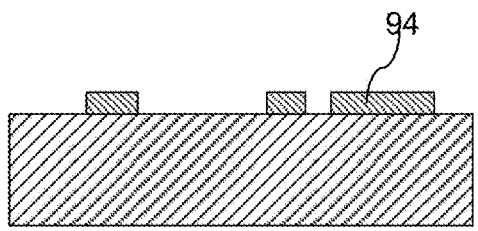
Figure 5F:
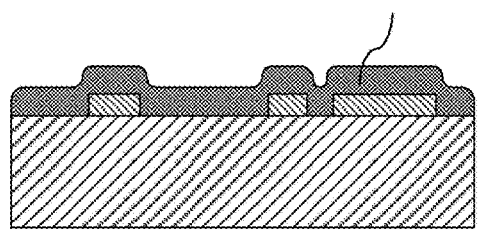
Figure 5G:
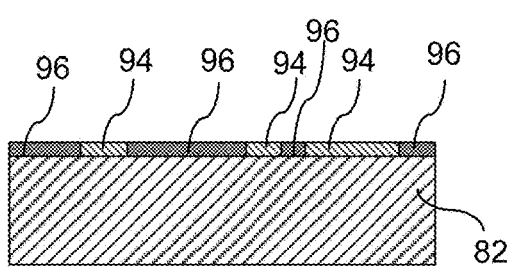
FIG. 5G depicts the completion of formation of the first layer resulting from planarization of the deposited materials to a desired level.
Figure 5H:
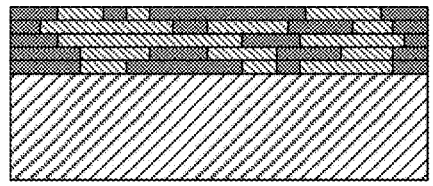
FIGS. 5H and 5I respectively depict the state of the process after formation of the multiple layers of the structure and after release of the structure from the sacrificial material.
Figure 5I:
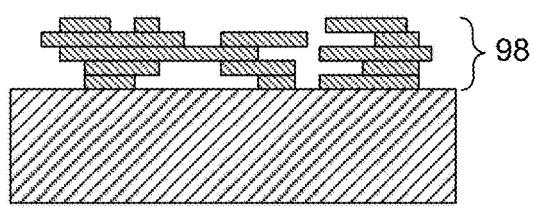
Figure 6D:
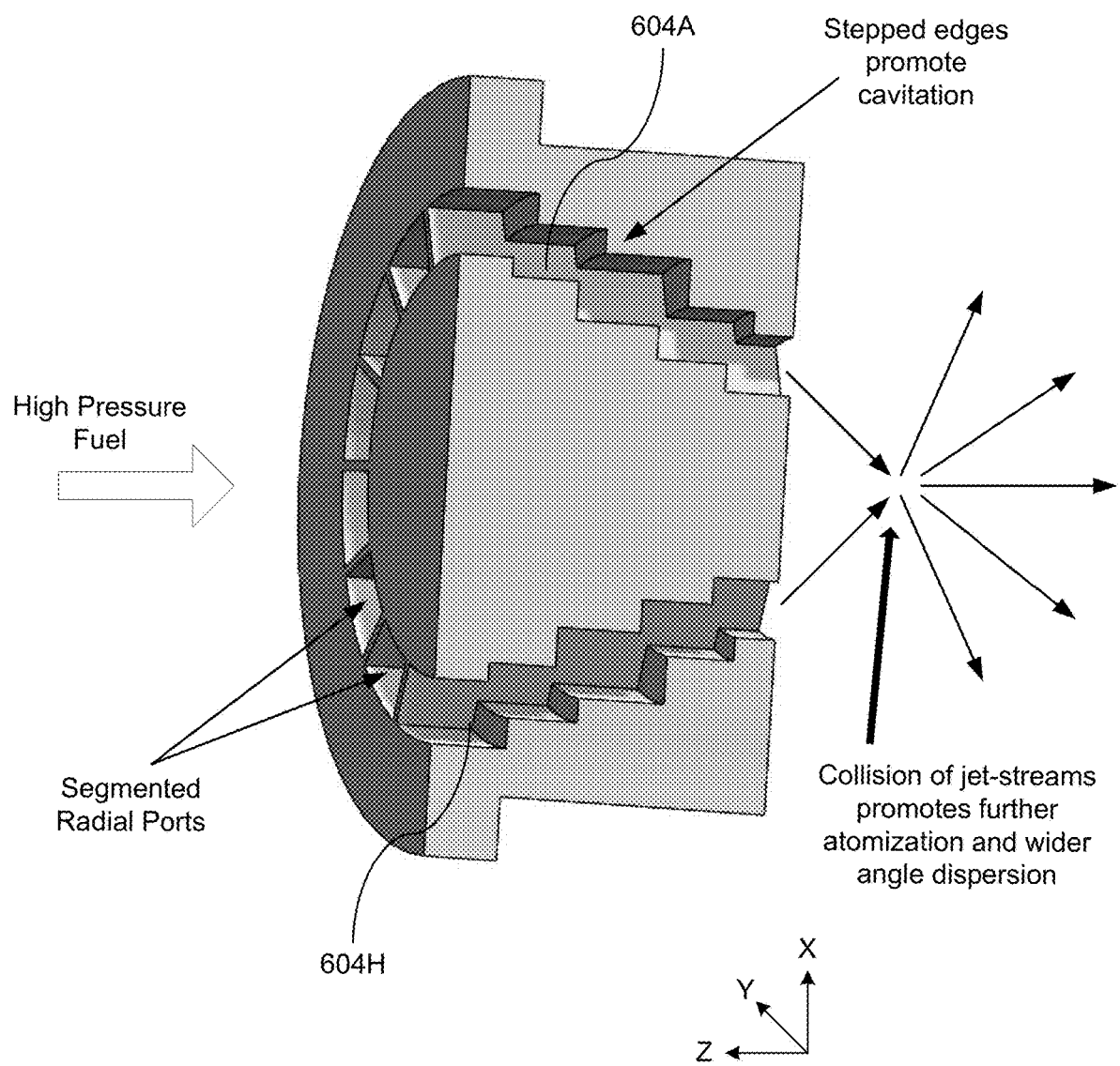
Figure 7C:
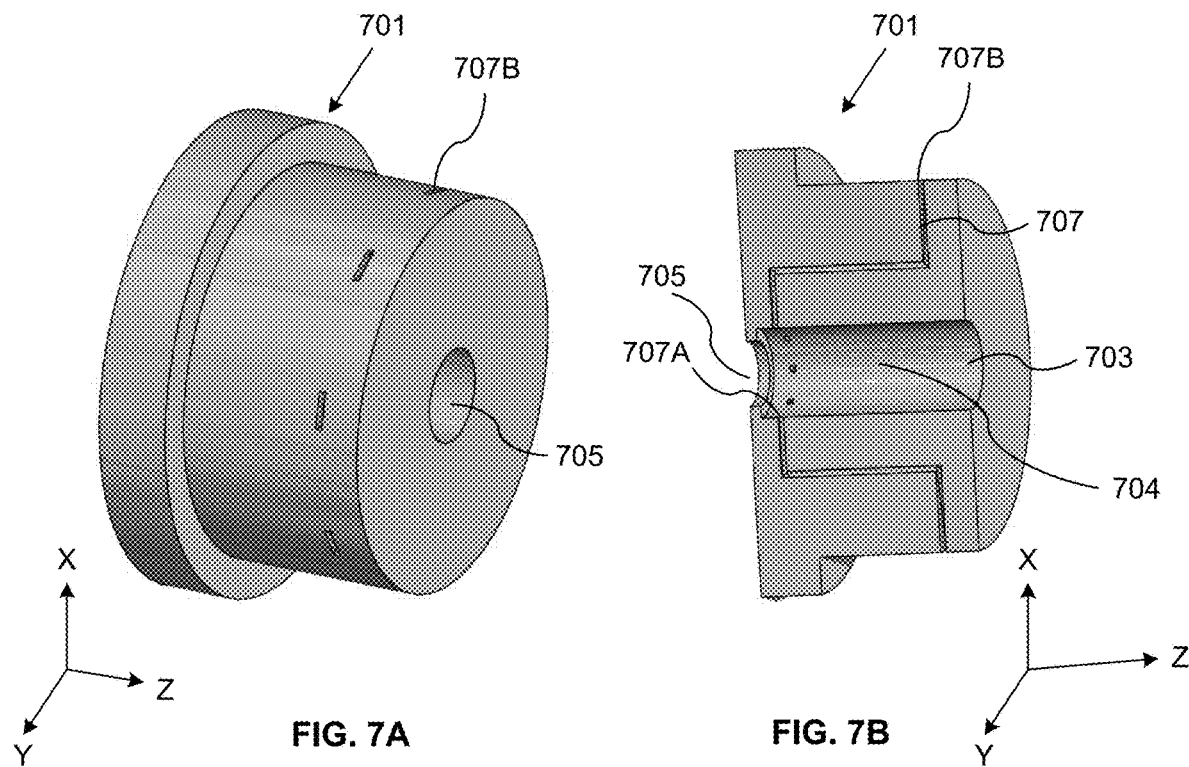
Figure 7C:
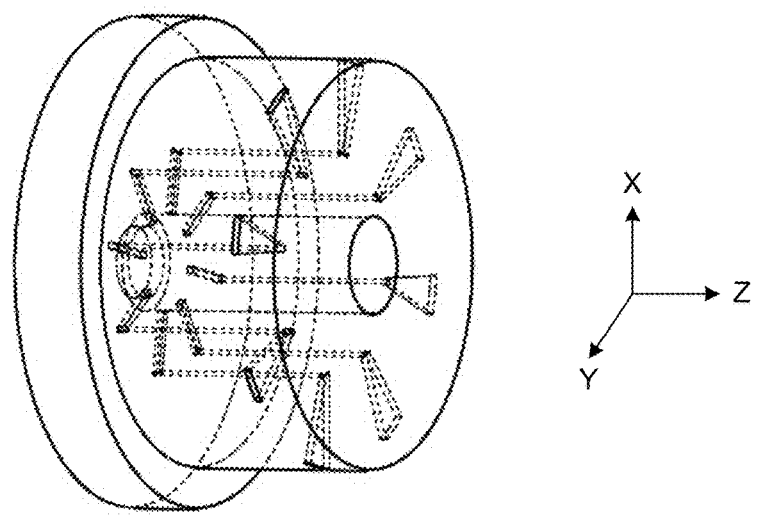
Figure 7D:
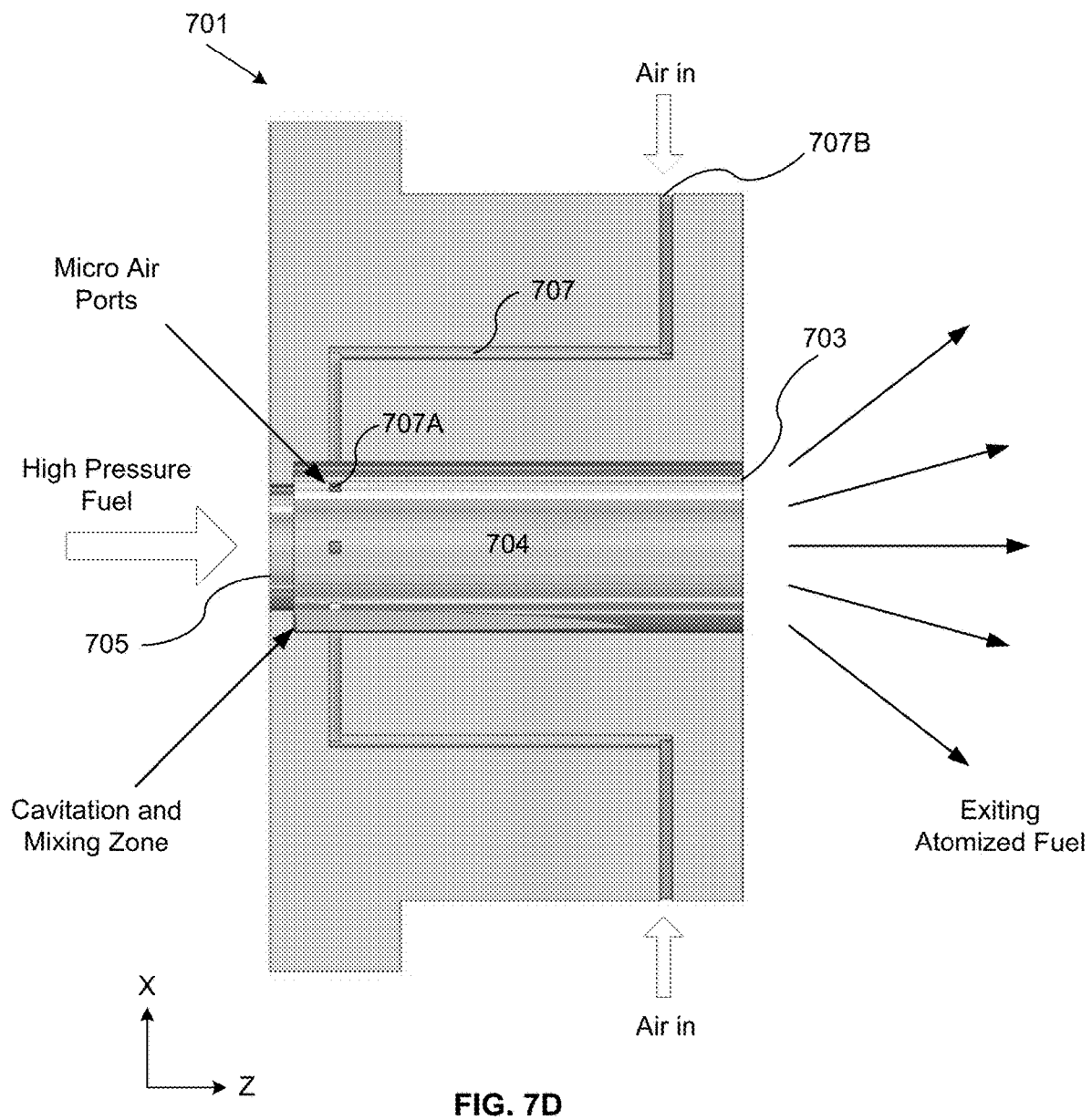
Figures 8A, 8B:
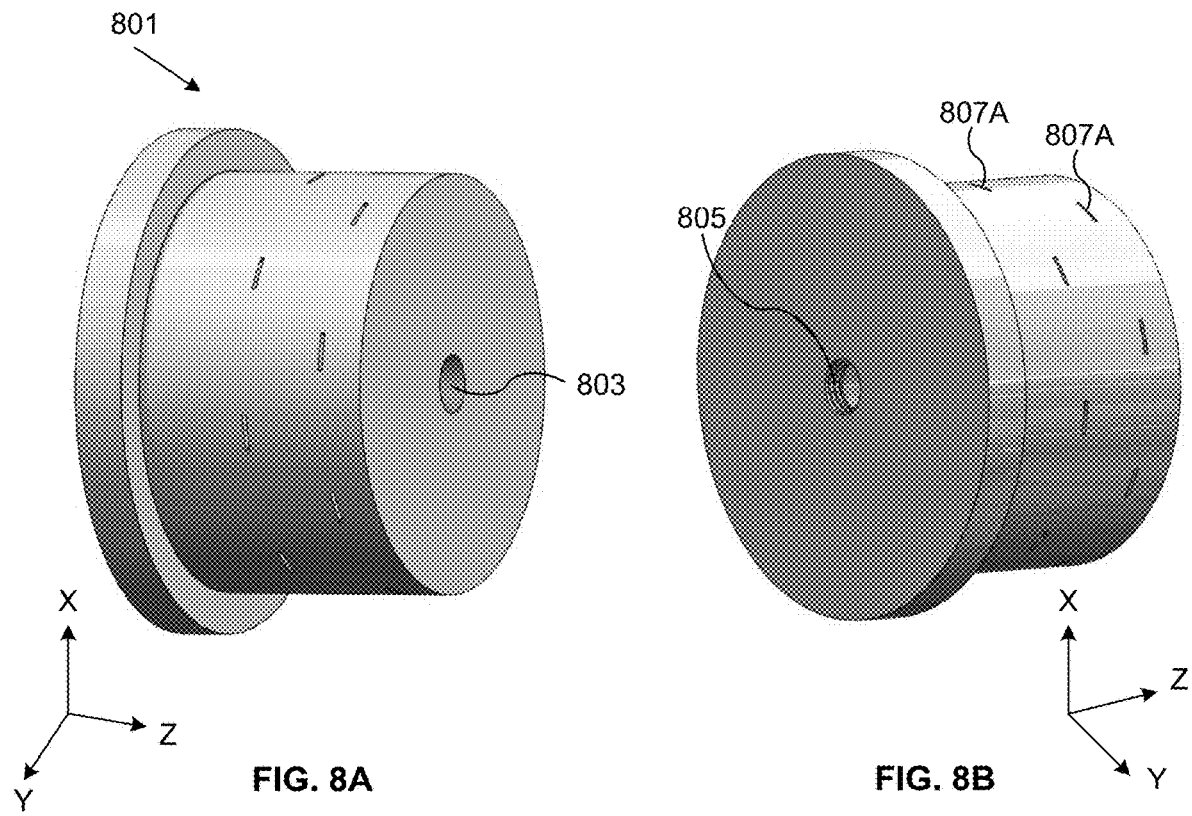
FIGS. 8A-8E provide various views of an example fuel injection nozzle which could form part of a fuel injector according to a third embodiment of the invention wherein the nozzle provides a single fuel outlet and single stepped inlet with a plurality of air mixing channels located near the inlet.
Figure 8C:
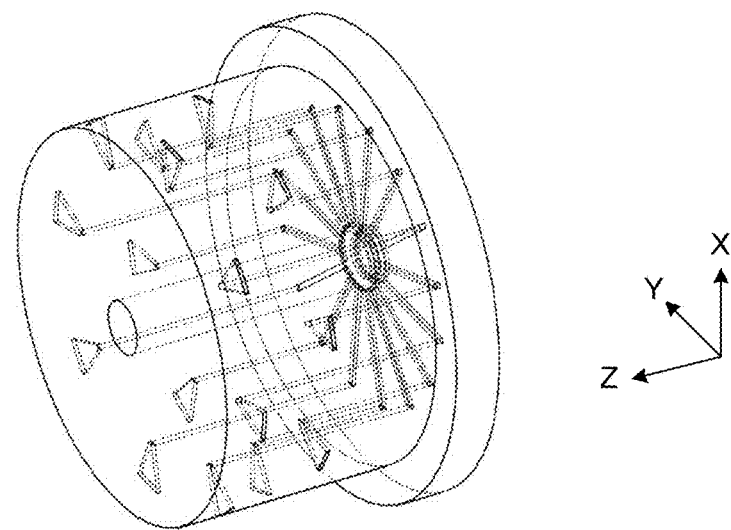
Figure 8D:
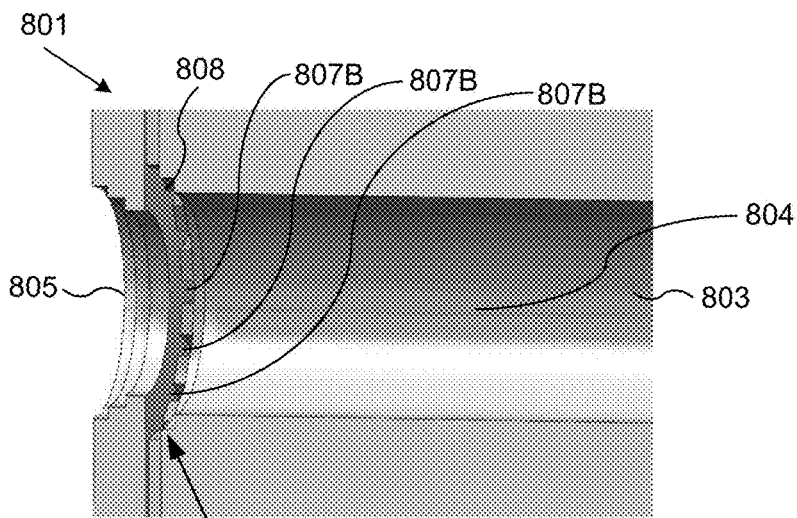
Figure 8E:
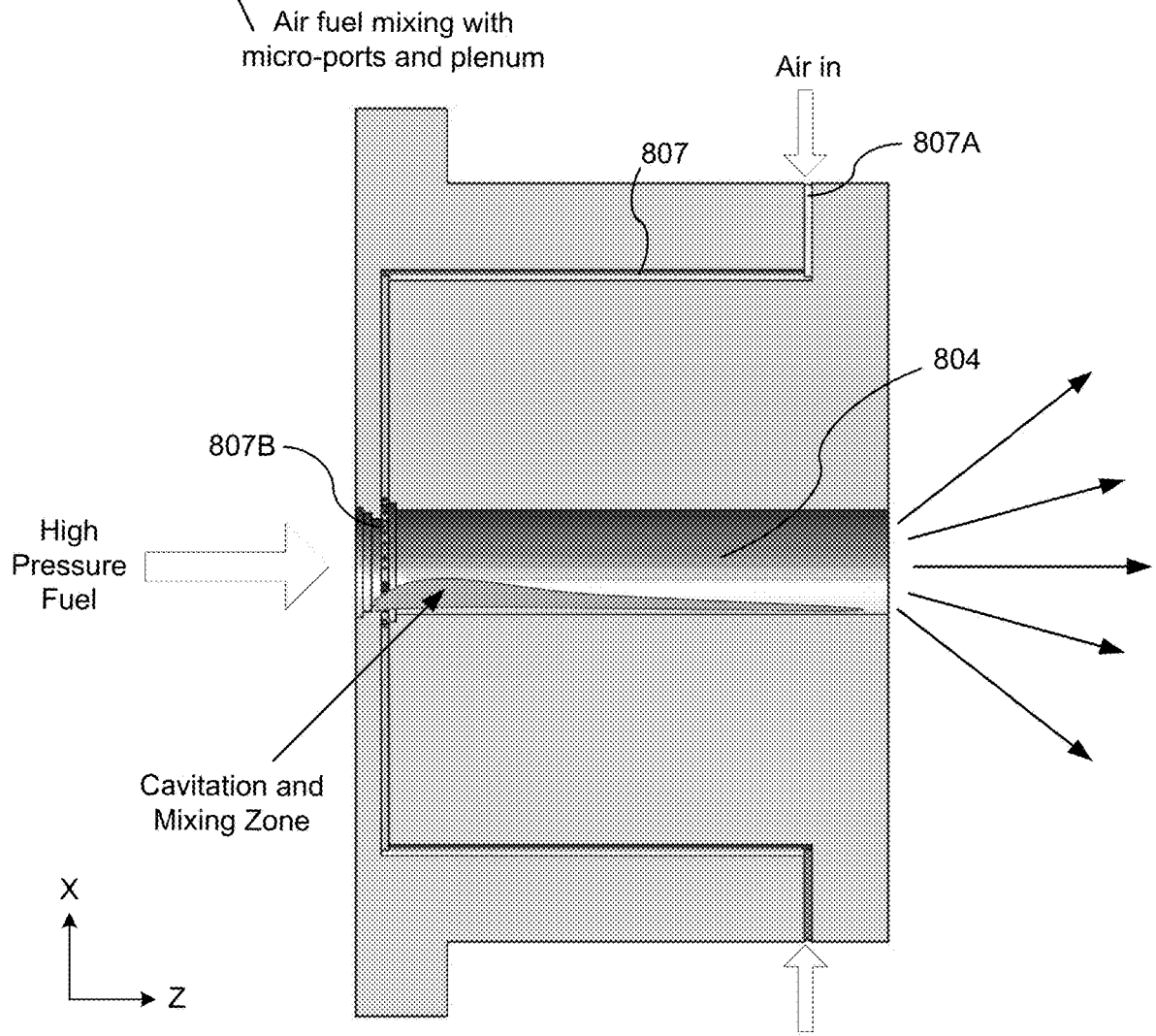

FIGS. 5A-5I illustrate side views of various states in an alternative multi-layer, multi-material electrochemical fabrication process. FIGS. 5A-5G illustrate various stages in the formation of a single layer of a multi-layer fabrication process where a second metal is deposited on a first metal as well as in openings in the first metal so that the first and second metal form part of the layer. In FIG. 5A a side view of a substrate 82 having a surface 88 is shown, onto which patternable photoresist 84 is cast as shown in FIG. 5B. In FIG. 5C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 5D a metal 94 (e.g. nickel) is shown as having been electroplated into the openings 92(a)-92(c). In FIG. 5E the photoresist has been removed (i.e. chemically stripped) from the substrate to expose regions of the substrate 82 which are not covered with the first metal 94. In FIG. 5F a second metal 96 (e.g. silver) is shown as having been blanket electroplated over the entire exposed portions of the substrate 82 (which is conductive) and over the first metal 94 (which is also conductive). FIG. 5G depicts the completed first layer of the structure which has resulted from the planarization of the first and second metals down to a height that exposes the first metal and sets a thickness for the first layer. In FIG. 5H the result of repeating the process steps shown in FIGS. 5B-5G several times to form a multi-layer structure is shown where each layer consists of two materials. For most applications, one of these materials is removed as shown in FIG. 5I to yield a desired 3-D structure 98 (e.g. component or device).

Various embodiments of various aspects of the invention are directed to formation of three-dimensional structures from materials some, or all, of which may be electrodeposited (as illustrated in FIGS. 2A-5I) or electroless deposited. Some of these structures may be formed from a single build level formed from one or more deposited materials while others are formed from a plurality of build layers each including at least two materials (e.g. two or more layers, more preferably five or more layers, and most preferably ten or more layers). In some embodiments, layer thicknesses may be as small as one micron or as large as fifty microns. In other embodiments, thinner layers may be used while in other embodiments, thicker layers may be used. In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable. In the present application meso-scale and millimeter-scale have the same meaning and refer to devices that may have one or more dimensions extending into the 0.5-20 millimeter range, or somewhat larger, and that may have features positioned with a precision in the 0.1-10 micron range and with minimum feature sizes on the order of 1-100 microns.

The various embodiments, alternatives, and techniques disclosed herein may form multi-layer structures using a single patterning technique on all layers or using different patterning techniques on different layers. For example, various embodiments of the invention may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Conformable contact masks, proximity masks, and non-conformable contact masks share the property that they are preformed and brought to, or in proximity to, a surface which is to be treated (i.e. the exposed portions of the surface are to be treated). These masks can generally be removed without damaging the mask or the surface that received treatment to which they were contacted, or located in proximity to. Adhered masks are generally formed on the surface to be treated (i.e. the portion of that surface that is to be masked) and bonded to that surface such that they cannot be separated from that surface without being completely destroyed or damaged beyond any point of reuse. Adhered masks may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels (i.e. regions that lie within the top and bottom boundary levels that define a different layer's geometric configuration). Such use of selective etching and interlaced material deposition in association with multiple layers is described in U.S. patent application Ser. No. 10/434,519, by Smalley, now U.S. Pat. No. 7,252,861, and entitled "Methods of and Apparatus for Electrochemically Fabricating Structures Via Interlaced Layers or Via Selective Etching and Filling of Voids" which is hereby incorporated herein by reference as if set forth in full.

Temporary substrates on which structures may be formed may be of the sacrificial-type (i.e. destroyed or damaged during separation of deposited materials to the extent they cannot be reused), non-sacrificial-type (i.e. not destroyed or excessively damaged, i.e. not damaged to the extent they may not be reused, e.g. with a sacrificial or release layer located between the substrate and the initial layers of a structure that is formed). Non-sacrificial substrates may be considered reusable, with little or no rework (e.g. replanarizing one or more selected surfaces or applying a release layer, and the like) though they may or may not be reused for a variety of reasons.

Definitions

This section of the specification is intended to set forth definitions for a number of specific terms that may be useful in describing the subject matter of the various embodiments of the invention. It is believed that the meanings of most if not all of these terms is clear from their general use in the specification but they are set forth hereinafter to remove any ambiguity that may exist. It is intended that these definitions be used in understanding the scope and limits of any claims that use these specific terms. As far as interpretation of the claims of this patent disclosure are concerned, it is intended that these definitions take precedence over any contradictory definitions or allusions found in any materials which are incorporated herein by reference.

"Build" as used herein refers, as a verb, to the process of building a desired structure (or part) or plurality of structures (or parts) from a plurality of applied or deposited materials which are stacked and adhered upon application or deposition or, as a noun, to the physical structure (or part) or structures (or parts) formed from such a process. Depending on the context in which the term is used, such physical structures may include a desired structure embedded within a sacrificial material or may include only desired physical structures which may be separated from one another or may require dicing and/or slicing to cause separation.

"Build axis" or "build orientation" is the axis or orientation that is substantially perpendicular to substantially planar levels of deposited or applied materials that are used in building up a structure. The planar levels of deposited or applied materials may be or may not be completely planar but are substantially so in that the overall extent of their cross-sectional dimensions are significantly greater than the height of any individual deposit or application of material (e.g. 100, 500, 1000, 5000, or more times greater). The planar nature of the deposited or applied materials may come about from use of a process that leads to planar deposits or it may result from a planarization process (e.g. a process that includes mechanical abrasion, e.g. lapping, fly cutting, grinding, or the like) that is used to remove material regions of excess height. Unless explicitly noted otherwise, "vertical" as used herein refers to the build axis or nominal build axis (e.g if the layers are not stacking with perfect registration) while "horizontal" or "lateral" refers to a direction that is parallel to the plane of the layers (i.e. the plane that is substantially perpendicular to the build axis). For convenience of terminology and without implying a particular physical build orientation, successive layers shall be considered to be added above previously formed layers and preceding layers will be considered to exist below later formed layers. For example, during electroplating actual build orientation may be up-facing vertical, horizontal, or at some other angle while during planarization actual build orientation may be horizontal, down-facing vertical, or at some other orientation but successive layers will still be considered to be formed on or above previously formed layers unless explicitly indicated otherwise.

"Build layer" or "layer of structure" as used herein does not refer to a deposit of a specific material but instead refers to a region of a build located between a lower boundary level and an upper boundary level which generally defines a single cross-section of a structure being formed or structures which are being formed in parallel. Depending on the details of the actual process used to form the structure, build layers are generally formed on and adhered to previously formed build layers. In some processes the boundaries between build layers are defined by planarization operations which result in successive build layers being formed on substantially planar upper surfaces of previously formed build layers. In some embodiments, the substantially planar upper surface of the preceding build layer may be textured to improve adhesion between the layers. In other build processes, openings may exist in or be formed in the upper surface of a previous but only partially formed build layer or build layers such that the openings in the previous build layer or build layers are filled with materials deposited in association with current build layer which will cause interlacing of build layers and material deposits. Such interlacing is described in U.S. patent application Ser. No. 10/434,519 now U.S. Pat. No. 7,252,861. This referenced application is incorporated herein by reference as if set forth in full. In most embodiments, a build layer includes at least one primary structural material and at least one primary sacrificial material. However, in some embodiments, two or more primary structural materials may be used without a primary sacrificial material (e.g. when one primary structural material is a dielectric and the other is a conductive material). In some embodiments, build layers are distinguishable from each other by the source of the data that is used to yield patterns of the deposits, applications, and/or etchings of material that form the respective build layers. For example, data descriptive of a structure to be formed which is derived from data extracted from different vertical levels of a data representation of the structure define different build layers of the structure. The vertical separation of successive pairs of such descriptive data may define the thickness of build layers associated with the data. As used herein, at times, "build layer" may be loosely referred simply as "layer". In many embodiments, deposition thickness of primary structural or sacrificial materials (i.e. the thickness of any particular material after it is deposited) is generally greater than the layer thickness and a net deposit thickness is set via one or more planarization processes which may include, for example, mechanical abrasion (e.g. lapping, fly cutting, polishing, and the like) and/or chemical etching (e.g. using selective or non-selective etchants). The lower boundary and upper boundary for a build layer may be set and defined in different ways. From a design point of view, they may be set based on a desired vertical resolution of the structure (which may vary with height). From a data manipulation point of view, the vertical layer boundaries may be defined as the vertical levels at which data descriptive of the structure is processed or the layer thickness may be defined as the height separating successive levels of cross-sectional data that dictate how the structure will be formed. From a fabrication point of view, depending on the exact fabrication process used, the upper and lower layer boundaries may be defined in a variety of different ways, for example, by planarization levels or effective planarization levels (e.g. lapping levels, fly cutting levels, chemical mechanical polishing levels, mechanical polishing levels, vertical positions of structural and/or sacrificial materials after relatively uniform etch back following a mechanical or chemical mechanical planarization process), for example, by levels at which process steps or operations are repeated, and at levels at which, at least theoretically, lateral extents of structural material can be changed to define new cross-sectional features of a structure.

"Layer thickness" is the height along the build axis between a lower boundary of a build layer and an upper boundary of that build layer.

"Planarization" is a process that tends to remove materials, above a desired plane, in a substantially non-selective manner such that all deposited materials are brought to a substantially common height or desired level (e.g. within 20%, 10%, 5%, or even 1% of a desired layer boundary level). For example, lapping removes material in a substantially non-selective manner, though some amount of recession of one material versus another material may occur (e.g. copper may recess relative to nickel). Planarization may occur primarily via mechanical means, e.g. lapping, grinding, fly cutting, milling, sanding, abrasive polishing, frictionally induced melting, other machining operations, or the like (i.e. mechanical planarization). Mechanical planarization may be followed or preceded by thermally induced planarization (e.g. melting) or chemically induced planarization (e.g. etching). Planarization may occur primarily via a chemical and/or electrical means (e.g. chemical etching, electrochemical etching, or the like). Planarization may occur via a simultaneous combination of mechanical and chemical etching (e.g. chemical mechanical polishing (CMP)).

"Structural material" as used herein refers to a material that remains part of the structure when put into use.

[99] "Supplemental structural material" as used herein refers to a material that forms part of the structure when the structure is put to use but is not added as part of the build layers but instead is added to a plurality of layers simultaneously (e.g. via one or more coating operations that applies the material, selectively or in a blanket fashion, to one or more surfaces of a desired build structure that has been released from a sacrificial material).

"Primary structural material" as used herein is a structural material that forms part of a given build layer and which is typically deposited or applied during the formation of that build layer and which makes up more than 20% of the structural material volume of the given build layer. In some embodiments, the primary structural material may be the same on each of a plurality of build layers or it may be different on different build layers. In some embodiments, a given primary structural material may be formed from two or more materials by the alloying or diffusion of the two or more materials to form a single material. The structural material on a given layer may be a single primary structural material or may be multiple primary structural materials and may further include one or more secondary structural materials.

"Secondary structural material" as used herein is a structural material that forms part of a given build layer and is typically deposited or applied during the formation of the given build layer but is not a primary structural material as it individually accounts for only a small volume of the structural material associated with the given layer. A secondary structural material will account for less than 20% of the volume of the structural material associated with the given layer. In some preferred embodiments, each secondary structural material may account for less than 10%, 5%, or even 2% of the volume of the structural material associated with the given layer. Examples of secondary structural materials may include seed layer materials, adhesion layer materials, barrier layer materials (e.g. diffusion barrier material), and the like. These secondary structural materials are typically applied to form coatings having thicknesses less than 2 microns, 1 micron, 0.5 microns, or even 0.2 microns. The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Functional structural material" as used herein is a structural material that would have been removed as a sacrificial material but for its actual or effective encapsulation by other structural materials. Effective encapsulation refers, for example, to the inability of an etchant to attack the functional structural material due to inaccessibility that results from a very small area of exposure and/or due to an elongated or tortuous exposure path. For example, large (10,000 μm$^2$) but thin (e.g. less than 0.5 microns) regions of sacrificial copper sandwiched between deposits of nickel may define regions of functional structural material depending on ability of a release etchant to remove the sandwiched copper.

"Stand alone structural material" or "genuine structural material" is a structural material that is resistive or not substantially removed by a sacrificial material etchant that is used in separating sacrificial and structural materials.

"Sacrificial material" is material that forms part of a build layer but is not a structural material. Sacrificial material on a given build layer is separated from structural material on that build layer after formation of that build layer is completed and more generally is removed from a plurality of layers after completion of the formation of the plurality of layers during a "release" process that removes the bulk of the sacrificial material or materials. In general sacrificial material is located on a build layer during the formation of one, two, or more subsequent build layers and is thereafter removed in a manner that does not lead to a planarized surface. Materials that are applied primarily for masking purposes, i.e. to allow subsequent selective deposition or etching of a material, e.g. photoresist that is used in forming a build layer but does not form part of the build layer) or that exist as part of a build for less than one or two complete build layer formation cycles are not considered sacrificial materials as the term is used herein but instead shall be referred to as masking materials or as temporary materials. These separation processes are sometimes referred to as release processes and may or may not involve the separation of structural material from a build substrate. In many embodiments, sacrificial material within a given build layer is not removed until all build layers making up the three-dimensional structure have been formed. Of course sacrificial material may be, and typically is, removed from above the upper level of a current build layer during planarization operations during the formation of the current build layer. Sacrificial material is typically removed via a chemical etching operation but in some embodiments may be removed via a melting operation or electrochemical etching operation. In typical structures, the removal of the sacrificial material (i.e. release of the structural material from the sacrificial material) does not result in planarized surfaces but instead results in surfaces that are dictated by the boundaries of structural materials located on each build layer. Sacrificial materials are typically distinct from structural materials by having different properties therefrom (e.g. chemical etchability, hardness, melting point, etc.) but in some cases, as noted previously, what would have been a sacrificial material may become a structural material by its actual or effective encapsulation by other structural materials. Similarly, structural materials may be used to form sacrificial structures that are separated from a desired structure during a release process via the sacrificial structures being only attached to sacrificial material or potentially by dissolution of the sacrificial structures themselves using a process that is insufficient to reach structural material that is intended to form part of a desired structure. It should be understood that in some embodiments, small amounts of structural material may be removed, after or during release of sacrificial material. Such small amounts of structural material may have been inadvertently formed due to imperfections in the fabrication process or may result from the proper application of the process but may result in features that are less than optimal (e.g. layers with stairs steps in regions where smooth sloped surfaces are desired. In such cases, the volume of structural material removed is typically minuscule compared to the amount that is retained, and thus such removal is ignored when labeling materials as sacrificial or structural. Sacrificial materials are typically removed by a dissolution process, or the like, that destroys the geometric configuration of the sacrificial material as it existed on the build layers. In many embodiments, the sacrificial material is a conductive material such as a metal. As will be discussed hereafter, masking materials, though typically sacrificial in nature, are not termed sacrificial materials herein unless they meet the required definition of sacrificial material.

"Supplemental sacrificial material" as used herein refers to a material that does not form part of the structure when the structure is put to use and is not added as part of the build layers but instead is added to a plurality of layers simultaneously (e.g. via one or more coating operations that applies the material, selectively or in a blanket fashion, to one or more surfaces of a desired build structure that has been released from an initial sacrificial material). This supplemental sacrificial material will remain in place for a period of time and/or during the performance of certain post layer formation operations, e.g. to protect the structure that was released from a primary sacrificial material, but will be removed prior to putting the structure to use.

"Primary sacrificial material" as used herein is a sacrificial material that is located on a given build layer and which is typically deposited or applied during the formation of that build layer and which makes up more than 20% of the sacrificial material volume of the given build layer. In some embodiments, the primary sacrificial material may be the same on each of a plurality of build layers or may be different on different build layers. In some embodiments, a given primary sacrificial material may be formed from two or more materials by the alloying or diffusion of the two or more materials to form a single material. The sacrificial material on a given layer may be a single primary sacrificial material or may be multiple primary sacrificial materials and may further include one or more secondary sacrificial materials.

"Secondary sacrificial material" as used herein is a sacrificial material that is located on a given build layer and is typically deposited or applied during the formation of the build layer but is not a primary sacrificial materials as it individually accounts for only a small volume of the sacrificial material associated with the given layer. A secondary sacrificial material will account for less than 20% of the volume of the sacrificial material associated with the given layer. In some preferred embodiments, each secondary sacrificial material may account for less than 10%, 5%, or even 2% of the volume of the sacrificial material associated with the given layer. Examples of secondary structural materials may include seed layer materials, adhesion layer materials, barrier layer materials (e.g. diffusion barrier material), and the like. These secondary sacrificial materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Adhesion layer", "seed layer", "barrier layer", and the like refer to coatings of material that are thin in comparison to the layer thickness and thus generally form secondary structural material portions or sacrificial material portions of some layers. Such coatings may be applied uniformly over a previously formed build layer, they may be applied over a portion of a previously formed build layer and over patterned structural or sacrificial material existing on a current (i.e. partially formed) build layer so that a non-planar seed layer results, or they may be selectively applied to only certain locations on a previously formed build layer. In the event such coatings are non-selectively applied, selected portions may be removed (1) prior to depositing either a sacrificial material or structural material as part of a current layer or (2) prior to beginning formation of the next layer or they may remain in place through the layer build up process and then etched away after formation of a plurality of build layers.

"Masking material" is a material that may be used as a tool in the process of forming a build layer but does not form part of that build layer. Masking material is typically a photopolymer or photoresist material or other material that may be readily patterned. Masking material is typically a dielectric. Masking material, though typically sacrificial in nature, is not a sacrificial material as the term is used herein. Masking material is typically applied to a surface during the formation of a build layer for the purpose of allowing selective deposition, etching, or other treatment and is removed either during the process of forming that build layer or immediately after the formation of that build layer.

"Multi-layer structures" are structures formed from multiple build layers of deposited or applied materials.

"Multi-layer three-dimensional (or 3D or 3-D) structures" are multilayer structures that have the structural material portion of at least two layers where one has a structural material portion that does not overlap a structural material portion of the other.

"Complex multi-layer three-dimensional (or 3D or 3-D) structures" are multi-layer three-dimensional structures formed from at least three layers where when considering a single structure, a line may be defined that hypothetically extends vertically through at least some portion of the build layers of the structure and extends from structural material through sacrificial material and back through structural material (these might be termed vertically complex multi-layer three-dimensional structures). Alternatively, complex multilayer three-dimensional structures may be defined as multi-layer three-dimensional structures formed from at least two layers where, when considering a single structure, a line may be defined that hypothetically extends horizontally through at least some portion of a build layer of the structure that will extend from structural material through sacrificial material and back through structural material (these might be termed horizontally complex multi-layer three-dimensional structures). Worded another way, in complex multi-layer three-dimensional structures, a vertically or horizontally extending hypothetical line will extend from one of structural material to void (when the sacrificial material is removed) and then back to structural material as the line is traversed along at least a portion of the line.

"Moderately complex multilayer three-dimensional (or 3D or 3-D) structures" are complex multilayer 3D structures for which, when considering a single structure, the alternating of structure void structure not only exists along one of a vertically or horizontally extending line but along lines extending both vertically and horizontally.

"Highly complex multilayer (or 3D or 3-D) structures" are complex multi-layer 3D structures for which, when considering a single structure, the structure-to-void-to-structure alternating occurs not only once but occurs a plurality of times along a definable horizontally and/or vertically extending line.

"Up-facing feature" is an element dictated by the cross-sectional data for a given build layer "n" and a next build layer "n+1" that is to be formed from a given material that exists on the build layer "n" but does not exist on the immediately succeeding build layer "n+1". For convenience the term "up-facing feature" will apply to such features regardless of the build orientation.

"Down-facing feature" is an element dictated by the cross-sectional data for a given build layer "n" and a preceding build layer "n−1" that is to be formed from a given material that exists on build layer "n" but does not exist on the immediately preceding build layer "n−1". As with up-facing features, the term "down-facing feature" shall apply to such features regardless of the actual build orientation.

"Continuing region" is the portion of a given build layer "n" that is dictated by the cross-sectional data for the given build layer "n", a next build layer "n+1" and a preceding build layer "n−1" that is neither up-facing nor down-facing for the build layer "n".

"Minimum feature size" or "MFS" refers to a necessary or desirable spacing between structural material elements on a given layer that are to remain distinct in the final device configuration. If the minimum feature size is not maintained for structural material elements on a given layer, the fabrication process may result in structural material inadvertently bridging what were intended to be two distinct elements (e.g. due to masking material failure or failure to appropriately fill voids with sacrificial material during formation of the given layer such that during formation of a subsequent layer structural material inadvertently fills the void). More care during fabrication can lead to a reduction in minimum feature size. Alternatively, a willingness to accept greater losses in productivity (i.e. lower yields) can result in a decrease in the minimum feature size. However, during fabrication for a given set of process parameters, inspection diligence, and yield (successful level of production) a minimum design feature size is set in one way or another. The above described minimum feature size may more appropriately be termed minimum feature size of gaps or voids (e.g. the MFS for sacrificial material regions when sacrificial material is deposited first). Conversely, a minimum feature size for structure material regions (minimum width or length of structural material elements) may be specified. Depending on the fabrication method and order of deposition of structural material and sacrificial material, the two types of minimum feature sizes may be the same or different. In practice, for example, using electrochemical fabrication methods as described herein, the minimum features size on a given layer may be roughly set to a value that approximates the layer thickness used to form the layer and it may be considered the same for both structural and sacrificial material widths. In some more rigorously implemented processes (e.g. with higher examination regiments and tolerance for rework), it may be set to an amount that is 80%, 50%, or even 30% of the layer thickness. Other values or methods of setting minimum feature sizes may be used. Worded another way, depending on the geometry of a structure, or plurality of structures, being formed, the structure, or structures, may include elements (e.g. solid regions) which have dimensions smaller than a first minimum feature size and/or have spacings, voids, openings, or gaps (e.g. hollow or empty regions) located between elements, where the spacings are smaller than a second minimum feature size where the first and second minimum feature sizes may be the same or different and where the minimum feature sizes represent lower limits at which formation of elements and/or spacing can be reliably formed. Reliable formation refers to the ability to accurately form or produce a given geometry of an element, or of the spacing between elements, using a given formation process, with a minimum acceptable yield. The minimum acceptable yield may depend on a number of factors including: (1) number of features present per layer, (2) numbers of layers, (3) the criticality of the successful formation of each feature, (4) the number and severity of other factors effecting overall yield, and (5) the desired or required overall yield for the structures or devices themselves. In some circumstances, the minimum size may be determined by a yield requirement per feature which is as low as 70%, 60%, or even 50%. While in other circumstances the yield requirement per feature may be as high as 90%, 95%, 99%, or even higher. In some circumstances (e.g. in producing a filter element) the failure to produce a certain number of desired features (e.g. 20-40% failure may be acceptable while in an electrostatic actuator the failure to produce a single small space between two moveable electrodes may result in failure of the entire device. The MFS, for example, may be defined as the minimum width of a narrow sacrificial element (e.g. photoresist element or sacrificial material element) or structural element (e.g. structural material element) that may be reliably formed (e.g. 90-99.9 times out of 100) which is either independent of any wider structures or has a substantial independent length (e.g. 200-1000 microns) before connecting to a wider region.

"Sub-layer" as used herein refers to a portion of a build layer that typically includes the full lateral extents of that build layer but only a portion of its height. A sub-layer is usually a vertical portion of build layer that undergoes independent processing compared to another sub-layer of that build layer. As used herein, use of a sub-layer in the formation of a layer requires use of at least a second sub-layer in formation of that layer and as such, the sub-layers shall be numbered (e.g. first, second, etc., depending on their order of formation) and the layer of which they form a part may be referred to a as a "compound layer" to avoid confusion with normal layer build up processes as set forth herein.

Fuel Injector Nozzles, Assemblies, and Methods

FIGS. 6A-6D provide an example fuel injection nozzle 601 which could form part of a fuel injector according to a first embodiment of the invention wherein the nozzle provides a plurality of inlets 603A-603P forming a relative large (i.e. having a first diameter, $D_1$) segmented, cylindrical fuel inlet region which extends to a smaller second diameter $D_o$ segmented cylindrical outlet, with outlets 605A-605P via passages 604A-604P with each formed form a series of stepped levels such that the exiting fuel is ejected to a fuel collision region or focal point that is extended from the distal end of the nozzle by a desired amount. In the embodiment of FIGS. 6A-6D, the nozzle is fabricated from a plurality of layers stacked along the Z-axis.

Numerous variations of the embodiment of FIGS. 6A-6D are possible and include, for example: (1) use of a different number of baffles to form a different number of channels or segments, (2) instead of using arcuate individual passage configurations, other configurations are possible including for example, use of layer-wise circular configurations, hexagonal configurations, octagonal configurations, elliptical configurations, elliptical configurations or other configurations that tend to provide more uniform cross-sectional configurations along an axis of orientation of the passages from layer to layer, (3) use of a different number of layers in transitioning from the inlet region (i.e. proximal end of the nozzle) to the outlet region (i.e. distal end of the nozzle), (4) variations in the heights of the steps, (5) formation of individual steps using one layer or multiple stacked layers, (6) inversion of the fluid flow direction and or the position of the retention/sealing feature, (7) instead of using a single circular injector array, a plurality of such arrays may be used with each having a different focal point and/or a different focal length, (8) patterned arrays other than circular arrays, e.g. square, elliptical, other polygon patterns that direct fluid in a desired pattern that may or may not have single focal point or any focal point at all, (9) inclusion of air or oxygen flow passages; (10) use of the nozzle with distinct layer-to-layer (i.e. in a layer stacking direction, e.g. the Z-direction) or inter layer stair steps (i.e. discontinuities formed within the patterning of individual layers and existing within X-Y dimensions of the cross-section of a layer) to cause turbulence or break up of laminar flow to aid in creating smaller fuel particles or droplets; and/or (11) reduction in layer discontinuities by smoothing (e.g. removal by abrasive fluid flow or non-homogeneous electro-etching or deposition and solidification of a stair-step filling material) of interlayer protrusions that result from the quantization of build levels associated with planar-layer-by-planar-layer fabrication methods.

FIGS. 7A-7D provide various views of an example fuel injection nozzle 701 which could form part of a fuel injector according to a second embodiment of the invention wherein the nozzle provides a single fuel outlet 703 and single inlet 705 with a plurality of air injection channels 707 with outlet locations 707A (into passage 704) located near the fuel inlet 705 and inlet locations 707B located closer to fuel outlet to provide enhanced cavitation of fuel, break up of fuel, and/or mixing of fuel and air prior to injection (i.e. dispensing from nozzle).

Numerous alternative exist to the embodiment of FIGS. 7A-7D and include the various alternatives noted for FIGS. 6A-6D and additionally include, for example: (1) use of a different number of air passages for providing air to the fuel flow channel, (2) different locations for the air passages, (3) different shaped air inlets, outlets, and passage configurations, (4) different orientations of air passage to fuel channel interfaces from perpendicular, as shown, to nearly tangential, (5) use of the Venturi effect to draw air or oxygen into the injector, (6) the use of forced air or oxygen flow through the passages, and/or (7) use of air inlets that provide air, from air sources external to a fuel injection chamber.

FIGS. 8A-8E provide various views of an example fuel injection nozzle 801 which could form part of a fuel injector according to a third embodiment of the invention wherein the nozzle provides a single fuel outlet 803 and single stepped inlet 805 with a plurality of air passages 807 that have inlets 807A and provide mixing or end locations 807B located near the inlet that feed air into a plenum 808.

Similar alternatives exist to the embodiment of FIGS. 8A-8E as noted above for FIGS. 7A-7D.

Figure 9A:
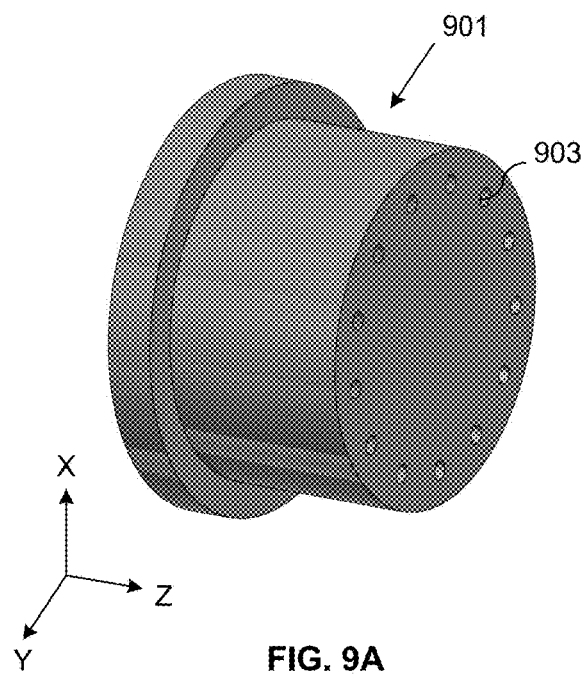
FIGS. 9A-9C provide various views of an example fuel injection nozzle which could form part of a fuel injector according to a fourth embodiment of the invention wherein the nozzle provides a plurality of circular fuel inlets that connect one-to-one to outlets via straight and uniformly spaced and sized channels that have a radially expanding configuration (i.e. are angled for outward dispersion of fuel) wherein the channels may have cross-sectional diameters smaller than 50, 40, 30, 20, and/or even 10 ums (i.e. microns).
Figure 9B:
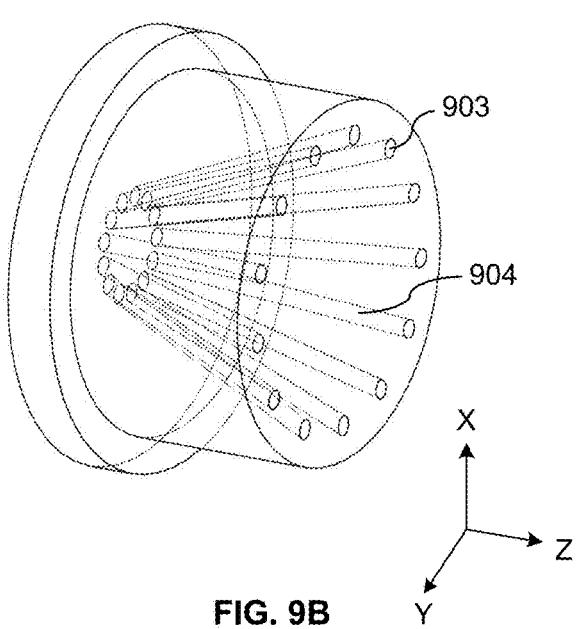
Figure 9C:
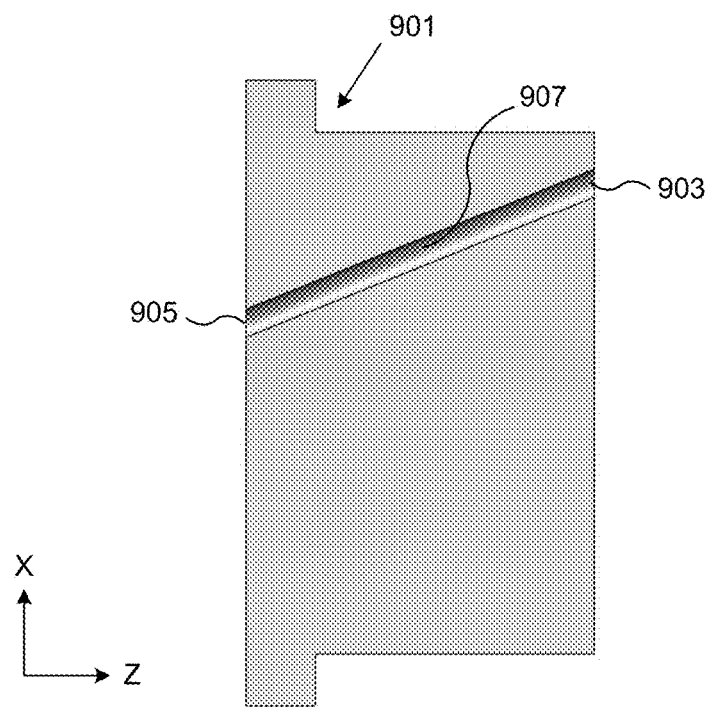
Figure 10A:
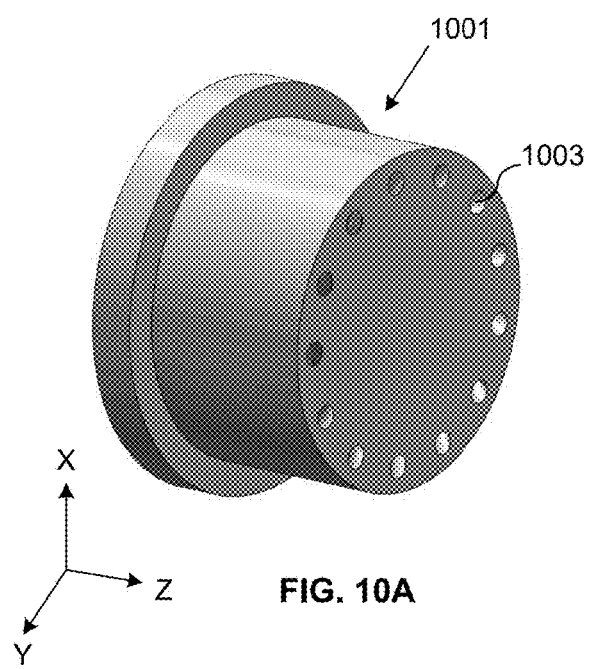
FIGS. 10A-10D provide various views of an example fuel injection nozzle which could form part of a fuel injector according to a fifth embodiment of the invention wherein the nozzle provides a plurality of circular fuel inlets that connect one-to-one to outlets via curved (e.g. spiraling) and uniformly spaced and sized channels that have a radially expanding configuration (i.e. are angled for outward dispersion of fuel) wherein the channels may have cross-sectional diameters smaller than 50, 40, 30, 20, and/or even 10 ums (i.e. microns).
Figure 10B:
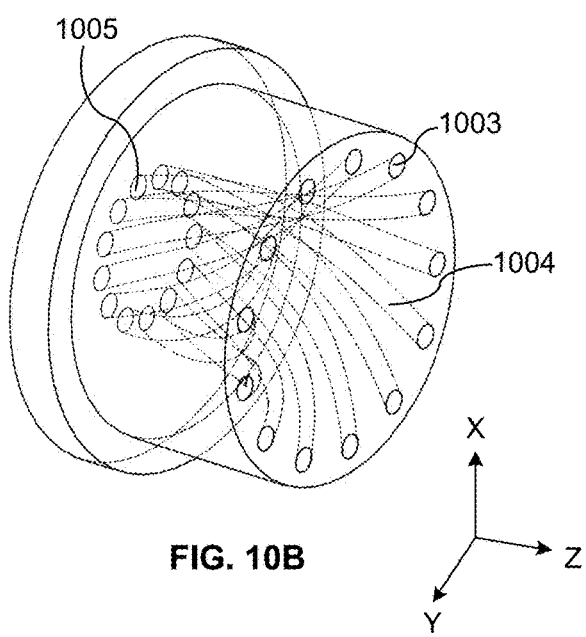
Figure 10C:
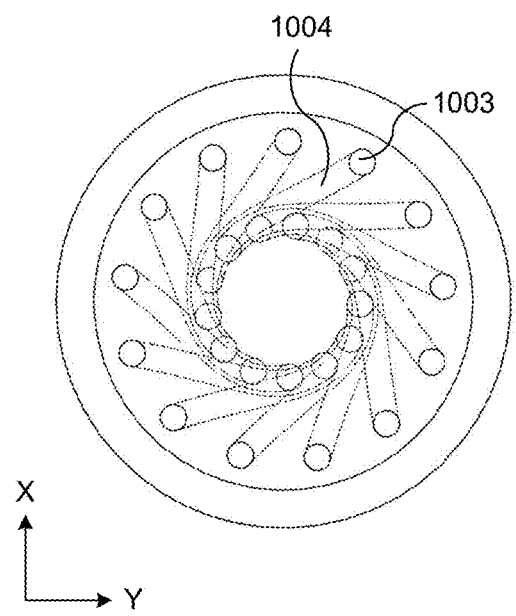
Figure 10D:
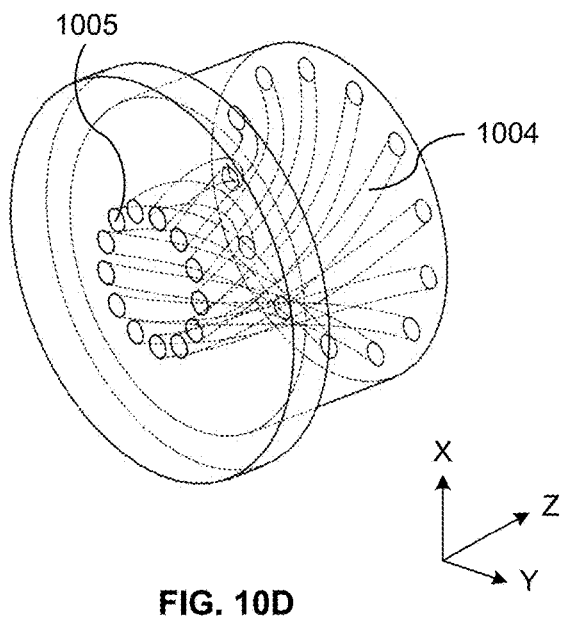
Figure 11A:
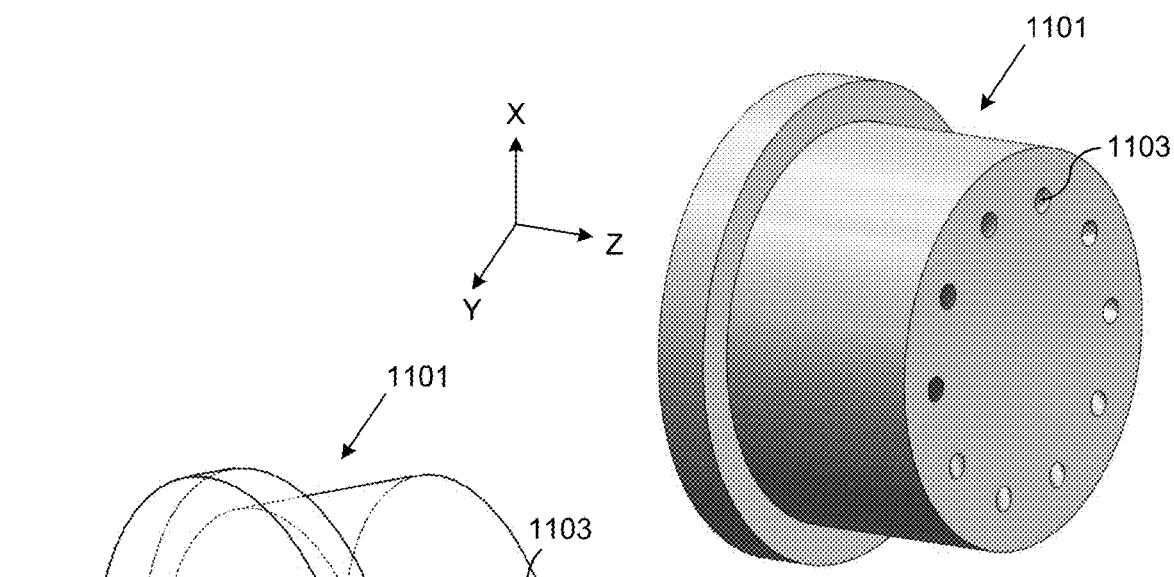
FIGS. 11A-11D provide various views of an example fuel injection nozzle which could form part of a fuel injector according to a sixth embodiment of the invention wherein the nozzle provides a plurality of circular fluid inlets that connect one-to-one to outlets via curved (e.g. spiraling) and diminishing diameter channels wherein the channels may have cross-sections smaller 100, 50, 40, 30, 20, and/or even 10 ums (i.e. microns) at their inlets and be reduced by a factor of 1.5, 2, 4, 8 or more at their outlets which can provide for significant increase in fuel velocity.
Figure 11B:
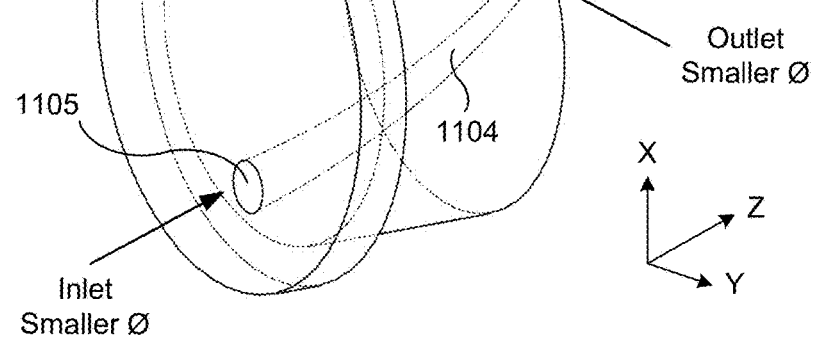
Figures 11C, 11D:
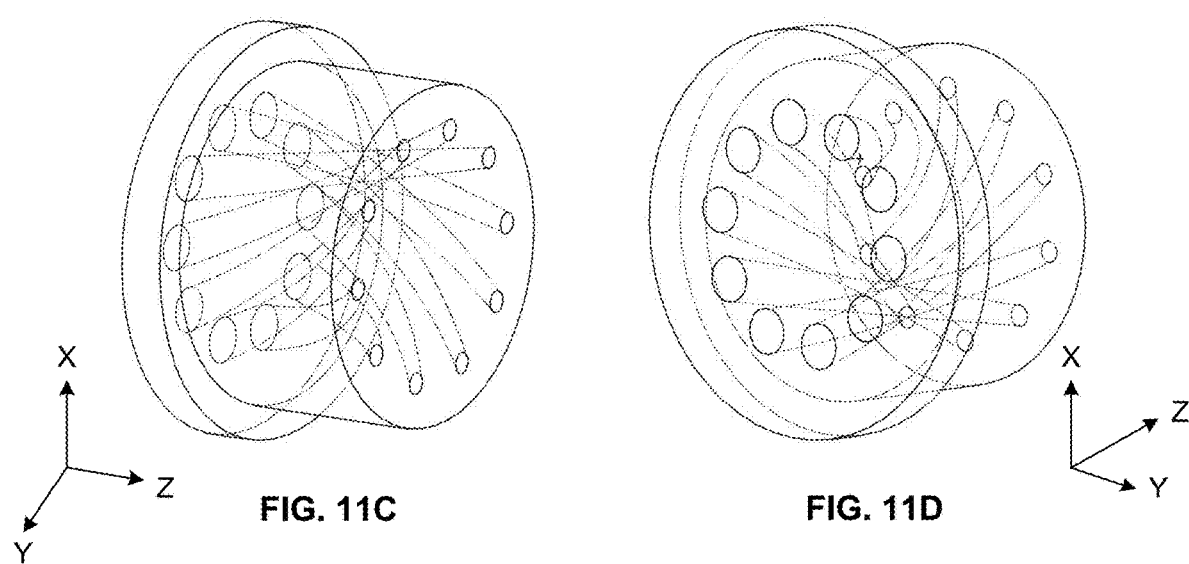

FIGS. 9A-9C provide various views of an example fuel injection nozzle 901 which could form part of a fuel injector according to a fourth embodiment of the invention wherein the nozzle provides a plurality of circular fuel inlets 905 that connect one-to-one to outlets 903 via straight and uniformly spaced and sized channels 907 (may be stair stepped as a resulted of fabrication from a plurality of stacked layers) that have a radially expanding configuration (i.e. are angled for outward dispersion of fuel) wherein the channels may have cross-sectional diameters (within individual layers that are smaller than 50, 40, 30, 20, and/or even 10 ums (i.e. microns).

As with the prior embodiments numerous variations of the fourth embodiment are possible and include those noted for the previous figures as well as, for example (1) variations in the angle of the passages, (2) degree or level of smoothness or locations of smoothness of the passages, (3) level of stair stepping or stair stepping locations within the passages, (4) uniformity of size between the passages, (5) variations in the one-to-one nature of the inlets and outlets such that they may be one-to-many or many-to-one; (6) size decrease in the passages as they progress from inlet to outlet; (7) outlet cross-sectional dimensions (e.g. diameters) that are smaller or larger than inlet cross-sectional dimensions; and/or (8) outlets that are recessed one or more layers above a first layer of formation or below a last layer of formation with the preceding or succeeding layers, respectively having a larger cross-sectional dimension than that of the outlets.

FIGS. 10A-10D provide various views of an example fuel injection nozzle 1001 which could form part of a fuel injector according to a fifth embodiment of the invention wherein the nozzle provides a plurality of circular fuel inlets 1005 that connect one-to-one to outlets 1003 via curved (e.g. spiraling) and uniformly spaced and sized channels 1007 that have a radially expanding configuration (i.e. are angled for outward dispersion of fuel) wherein the channels may have cross-sectional diameters smaller than 50, 40, 30, 20, and/or even 10 ums (i.e. microns).

As with the prior embodiments numerous variations of the fifth embodiment are possible and include those noted for the previous embodiments as well as other variations particular to this embodiment. Additional variations may include, for example, (1) passages that run initially (starting at the inlets) axially or nearly axially but change to have increasing radial components of spread and tangential components of flow as the outlets are reached; and (2) notches or indentations may exist in the final layer, or number of layers, before the outlets such that portions that would inhibit continued radial expansion or tangential flow are removed (e.g. circular channels in the last layer, or several layers would take on a more elliptical or expanded shapes along a path that is in line with a direction of radial expansion and tangential orientation.

FIGS. 11A-11D provide various views of an example fuel injection nozzle 1101 which could form part of a fuel injector according to a sixth embodiment of the invention wherein the nozzle provides a plurality of circular fuel inlets 1105 that connect one-to-one to outlets 1103 via curved (e.g. spiraling) and diminishing diameter channels or passages 1107 wherein the channels may have cross-sections smaller than 100, 50, 40, 30, 20, and/or even 10 ums (i.e. microns) at their inlets and be reduced by a factor of 1.5, 2, 4, 8 and/or more at their outlets which can provide for significant increase in fuel velocity upon leaving the outlets.

As with the prior embodiments numerous variations of the sixth embodiment are possible and include, for example, those noted for the previous embodiments as well as other variations particular to this embodiment.

Figure 12:
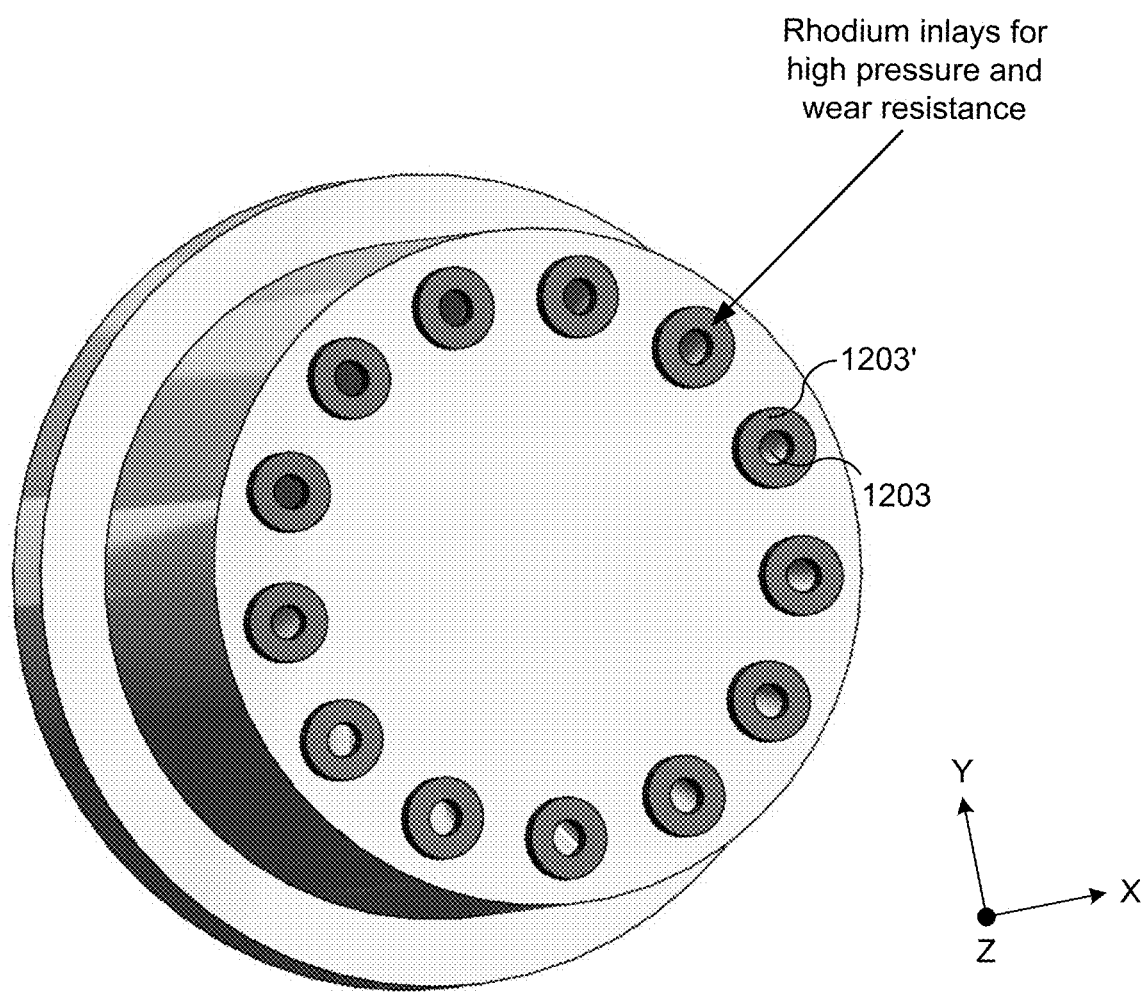
FIG. 12 provides a perspective view of an example fuel injection nozzle which could form part of a fuel injector according to a seventh embodiment of the invention wherein the nozzle provides a plurality of circular outlets which are reinforced with wear resistant outlets (e.g. formed from rhodium) to improve nozzle life.

FIG. 12 provides a perspective view of an example fuel injection nozzle 1201 which could form part of a fuel injector according to a seventh embodiment of the invention wherein the nozzle provides a plurality of circular outlets 1203 which are reinforced with a wear resistant material 1203' (e.g. formed from rhodium) to improve nozzle life.

As with the prior embodiments numerous variations of the seventh embodiment are possible and include those noted for the previous embodiments as well as other variations particular to this embodiment, such as for example: (1) the harder material may not protrude beyond the exit plane of the other material but may be flush with it or even recessed relative to it, (2) the harder material may not provide individual outlets as shown but instead may provide a connected ring of outlets, and (3) the outlets may take on different configurations, e.g. narrowing, expanding, stair stepped, hexagonal, octagonal, other polygonal, elliptical, other conic shapes, or the like.

In still other variations, the harder material, or an insert formed from the same material as the rest of the nozzle, may be used, wherein the insert may be formed using a different process or different process parameters than that used to form the rest of the nozzle. For example, the different process or process parameters may have the same overall steps and operations as that used for the rest of the nozzle but a different layer thickness, different deposition rates, different planarization parameters, different formation tolerances, different surface finishing operations, or the like. The different process or parameters, may yield inserts with higher structural uniformity between nozzles or may yield nozzle inserts having different final features than readily obtainable with the process used to form the rest of the nozzle. These inserts may have tighter uniformity or tolerance for a given production yield than producible with the process used to form the rest of the nozzle bodies.

Figure 13D:
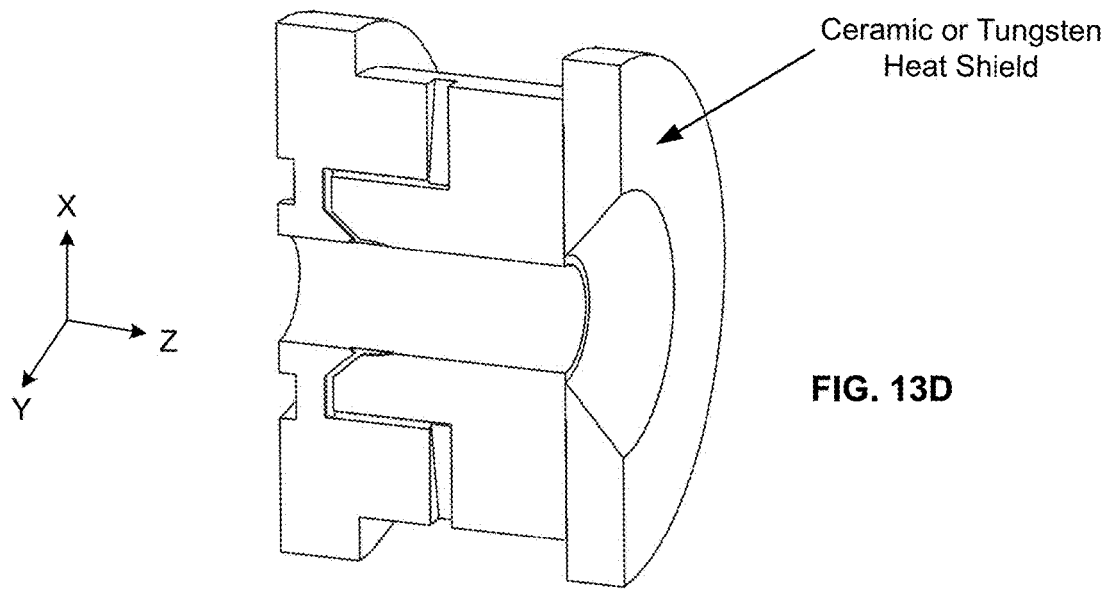
Figure 13E:
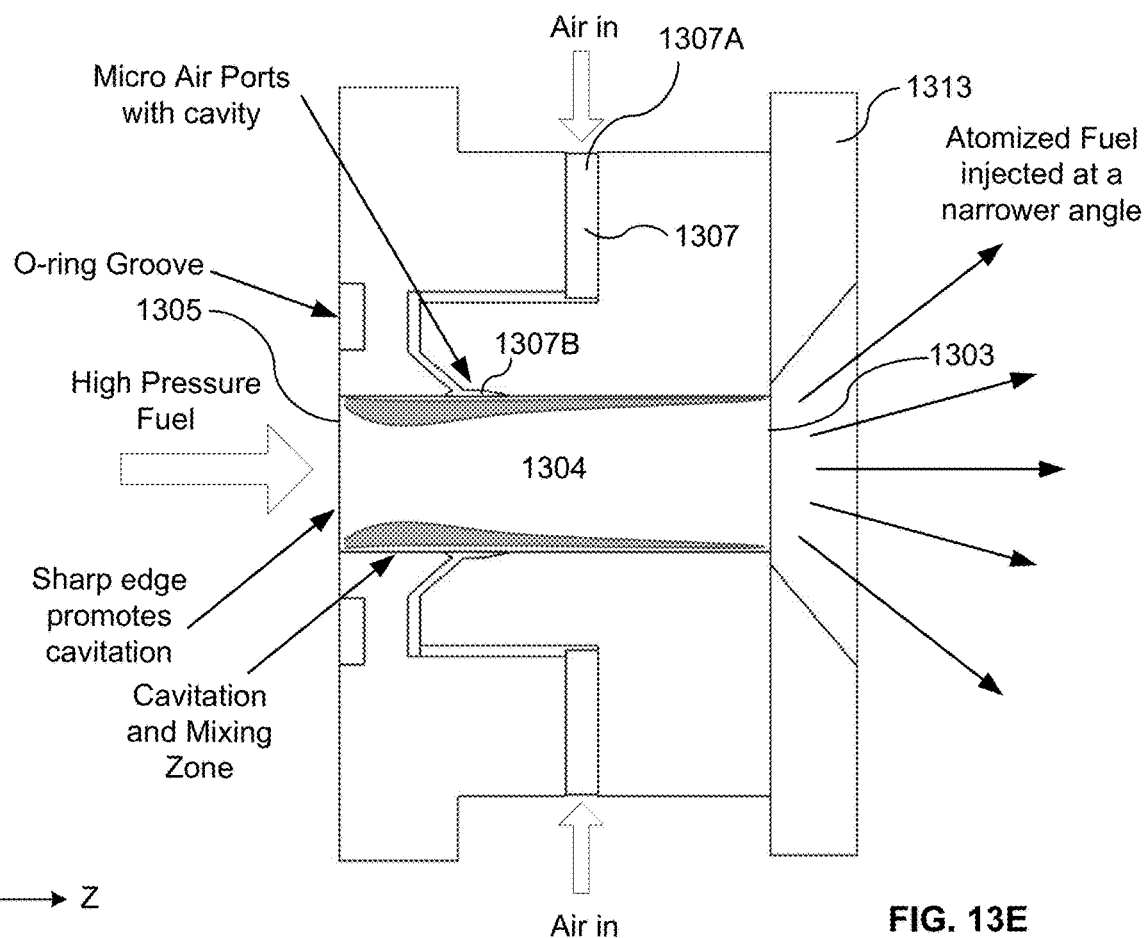
Figure 13F:
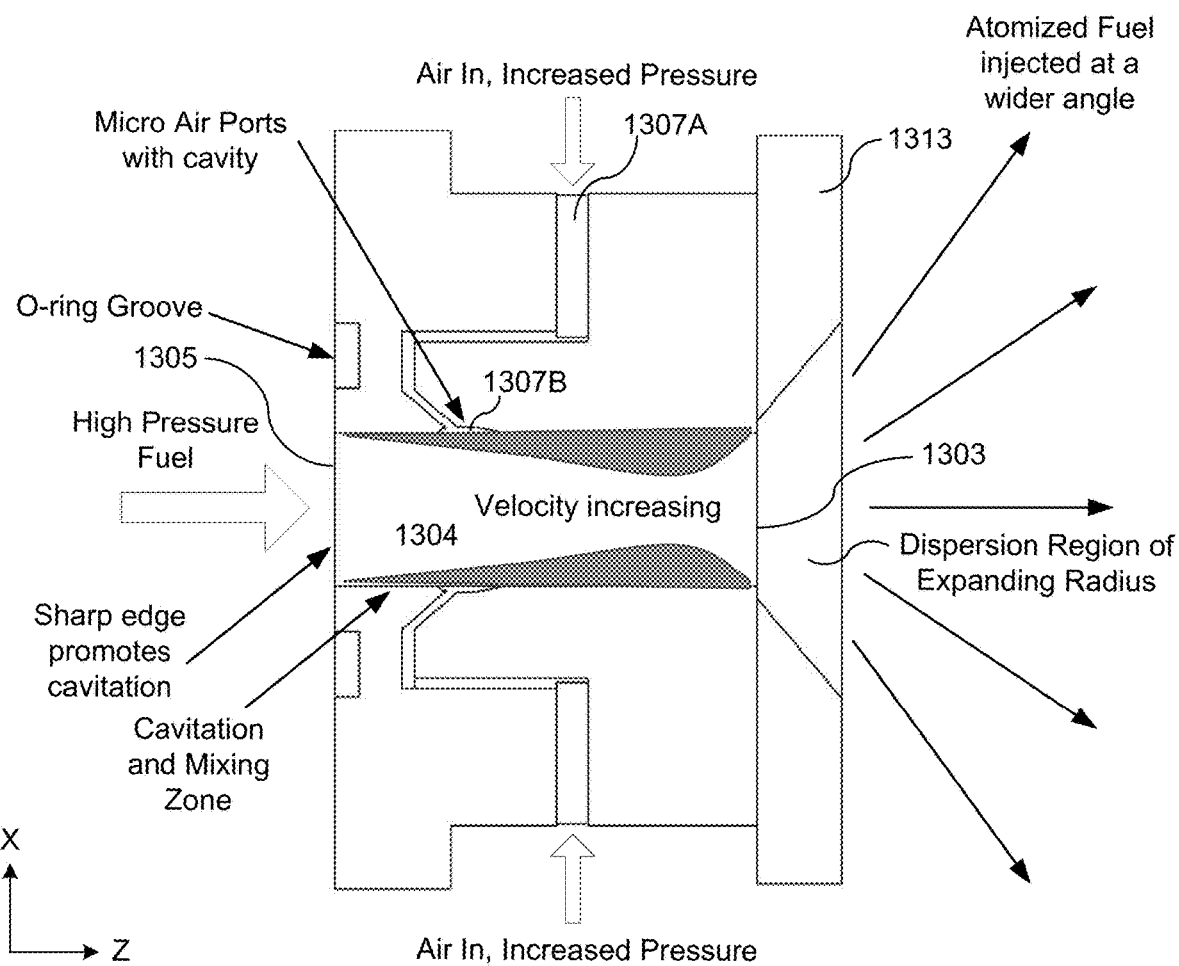
Figure 14A:
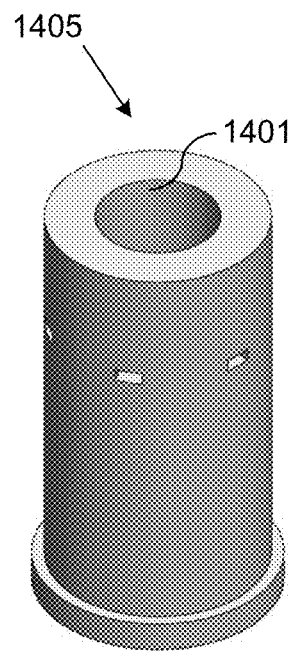
FIGS. 14A-14E provide various views of an example fuel injection nozzle which could form part of a fuel injector according to an ninth embodiment of the invention wherein the nozzle provides at least one flow restriction to fuel flow along its length along with a plurality of air inlet passages where the restriction is followed, along the fuel flow path, by an expansion of the channel.
Figure 14B:
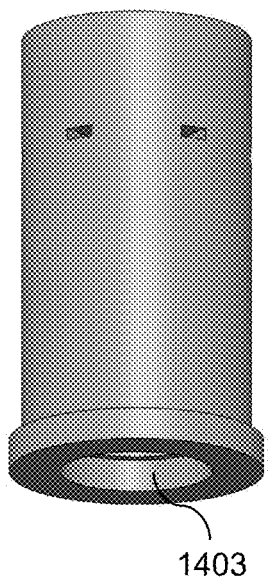
Figure 14C:
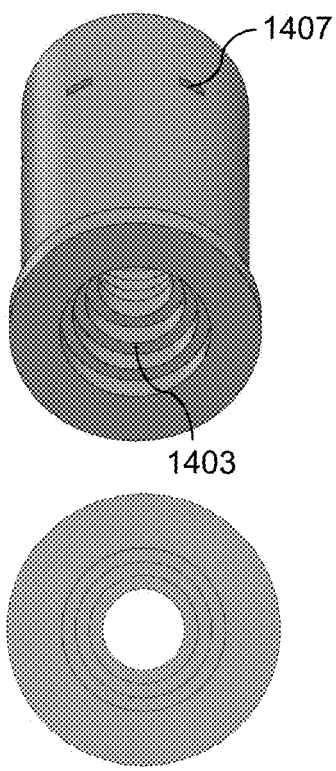
Figure 14D:
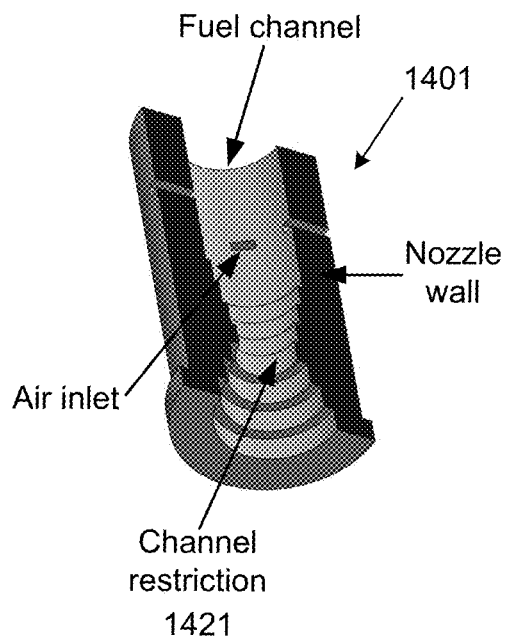
Figure 14E:
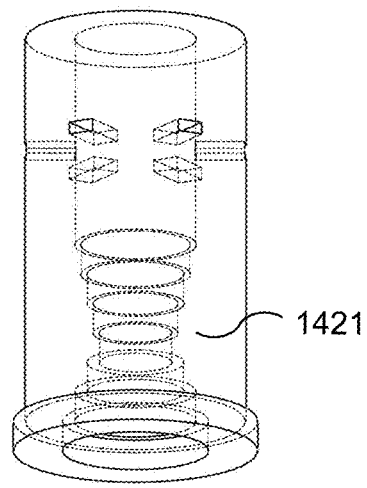
Figure 15A:
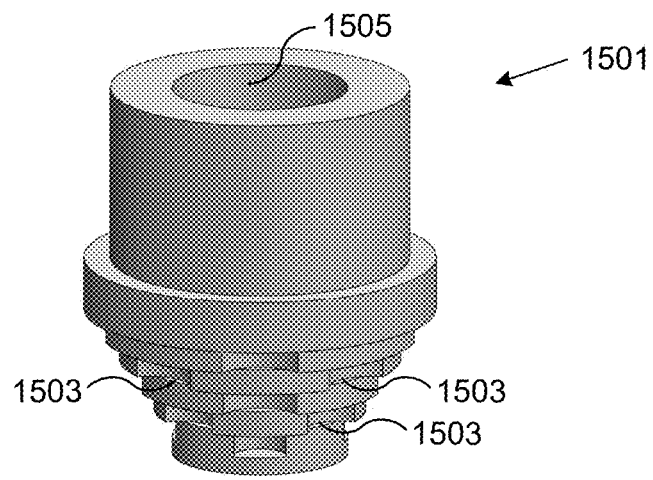
FIGS. 15A-15G provide various views of an example fuel injection nozzle which could form part of a fuel injector according to an tenth embodiment of the invention wherein the nozzle provides a plurality of very small exit ports (e.g. with cross-sectional dimensions that may be less than 15 um, less than 10 ums, and even less than 5 ums) that are formed from the structural material on successive layers being positioned to provide gaps or openings that are smaller than a minimum feature size that could be reliably formed on a single layer of a given height and formation process.
Figure 15B:
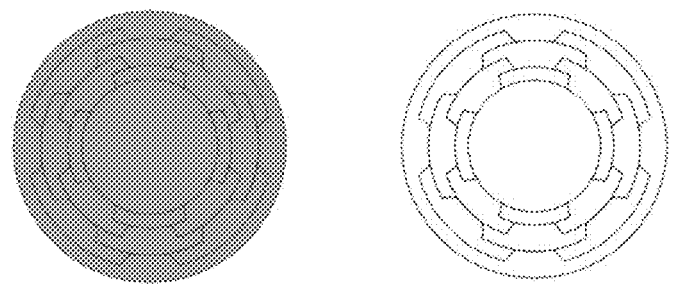
Figure 15C:
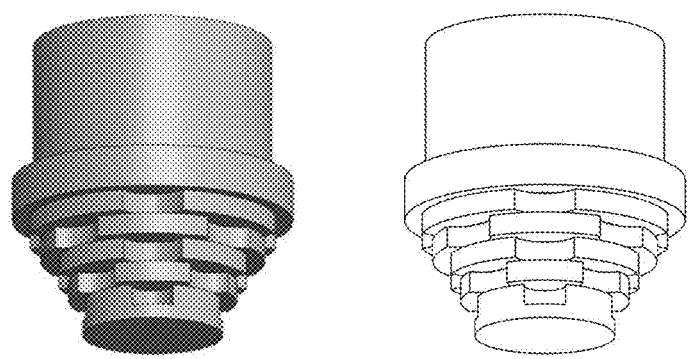
Figure 15D:
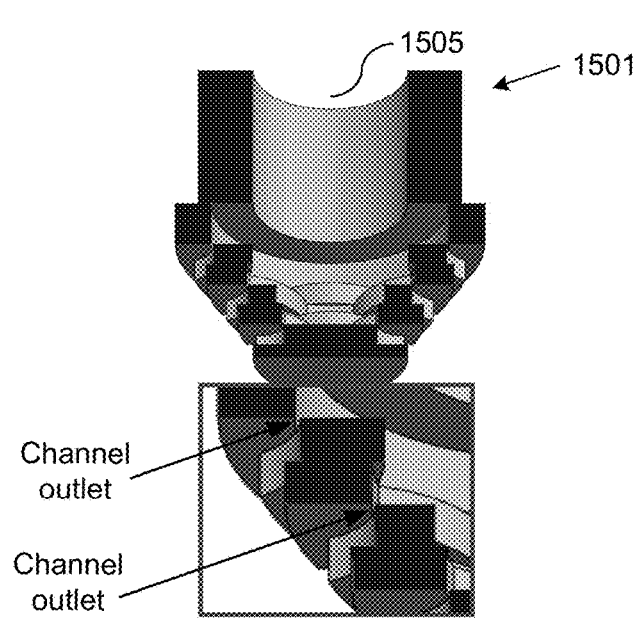
Figure 15E:
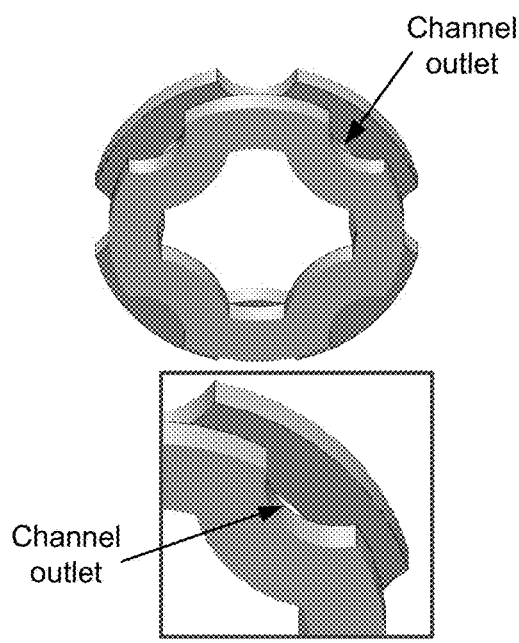
Figure 15F:
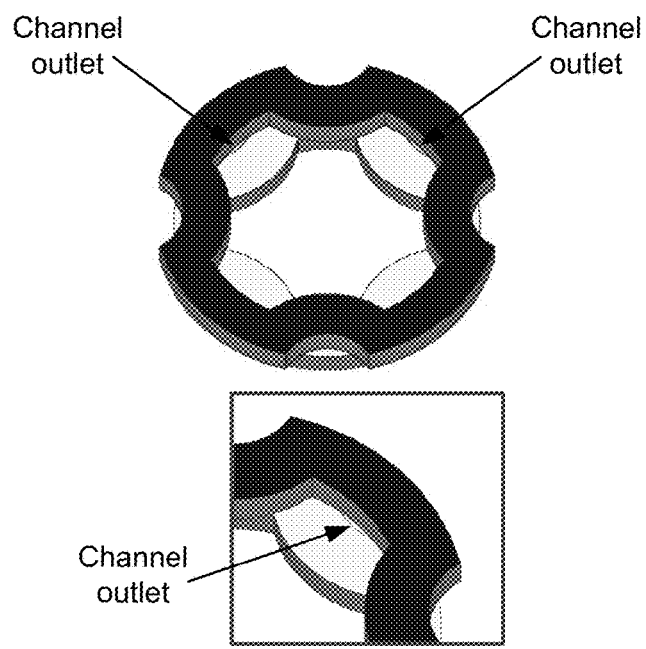
Figure 15G:
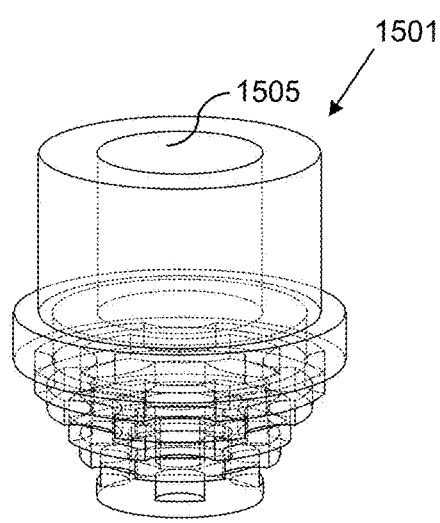
Figure 16A:
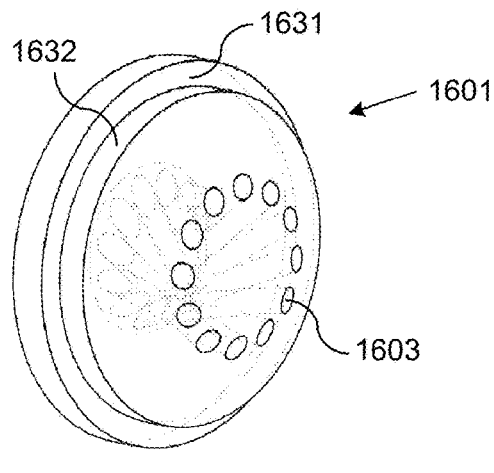
FIGS. 16A-16D provide an example nozzle that includes both fuel flow passages and retention engagement features that can be used for integration purposes according to an eleventh embodiment of the invention.
Figure 16B:
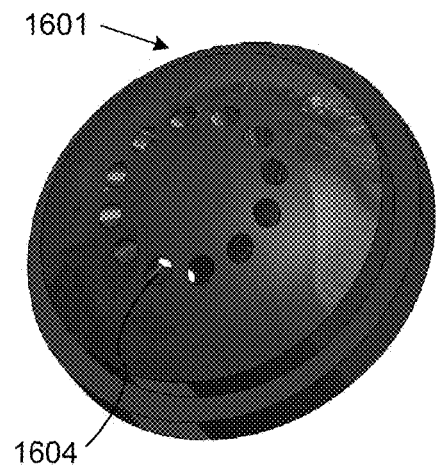
Figure 16C:
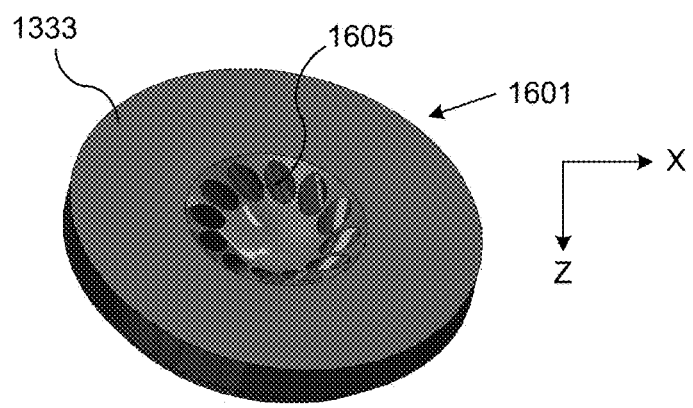
Figure 16D:
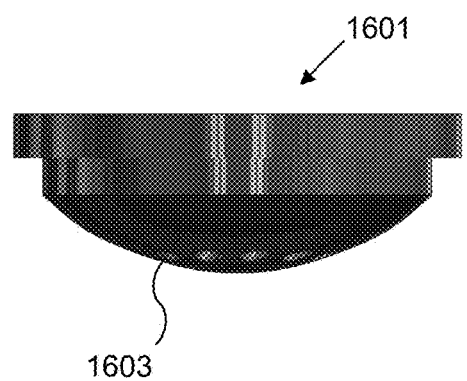

FIGS. 13A-13F provide various views of an example fuel injection nozzle 1301 which could form part of a fuel injector according to an eighth embodiment of the invention wherein the nozzle provides air injection ports 1307A along with a heat shield 1313 (that may be formed from a high temperature material, e.g. ceramic or tungsten) around its outlet which may find particular use in direct injection environments. As shown in FIGS. 13E and 13F, the air may be provided in a passive manner (FIG. 13E) or in a high pressure or active manner (FIG. 13F) to change level of cavitation and or mixing of air (or oxygen) and fuel and potentially a resulting exit angle.

As with the prior embodiments numerous variations of the eighth embodiment are possible and include those noted for the previous embodiments as well as other variations particular to this embodiment. For example in some variations, the shield may be formed of a material of higher thermal conductance, i.e. not necessarily a higher temperature material, and air flow through or around the shield may be used to provide cooling of, or heat removal from, the shielding material.

FIGS. 14A-14E provide various views of an example fuel injection nozzle 1401 which could form part of a fuel injector according to an ninth embodiment of the invention wherein the nozzle provides at least one flow restriction 1421 to fuel flow along its length along with a plurality of air inlet passages where the restriction is followed, along the fuel flow path, by an expansion of the channel.

As with the prior embodiments numerous variations of the ninth embodiment are possible and include those noted for the previous embodiments as well as other variations particular to this embodiment, for example, it may be possible to locate deflectors in the fuel flow path in the outlet region to further modify the fuel and air dispersion pattern from what it would be without the deflectors. In other variations, air inlets to the passages may be provided both before and/or after that restriction.

FIGS. 15A-15G provide various views of an example fuel injection nozzle 1501 which could form part of a fuel injector according to an tenth embodiment of the invention wherein the nozzle provides a relative large inlet 1505 and a plurality of very small exit ports 1503 (e.g. with cross-sectional dimensions that may be, for example, less than 15 um, less than 10 ums, and even less than 5 ums) that are formed from the structural material on successive layers being positioned to provide gaps or openings that are smaller than a minimum feature (MFS) size that could be reliably formed (e.g. formed with a given minimum layer-by-layer yield in a batch formation process, e.g. 50, 60, 70, 80 or 90%, with an acceptable layer-to-layer rework level (e.g. 10, 20, 30, 40, 50%, or higher), or other measurable or monitorable criteria of production success or difficulty.

As with the prior embodiments numerous variations of the tenth embodiment are possible and include those noted for the previous embodiments as well as other variations particular to this embodiment, for example: (1) the layer-to-layer outlets may be formed to have more than one size, (2) may have different sizes or shapes depending on the layer they are on or their lateral position relative to a desired dispensing pattern, (3) the forward tip of the nozzle may be open and not capped; (4) air mixing passages an outlets may be formed in the layers up stream of the exits or even intermixed with the exits.

In still other embodiments, different nozzle types may be used for direct dispensing (e.g. within cylinder dispensing) as well as indirect dispensing (e.g. behind intake value dispensing) systems.

Integration of the various nozzle embodiments of the present invention into fuel injectors may occur in a number of different ways. For example the nozzles may be formed along with the body of the fuel injector or they may be formed separately from the fuel injector body and then be bonded to or otherwise integrated with the fuel injector body (e.g. by diffusion bonding, brazing, or the like). In some such embodiments the nozzle may be formed separately from two or more nozzle retention elements that are used to integrate the nozzle with the fuel injector body. In the integration process, one of the retention elements may be a formed as part of body or integrated with the body prior to incorporating the nozzle and the second retention element. Alternatively, the nozzle and both retention elements may be integrated first to form a nozzle assembly, and the then the assembly may be integrated with the fuel injection body.

In the various embodiments of the present invention, the nozzle element itself may be formed with a highly precise and repeatable process such a multi-layer, multi-material electrochemical fabrication process as described herein and in various applications, patents, and articles incorporated herein by reference (e.g. the MICA Freeform process). Due to the precision nature of multi-material, multi-layer fabrication processes and the cost factors associated with batch fabrication processes, it may be desirable to limit the heights (i.e. the thickness in the layer stacking direction, e.g. the Z-direction) and lateral dimensions (e.g. the X and Y dimensions) of the produced parts, structures, or assemblies. For example, it may be desirable to limit the heights of single structures to 0.5 mm, 1 mm, 2 mm, 3 mm, or perhaps something thinner or something thicker while the lateral dimensions may extend from 1 Os or 100s of microns to a few millimeters or even to a few centimeters, or larger. Layer thickness may vary from, for example 1-10 ums to 20-50 ums or more. If extra height is needed it may be possible to extend the build height per layer or the overall layer count of the part but it may be more beneficial to form two separate structures and then stack them perhaps using X-Y alignment features and/or X-Y orientation features. Due to the overall size and less restrictive tolerance requirements, the retention elements may be formed using other more traditional and macroscopic fabrication processes such as, such as laser cutting, water jetting, milling, macroscale three-dimensional printing, or the like.

An example of a nozzle 1601 that includes inlets 1605, outlets 1603, and fuel flow passages 1604 and retention engagement features 1631-1633 is shown in the various views of FIGS. 16A-16D, wherein a plurality of fuel passages are shown to have a lateral cylindrical pattern on distal facing convex surface (surface including the outlets 1603) and a concave proximal surface (surface including the inlets 1605). The nozzle is preferably made from a metal or ceramic material or materials with appropriate mechanical and thermal properties to provide desired operational properties. During formation from a plurality of adhered layers the convex and concave surfaces would take on a stair stepped, or simply stepped, configuration with stacking of the layers preferably occurring in a Z-direction. The example passage configuration is also shown to take a spiraling path in Z. The nozzle also includes an outer flange having horizontal features 131 and 1633 and vertical feature (i.e. extending in Z) 1632 for engaging retention elements. In other embodiments flange or other portions of the nozzle may include alignment features to fix orientation or position relative to one or both of the proximal and/or distal retainers. In still other embodiments, the flange or other portion of the nozzle may include one more additional materials or features that aid in making a permanent or semi-permanent bond and/or seal between the nozzle and one or both of the retention structures. Such additional material may be a brazing material, alloying material, or other sealant. Sealing may occur by compression, heating, diffusion bonding, current induced heating, or other stimulation provided for bonding and/or sealing. In other variations laser welding may be performed around a peripheral interface of the nozzle and a retention structure. In still other embodiments, press fitting may be used to provide appropriate sealing and bonding. In other embodiments, the nozzle may take on different surface shapes, include different fuel flow passages, contain air or oxygen flow passages, and/or have other features discussed herein above.

Figure 17A:
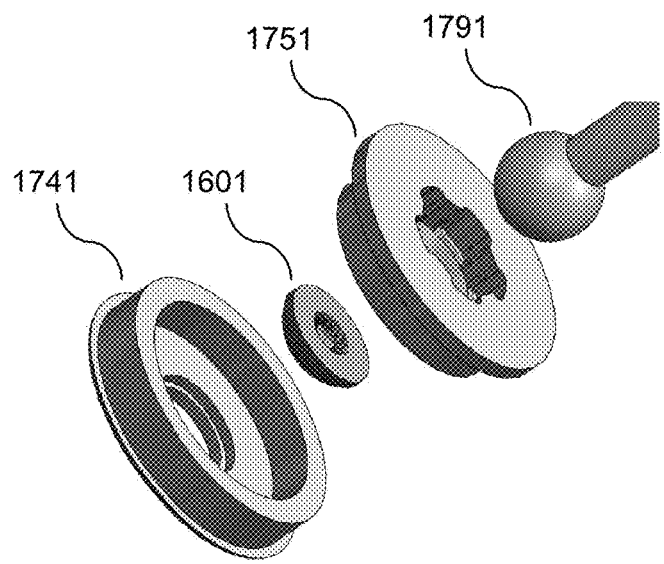
FIGS. 17A and 17B show the sample nozzle of FIGS. 16A-16D along with a distal retainer and a proximal retainer and a valve pin.
Figure 17B:
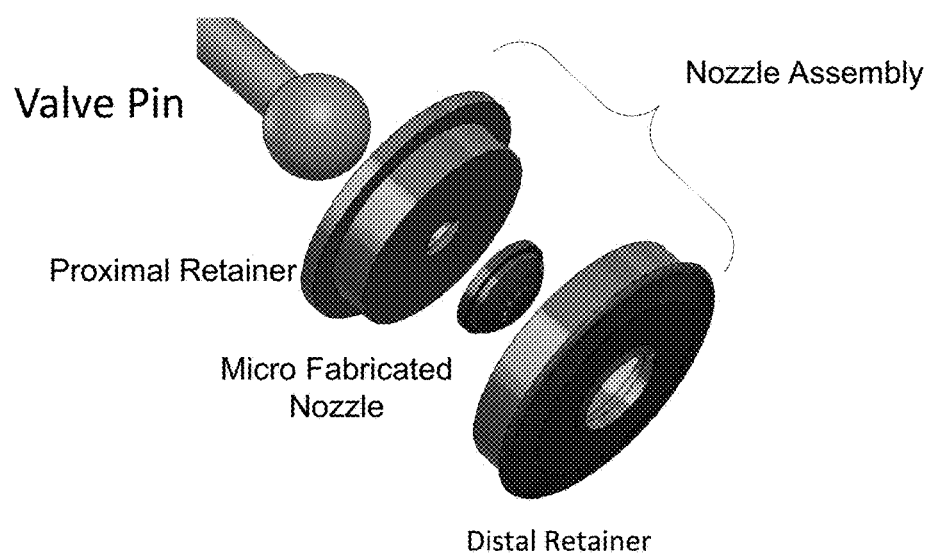
Figure 18A:
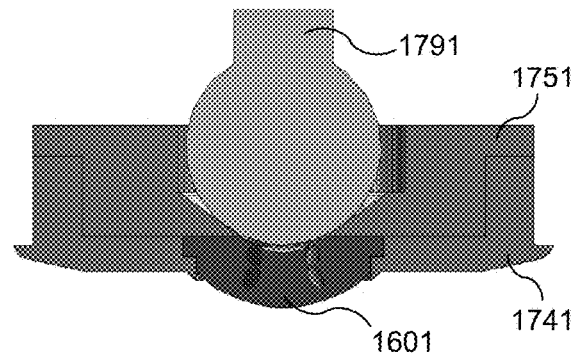
FIGS. 18A-18C provide several views of a nozzle assembly that includes the proximal and distal retainers of FIGS. 17A and 17B and a nozzle of FIGS. 16A-16D a value pin seated against the proximal retainer and the nozzle.
Figure 18B:
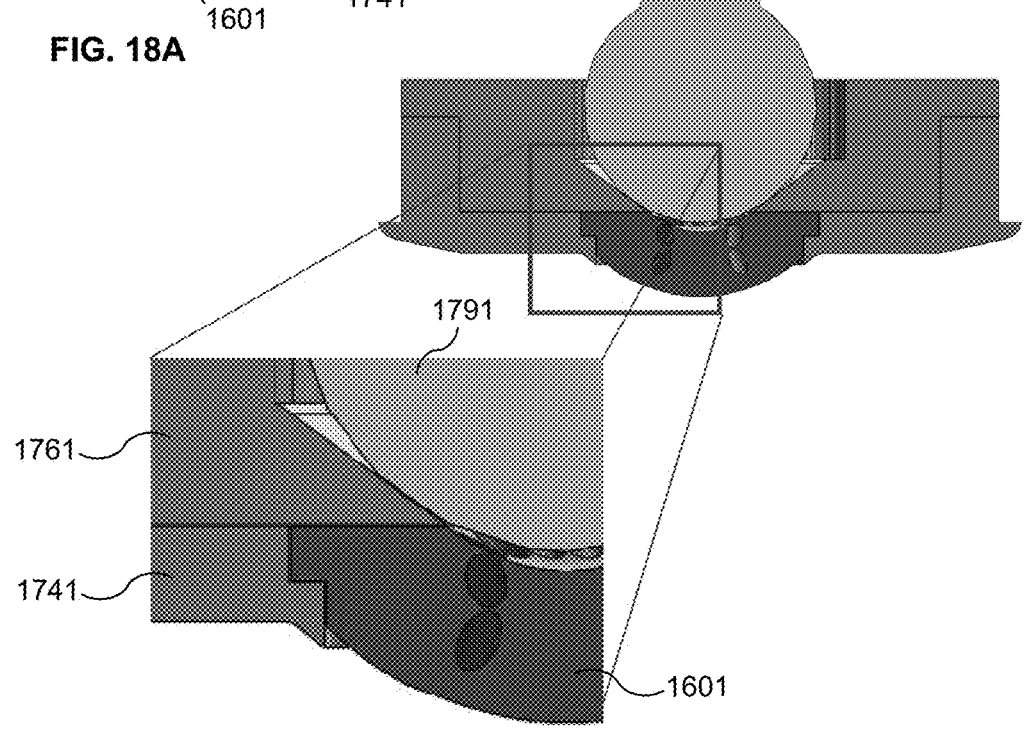
Figure 18C:
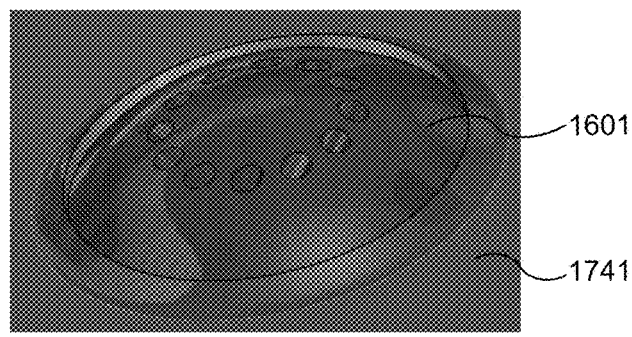

FIGS. 17A and 17B show the sample nozzle 1601 of FIGS. 16A-16D along with two example retainers 1741 and 1751 and a valve pin 1791 while FIGS. 18A-18C provide several views of the assembly of the proximal and distal retainers holding the nozzle along with the value pin (which can be seen in FIGS. 18A and 18B) seated against the proximal retainer and the nozzle. In some implementations, the seam between the two retainers may be welded, or sealed by other means (such as those noted above for the nozzle). The sealing may be of a permanent nature or may be separable for nozzle exchanges. The vertical surface and peripheral flange on the distal retainer may be used as an interface for mating the nozzle assembly to a fuel injector body. As shown the nozzle is configured for distal engagement with the fuel injector body. In some variations, for example, the flange may be located on near the top of the distal retainer and oriented downward so that the assembly may be loaded into fuel injector body from the proximal side and pressed fit into place with the flange limiting distal movement. In still other configurations, the two retainer structures may be threaded together for primary height positioning and/or orientation control and then spot welding or seam welding used to provide for permanent bonding and/or sealing.

FIGS. 19A-19G provide various views of an example nozzle of a twelfth embodiment of the invention. In this example, the nozzle includes eight orifices with an inlet side recessed relative to a surrounding flange while the eight nozzle outlets extend via counterbores to a protruding nozzle tip. In alternative embodiments, different numbers of orifices may be used, orifices may take on different relative patterns, and have different relative jetting directions than that illustrated. The flange around the perimeter of the nozzle may take on different forms as opposed of the circular form illustrated (e.g. square, rectangular, oval, elliptical, or other polygonal shape, or the like) some of these shapes may aid in providing desired alignment relative to a fuel injector housing.

Figure 19A:
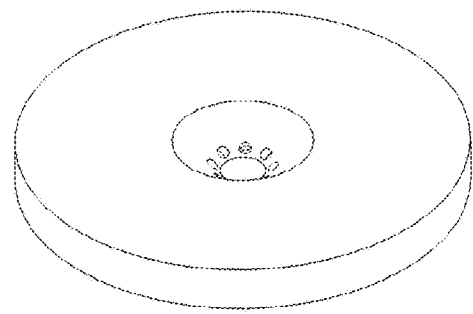
FIGS. 19A-19G provide various views of an example nozzle according to a twelfth embodiment that includes eight orifices with an inlet side recessed relative to a surrounding flange while the nozzle outlets extend via counter bores to a protruding nozzle tip.
Figure 19B:
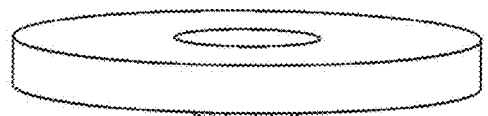
Figure 19C:
Figure 19D:
Figure 19E:
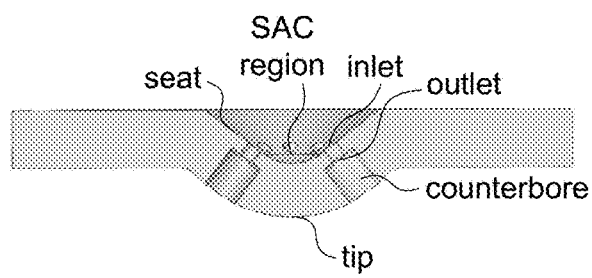

FIGS. 19A and 19B provide top side isometric views of the nozzle from two different angles with the angle of FIG. 19B being shallower such that the protrusion of the nozzle tip can be seen on the underside of the nozzle. FIGS. 19C-19E provide a side view and two cut side views of the nozzle with two of orifices being cut through in FIGS. 19D and 19E such that the orifice inlet, outlet, counterbore, valve seating region and sac region can be seen.

Figure 19F:
Figure 19G:
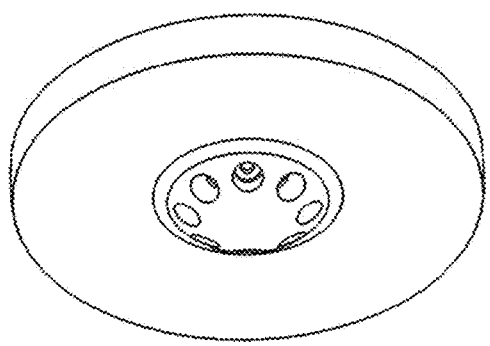
Figure 19H:
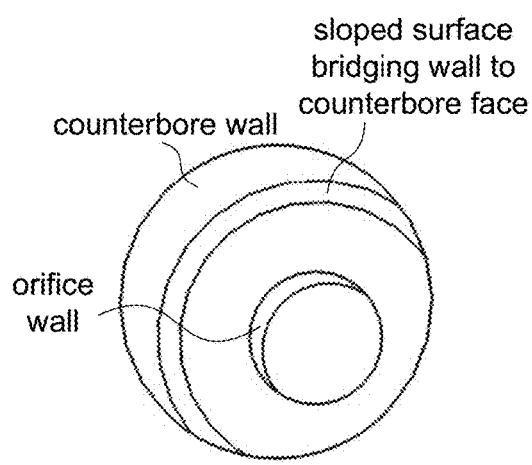
FIG. 19H provides a close up, bottom, isometric view of an orifice of the nozzle of FIGS. 19A-19G such that a larger diameter counter bore can be seen giving way to a smaller diameter orifice.
Figure 20A:
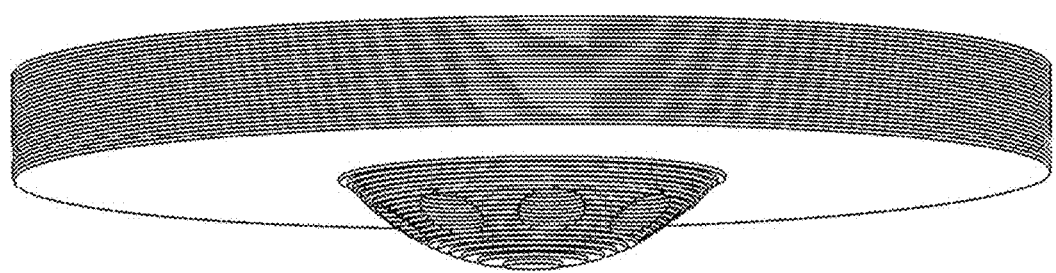
FIGS. 20A-20D provide various views of a nozzle providing an implementation of the nozzle of FIGS. 19A-19H wherein that the nozzle is formed from a plurality of stacked planar layers which provides stair-stepped features between successive layers as cross-sectional configurations of the three-dimensional structure vary from level to level.
Figure 20B:
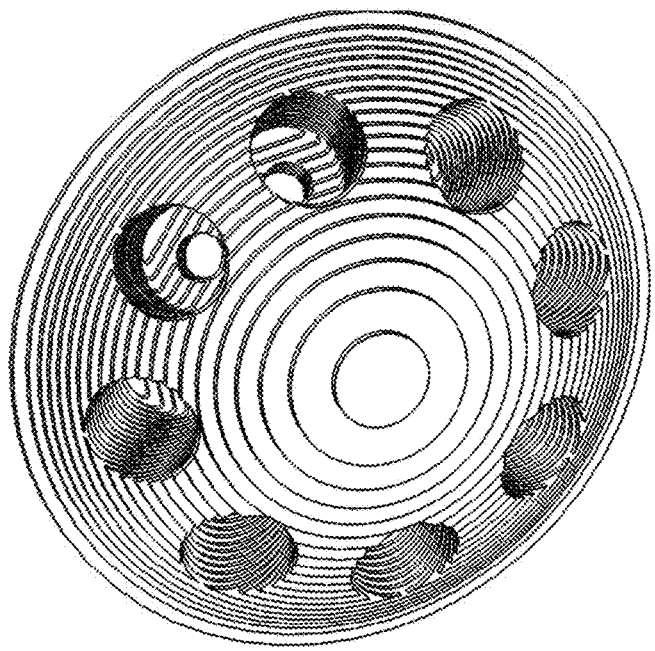
Figure 20C:
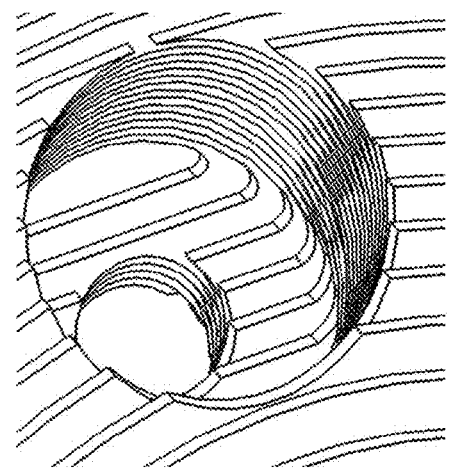
Figure 20D:
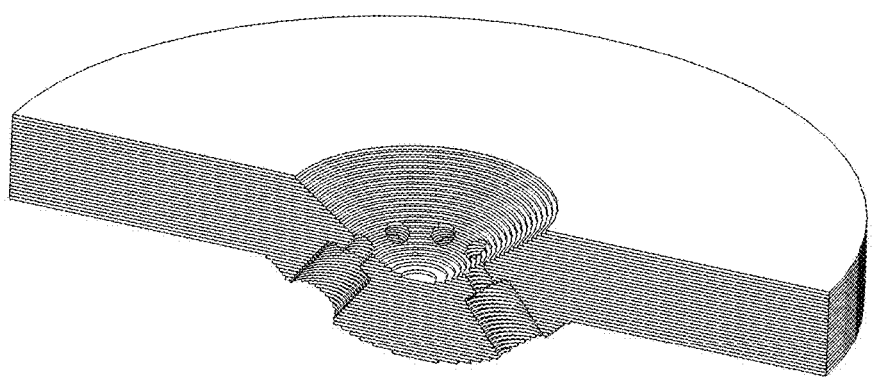

FIGS. 19F and 19G provide bottom side isometric views of the nozzle from two different angles with the angle of FIG. 19F being shallower. FIG. 19H provides a close up, bottom, isometric view of an orifice such that the larger diameter counterbore can be seen giving way to a smaller diameter orifice via a sloped or beveled surface giving rise to the counterbore base. The view of the orifice in FIG. 19H is from the bottom (larger diameter counterbore opening) to the top side, or inlet side, of the orifice with the smaller diameter fuel passage.

FIGS. 20A-20D provide various views of a nozzle that provides one implementation of the nozzle of FIGS. 19A-19H. In this implementation the nozzle is formed from a plurality of stacked planer layers which provides stair-stepped features between successive layers as cross-sectional configurations of the three-dimensional structure vary from level to level. In particular, the stepped features or features resulting from the layerization process can be most readily seen in the domed portion of the nozzle and in the tilted orifices. In variations of this implementation different layers thicknesses may be used in forming the structure or even layer thickness varied during formation of different portions of the structure. In still other variations a portion of the layer-to-layer discontinuities, or stairsteps may be reduced or eliminated. For example by forming a portion of the structure using a non-layering method such as that discussed in association with FIGS. 21A and 21B or by using smaller layer thicknesses, filling of the stairsteps, abrasive removal of the stairsteps, selective or non-selective electrochemical etching to preferentially target protruding material, or the like to remove of the stair steps, As an example, in some variations it may be desirable to have the region that will be used as a valve plug seat to be smooth as opposed to having stepped features.

Figure 21A:
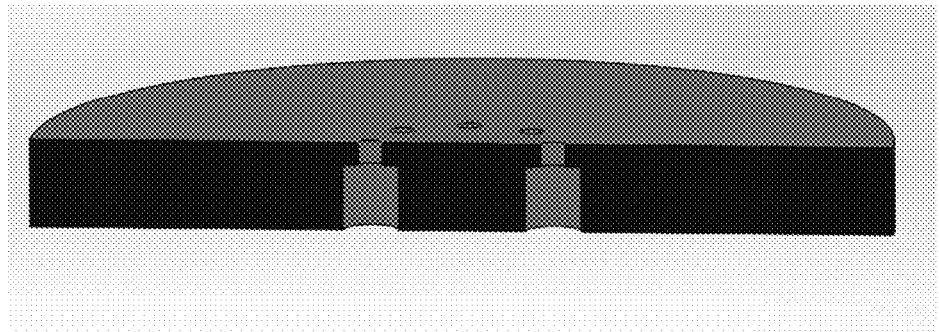
FIGS. 21A-21B illustrate a state of nozzle formation according to an alternative process to that of FIGS. 20A-20D to form a nozzle like that of FIGS. 19A-19H that provides for the initial forming of the structure as a completely planar nozzle preform with reduced layering artifacts (FIG. 21A) whereafter, the preform which may be formed from a plurality of planar layers is reshaped, for example via die forming, to take on a desired final shape with a protruding nozzle tip (FIG. 21B).
Figure 21B:
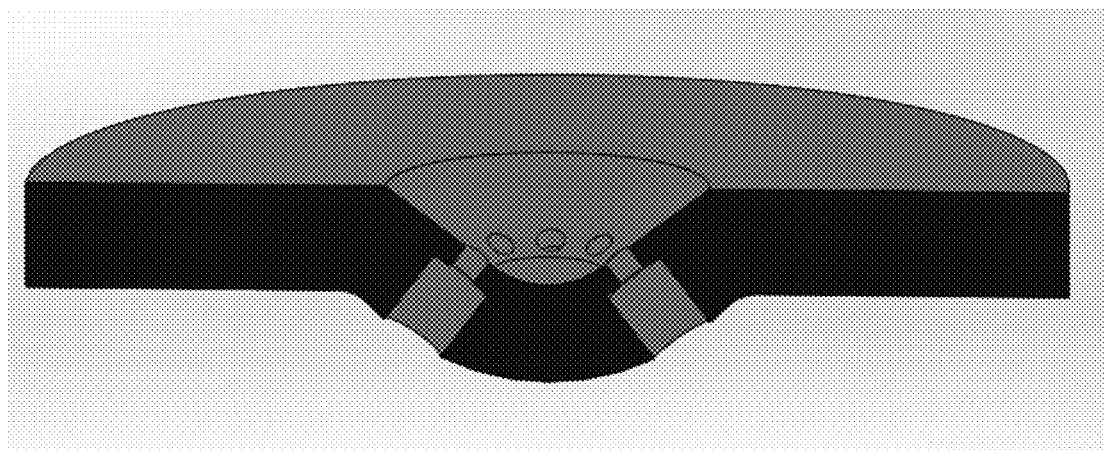

FIGS. 21A-21B illustrate states of formation using an alternative formation method to that of FIGS. 20A-20D to provide an alternative implementation of the embodiment of FIGS. 19A-19H. As shown in FIG. 21A the structure may be initially formed from a single substantially planar machined layer with desired orifices (e.g. via mechanical, jetting, or laser machining) or from a plurality of planar layers formed one upon the other or stacked and bonded to form a completely planar nozzle preform with reduced layering artifacts as can be seen in FIG. 21A, where after, the preform may be reshaped by die forming to take on a desired final shape with a protruding nozzle tip (FIG. 21B). In some implementations, the orifices may be formed with a non-ideal shapes such that upon deformation the shapes of the orifices are modified to take on a more desirable configuration.

FIGS. 22A-22F provide an alternative nozzle configuration according to a thirteenth embodiment of the invention wherein the orifice channels are provided with an opposite pair of downward spiraling inward extending protrusions, grooves, or rifling with each inward protrusion providing less than one-half of a complete rotation around the interior of the orifice channel. In other embodiments, different numbers of inward protrusions may be provided and/or the angular extent of each may be lengthened beyond pi radians. In various embodiments the radial inward extension of each protrusion or groove may be of a fixed amount (e.g. 0.1 times orifice radius (0.1R), 0.25R, 0.4R. 0.5R or even larger) or may be made to vary from one end to the other (e.g. starting out with a relative large extension and decreasing to a relative small extension, or vice-a-versa, as the protrusion progresses toward the orifice exit or the orifice counterbore). In some embodiments only a single spiral or protrusion may be provided as opposed to two or more opposing or semi-opposing spirals or protrusions. In some embodiments the protrusions may have a relatively constant thickness along the axis of the orifice while on others they may have an increasing thickness or decreasing thickness. In some embodiments, orifice axial passage configuration projections, in absence of the protrusions may be circular (i.e. the orifice has a circular passage) while with the protrusions the orifice may have an elliptical passage projection or some other compressed cylindrical projection. In other embodiments the projection may be compressed or expanded along one axis in absence of the rifling projections and become more circular in the presence of the projections. In still other embodiments the projections may have the same configuration (e.g. circular or compressed) with or without the projections with projections simply causing a narrowing of the nominal diameter of the projection.

Figure 22A:
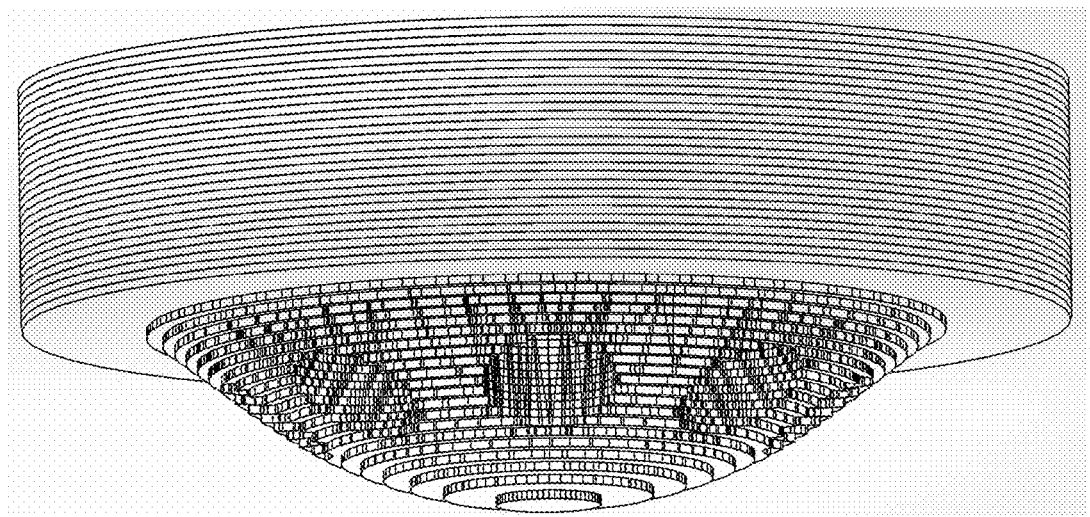
FIGS. 22A-22F provide an alternative nozzle configuration according to a thirteenth embodiment of the invention wherein the orifice channels are provided with an opposite pair of downward spiraling protrusions or grooves with each protrusion providing less than one-half of a complete rotation around the interior of the orifice channel wherein FIG. 22A provides a bottom view which allows the protrusion of the nozzle tip to be seen, FIG. 22B provides a top isometric view which allows the recession of the valve seat and sac to be seen, FIGS. 22C and 22D provide close up, top isometric views from the right and left so that right and left sides, respectively, of the rifling spirals can be seen within some of the orifices where stair-stepped configurations of the some spirals can be readily seen while other spirals seem to have smoother configurations due to the layerization of the structure, the angled nature of the orifices themselves, and the spiraling angle selected, and where FIGS. 22E and 22F provide close up, cut, isometric views of the structure to provide views of the example rifling protrusions within some of the orifices.
Figure 22B:
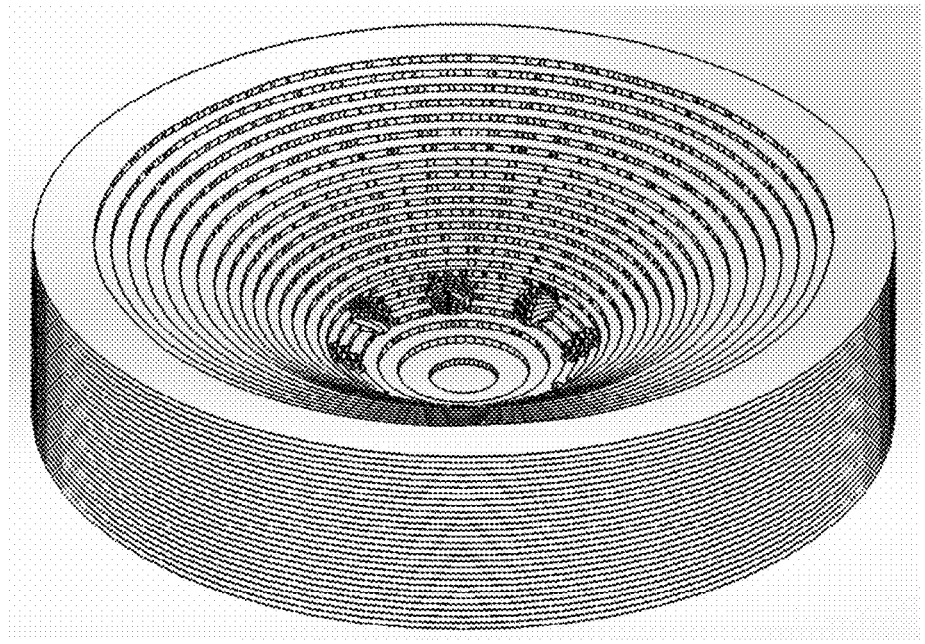
Figure 22C:
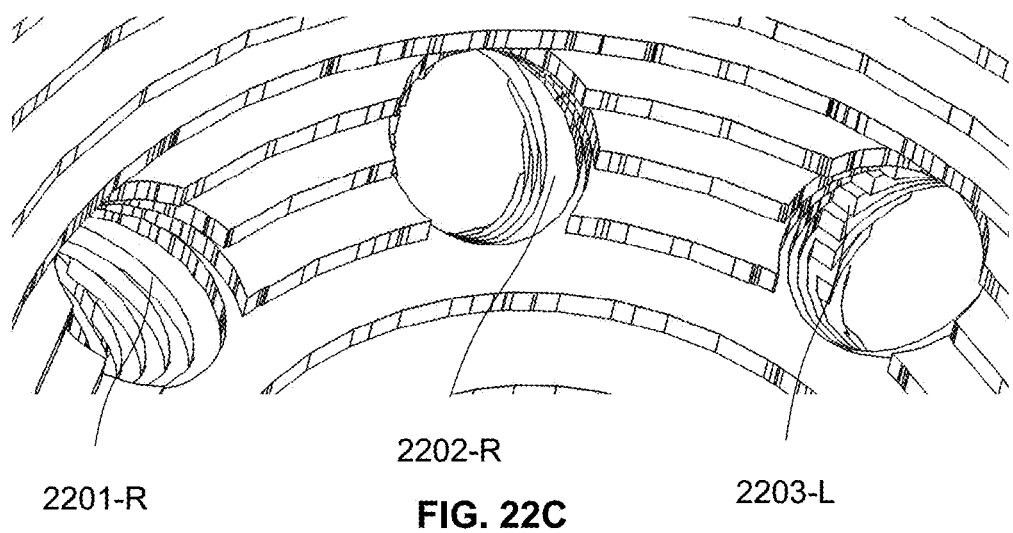
Figure 22D:
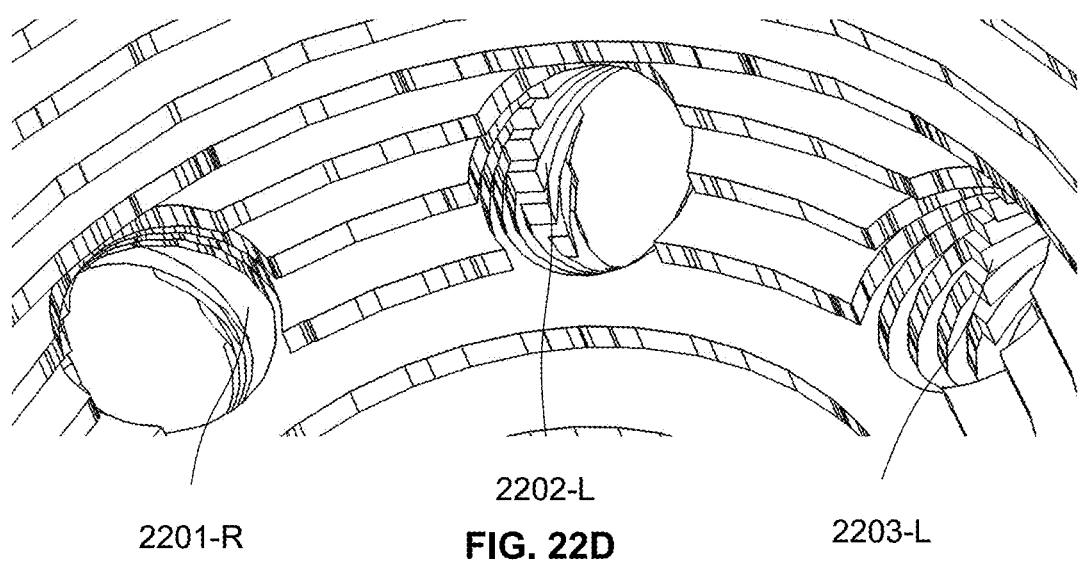
Figure 22E:
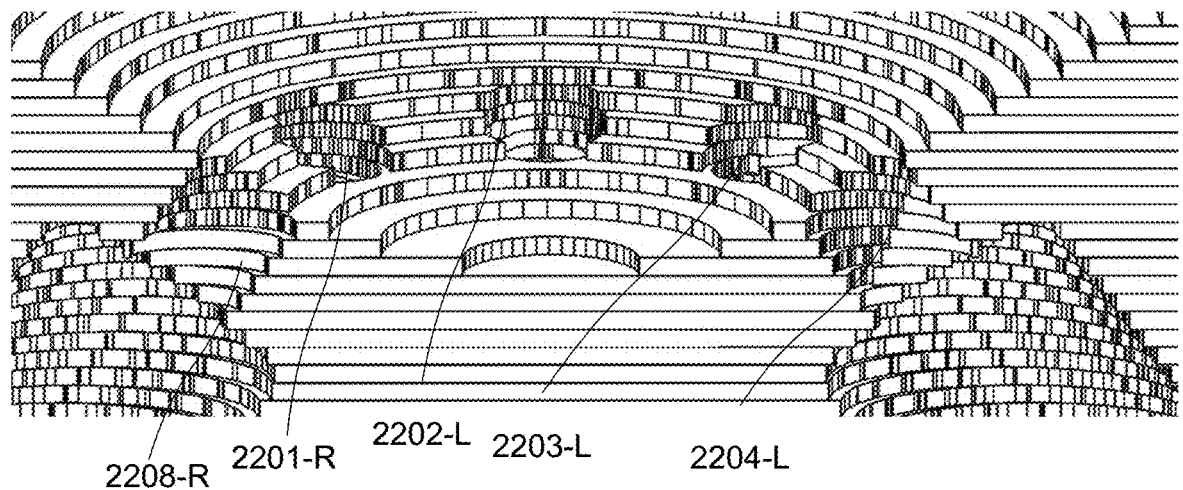
Figure 22F:
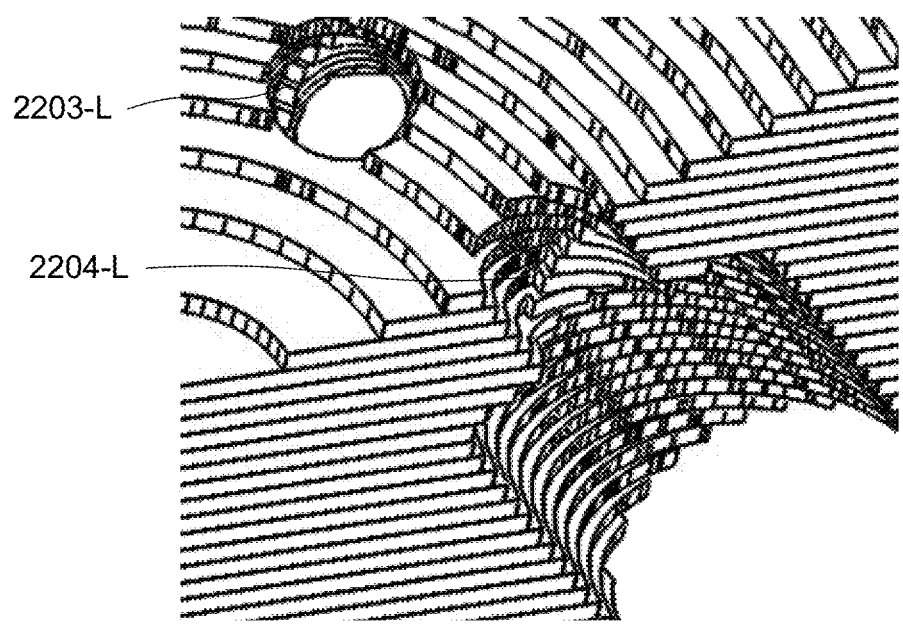

FIGS. 22A and 22B provide bottom and top isometric views which allow the protrusion of the nozzle tip to be seen (FIG. 22A) and the recession of the valve seat and sac to be seen (FIG. 22B). FIGS. 22C and 22D provide close up, top isometric views from the right and left so that right and left sides, respectively, of the rifling spirals can be seen within some of the orifices where the spirals on the left of the orifices depicted take a stair-stepped configuration 2202-L and 2203-L, while the spirals on the right side in the orifices depicted take smoother configurations 2201-R and 2203-R due the layering of the structure, the angled nature of the orifices themselves, and due to the spiraling angle selected. FIGS. 22E and 22F provide close up, cut, isometric views of the structure to provide alternative views of the example rifling protrusions 2208-R, 2204-L within some of the orifices.

In the present embodiment, the protrusions provide the orifice with an elliptical shape which may be desirable; however, in other embodiments, as noted above, other shapes may preferable, e.g. circular. In the present embodiment two protrusions of equal length are provided while in other embodiments, as noted above, a different number of protrusions may be provided and/or different protrusion lengths for each protrusion within a particular orifice may be used or different lengths for different orifices within a single nozzle may be used or even different protrusion angles (i.e. change in axial height per unit of rotation) may be used. In still other embodiments, as opposed to the protrusions providing only a sloped upper surface (e.g. facing the inlet of the orifice), the lower surfaces may also be sloped such that the nominal height of the protrusion along the axis of the orifice is more consistent. In still other embodiments, different numbers of protrusions (i.e. rifling paths whether viewed as protrusions or depressions) may be used. When multiple rifling paths are used they may be provided at the same level along the nominal axis of the orifice (e.g. starting at the top or a middle portion of the orifice or ending at the bottom of the orifice) or they may be provided at different levels along the axis. In some embodiments, the orientation of the spirals may be different among the different orifices (e.g. the spirals in neighboring orifices may be oppositely oriented, e.g. alternatively between counter-clockwise and clockwise). The numbers, relative angles, positions, and lengths of the rifling protrusions may also change among the multiple orifices in a given nozzle. As in the other embodiments set forth herein, different number orifices and orifice patterns may be used, and different layer thicknesses may be used. In some alternative embodiments, rifling configurations may be the same in every orifice or they may be different in different orifices so as to account for differences in orientation of the orifices, differences in sizes of the orifices or differences in position of the orifices relative to layering used in fabricating the nozzles.

FIGS. 23A-23D provide an alternative nozzle configuration according to a fourteenth embodiment of the invention wherein the orifice channels are layerized versions of angled circular channels (like the orifices of FIGS. 20A-20D) with sac guide structures provided on the inlet portion of the nozzle within the sac region to guide fluid flow into the orifices along paths from both the left and right sides of each orifice (as judged from the center of the nozzle).

Figure 23A:
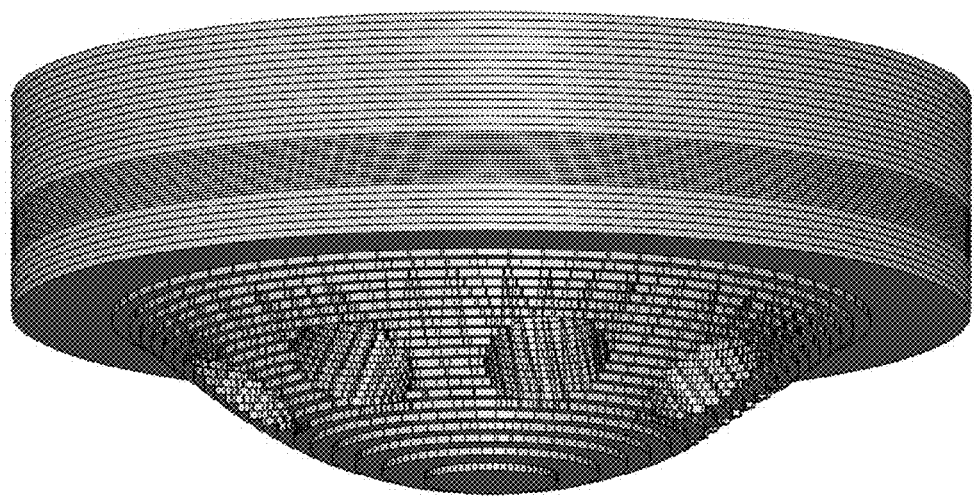
FIGS. 23A-23D provide an alternative nozzle configuration according to a fourteenth embodiment of the invention wherein the orifice channels are layerized versions of the angled circular channels of the nozzle of FIGS. 20A-20D but where sac guide structures are provided at the entrance to each orifice to guide fluid flow into the orifices along paths from both sides of each orifice wherein FIG. 23A provides a bottom isometric view which allows the protrusion of the nozzle tip to be seen, FIG. 23B provides a top isometric view which allows the recession of the valve seat and sac guides to be seen, FIG. 23C provides a close up isometric top view of the structure so that the example sac guides used in this embodiment can be better seen, and FIG. 23D provides a cut, isometric view of the structure so that the interior of the orifices (including their narrow regions and counterbore regions) can be better seen.
Figure 23B:
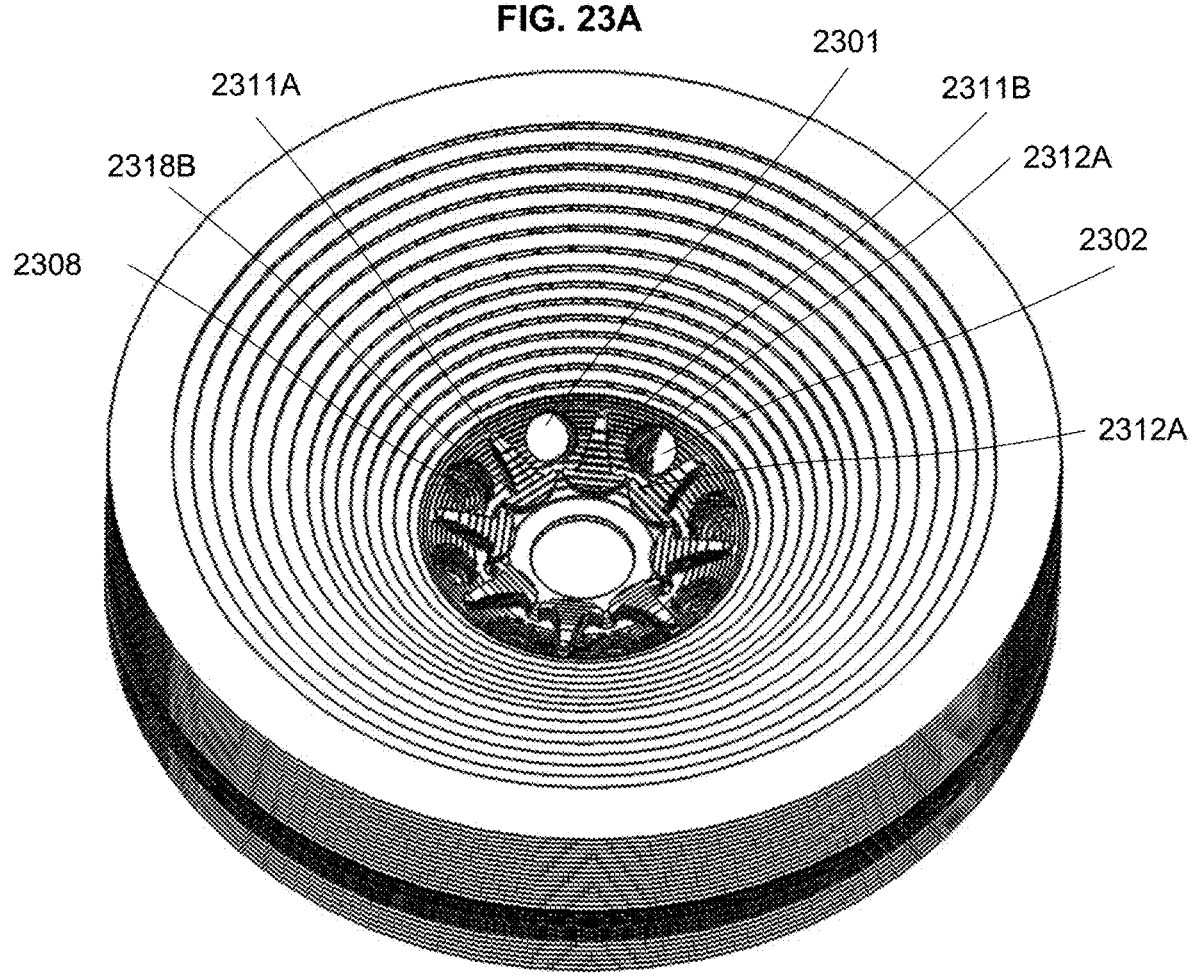
Figure 23C:
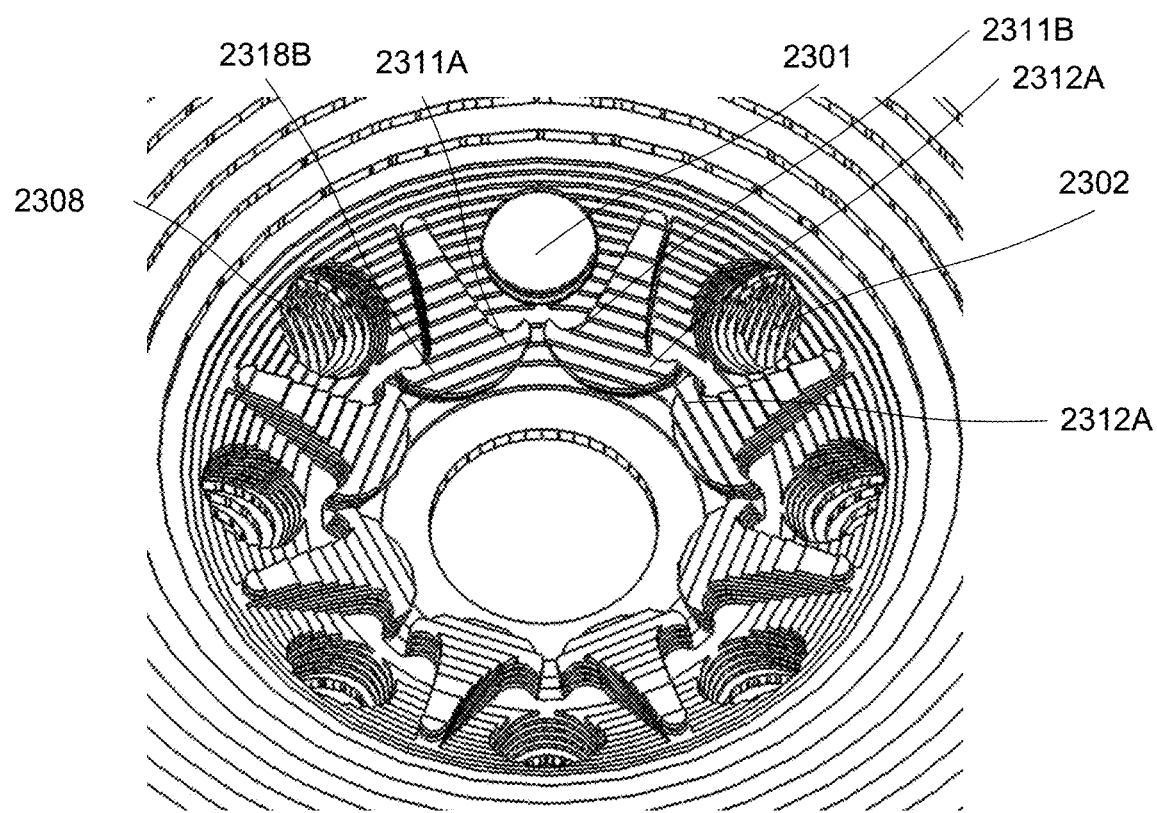
Figure 23D:
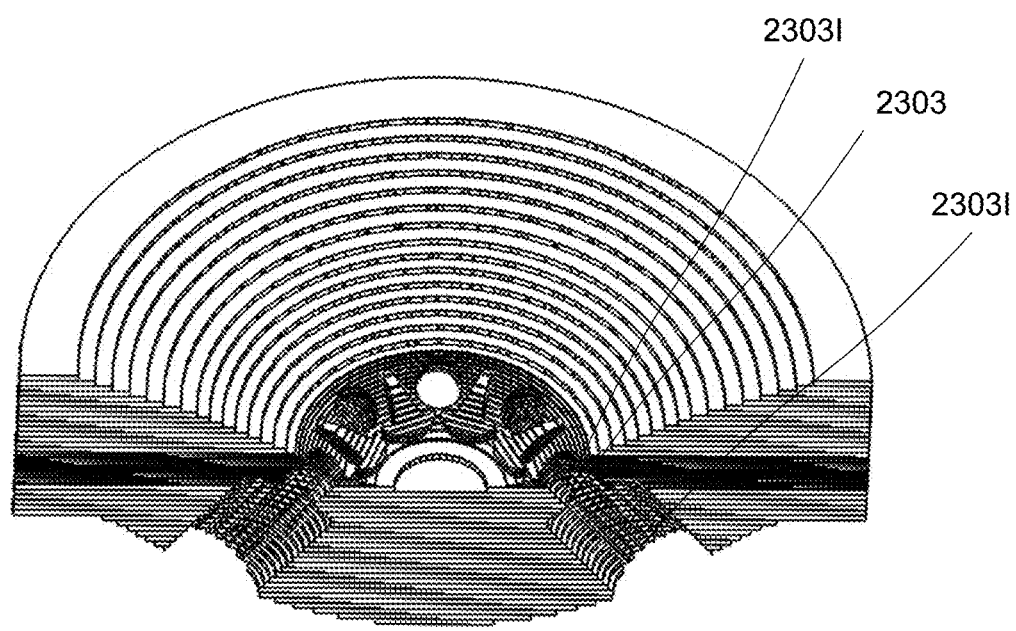

FIGS. 23A and 23D provide bottom and top isometric views which allow the protrusion of the nozzle tip to be seen (FIG. 23A) and the recession of the valve seat and sac guides to be seen with several identified with reference numerals 2311A, 2311B, 2312A, 2312B and 2318B (FIG. 23B) as providing modified fluid flow guides to the inlets of orifices 2301, 2302 and 2308. FIG. 23C provides a close up isometric top view of the structure is provided so that the example sac guides used in this embodiment can be better seen. FIG. 23D provides a cut, isometric view of the structure so that the interior of the orifices (including their narrow inlet regions and counterbore exit regions) can be seen where orifice 2303 is specifically referenced along with its inlet region 23031 and its exit region 2303E.

As with the other embodiments, various alternatives are possible. The sac guides may not provide symmetric flow into each orifice as do the pairs of guides that surround each orifice in the illustrated example of FIGS. 23A-23D. In other words, for example, sac guides 2311A and 2311B may have different configurations such that fluid is not directed in a symmetric pattern from both sides. For example, a single sac guide structure may be used for each nozzle alternatively multiple sac guides may be used for each nozzle such that fluid flow is directed into a nozzle with the same preferential rotational flow. For example configurations may be used such that fluid flow is directed into the orifice from the bottom or center of the sac guide in one direction, for example clockwise, while another configuration is used near the top of the sac guide to preferentially direct fluid into the orifice in the same clockwise direction. In some nozzles all sac guide may direct fluid in the same relative orientation for each orifice, e.g. counterclockwise or clockwise while in other nozzles different orifices may provide reversed orientation for some orifices (e.g. by neighboring guides). In some embodiments, a curved tip of the guide may be aligned to direct the fluid along a central line of the orifice or along a line that is offset from center to either the left or right. Multiple guides directing fluid into a single orifice may provide different axial angles of flow or different cross-sectional angles. A single guide may be configured to direct fluid into an orifice at more than one location. Some embodiments may use both sac guides and rifling. Some embodiments may provide overhanging features away from the perimeter regions of a nozzle (i.e. in the central regions between orifices) that tend to direct radially flowing fluid not only over the orifices but downward into the orifices. Such downward flow direction may be provided by sac guide features formed on the orifice plate or may be features added to a valve plug or pin (that do not interfere with the seating of the valve plug.

Figure 24A:
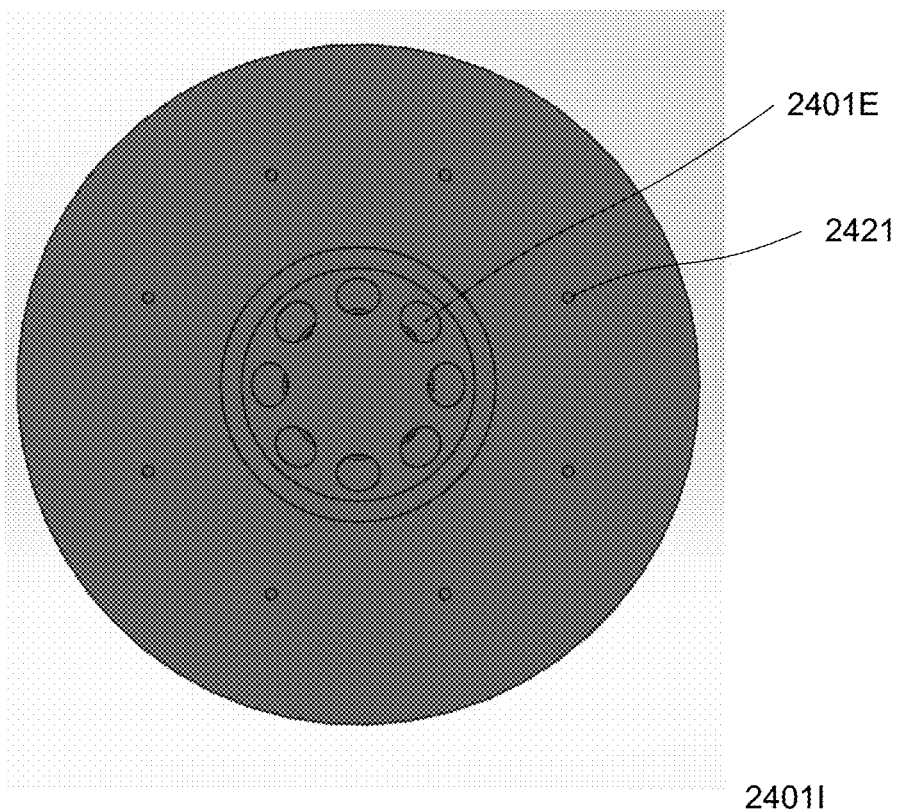
FIGS. 24A-24E illustrate an example nozzle according to a fifteenth embodiment of the invention wherein one or more venturi air entrainment paths are provided to each orifice of a multi-orifice nozzle which has a configuration similar to that of the nozzle of FIGS. 19A-19G wherein FIG. 24A provides a bottom view of the nozzle wherein air inlet holes from the outlet side of the nozzle can be seen, FIG. 24B provides a top view of the nozzle wherein one air inlet is provided for each orifice, FIG. 24C provides a side cut view showing an air flow line extending from an air inlet to the counterbore region of an orifice near the orifice exit, FIG. 24D provides a close up isometric cut view of the counter bore region where three separate for air entry ports can be seen in the counterbore region of one of the orifices along with a passage one of the air entry ports, and FIG. 24E provides a cut side view of an orifice along with two of the airflow ports and an airflow path leading to at least one of the ports along with fuel and airflow arrows indicating the entrainment and mixing of air with the fuel during fuel injection as a result of a venturi effect that pulls air long with the fuel.
Figure 24B:
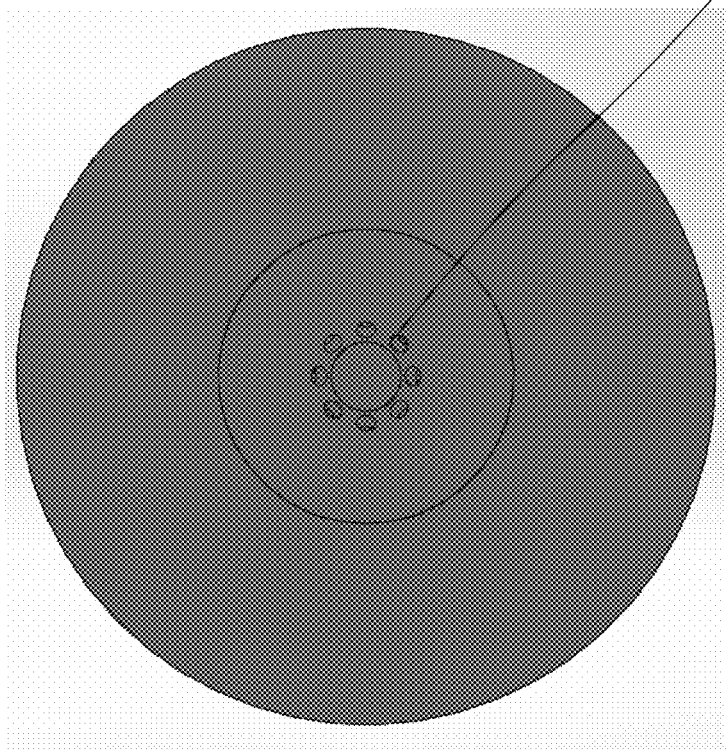
Figure 24C:
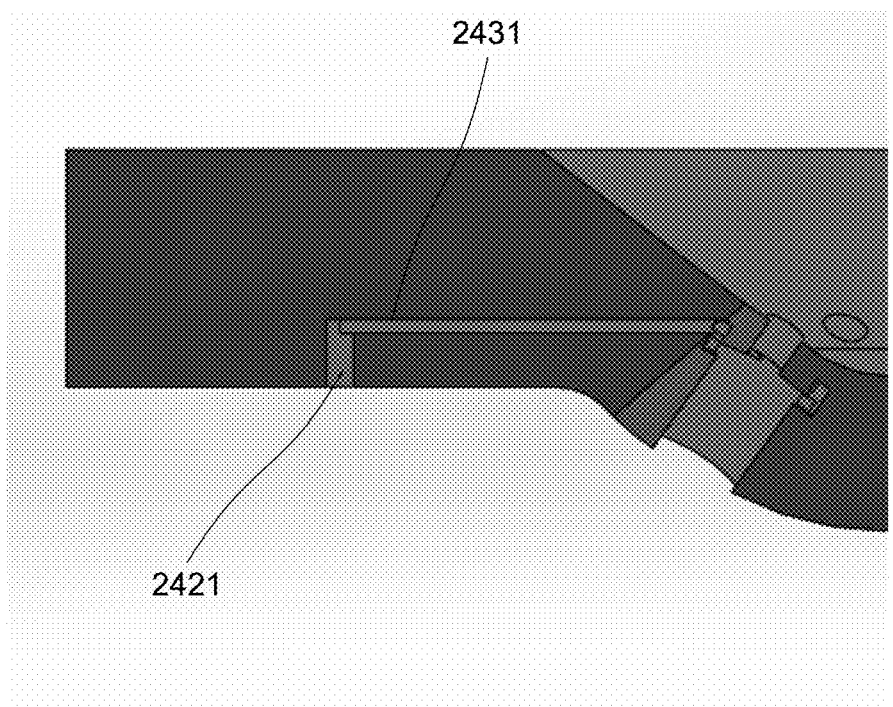
Figure 24D:
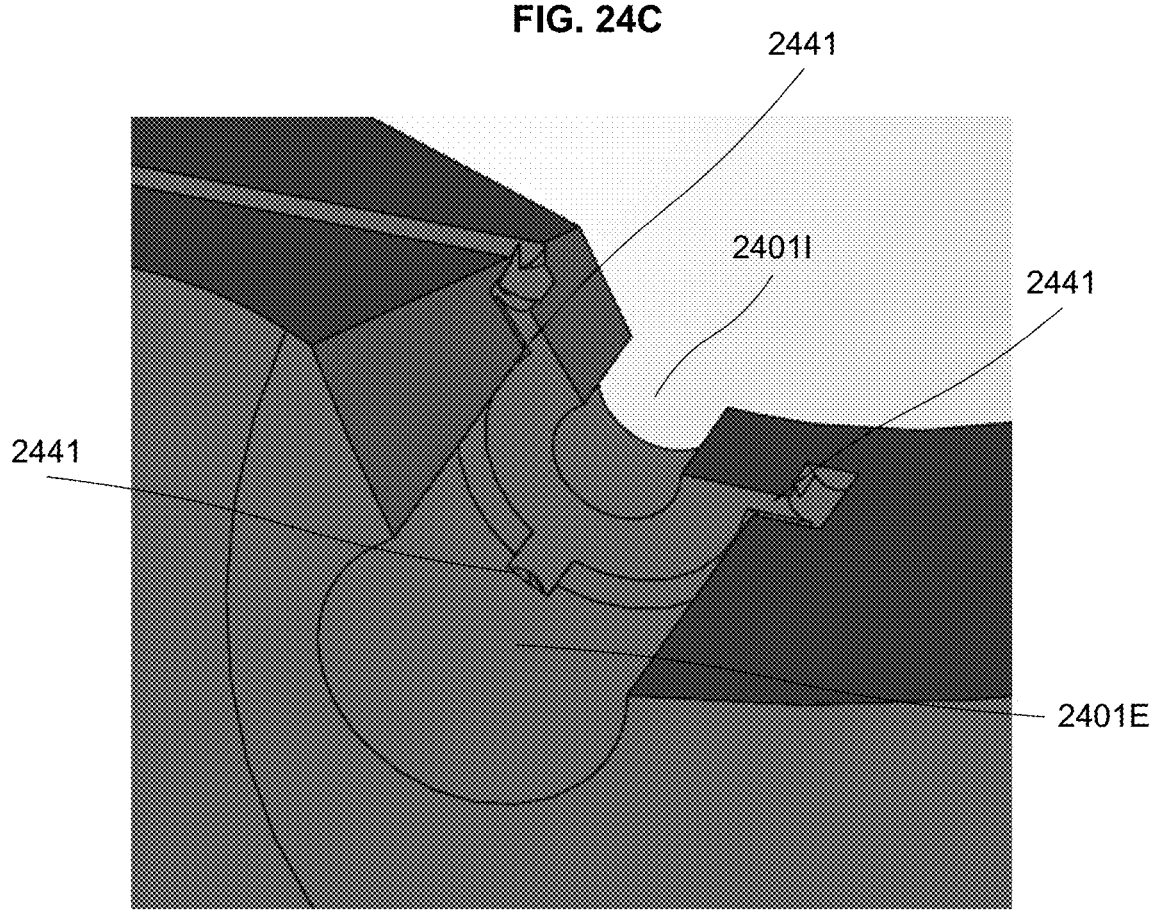
Figure 24E:
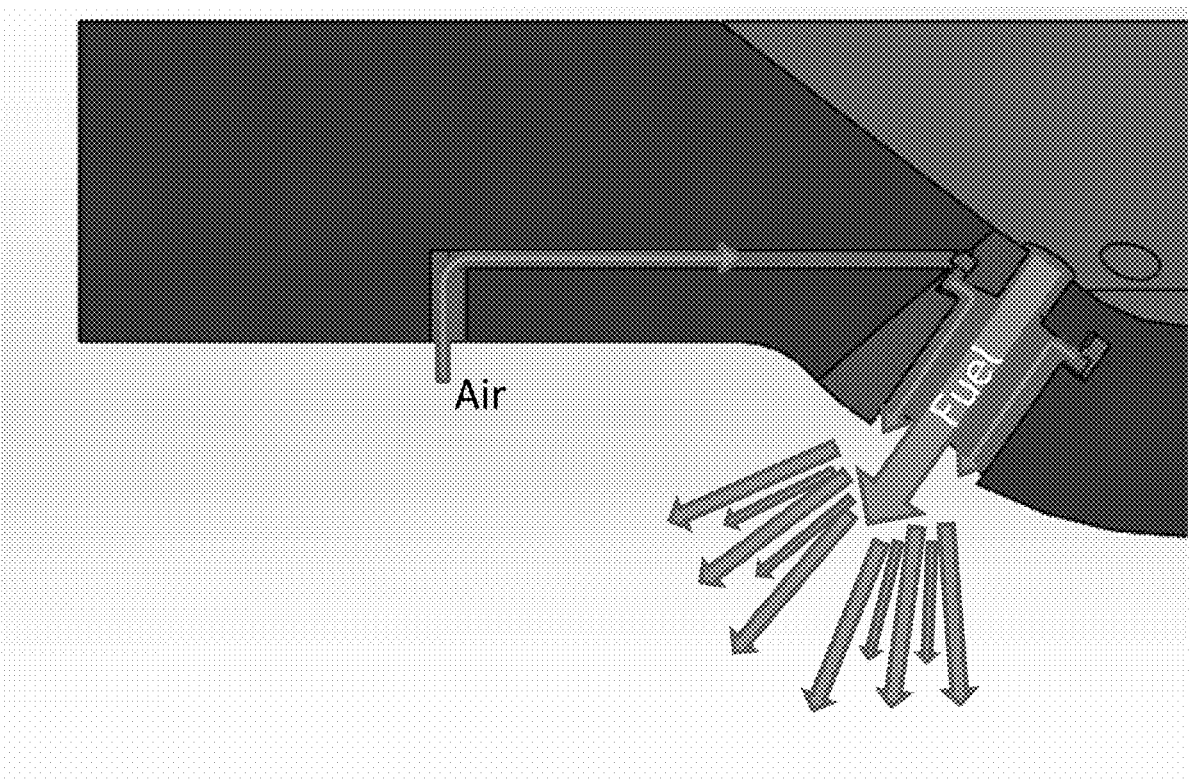

FIGS. 24A-24E illustrate an example nozzle according to a fifteenth embodiment of the invention wherein one or more venturi air entrainment paths are provided to each orifice of a multi-orifice nozzle configuration that is similar to the example of FIGS. 19A-19G. FIGS. 24A and 24B, respectively, provide bottom and top views of the structure wherein orifices, e.g., have inlets, e.g. 24011, and outlets, e.g. 2401E, and air inlet holes 2421 on the cylinder (or outlet side of the nozzle) wherein an air inlet is provided for each orifice. FIGS. 24C and 24D provide a side cut view and a close up, cut isometric view showing an air flow line 2431 extending from an air inlet to an one or more air exits 2441 (three are shown in FIG. 24D) in the counterbore region of an orifice near the orifice exit in a region not receiving fuel flow but subjected to a venturi siphoning as fluid is ejected from the inlet into the counter bore region of the orifice. FIG. 24E provides a cut side view of an orifice and corresponding fuel and airflow paths with arrows indicating the entrainment and mixing of air with the fuel during fuel injection as a result of a venturi effect that pulls air long with the fuel.

As with the other embodiments various alternatives are possible. For example, multiple air inlets may feed one or more air lets for each orifice. Air inlets maybe located further or closer, either axially or radially) to its orifice outlet. Outlets may be positioned or oriented differently from one another to aid in promotion of swirling, fuel/air mixing, creation or suppression of cavitation. Feature of this embodiment may be added to embodiments with layered or stair stepped features, embodiments with sac guides, embodiments with rifling, and/or embodiment that use a mixed manufacturing method for creation (i.e. part additive layer fabrication and part traditional machining or shaping).

Numerous other integration methods, configurations, method of use, and method of fabrication are possible and will be understood by those of skill in the art upon review of the teachings herein. For example, in some aspects and embodiments, the injectors may dispense liquids or fluids other than fuels such as for example lubricating fluids, cooling fluids, biologically active materials, chemically reactive materials, coating materials, or the like. For examples, other applications for the nozzles set forth in herein may include lubrication of mechanical systems (e.g. high precision low volume lubrication applications), sanitization, sterilization, cleaning, chemical neutralization, medical processes, procedures, or devices where finely dispersed drugs or very low quantities of material may be needed or beneficial (e.g. inhalers, minimally invasive procedures, therapeutic treatments, preventive treatments, and the like). In particular, it is intended that a feature, a variation, a method of use, or a method of fabrication of one embodiment may be used in combination with the features or a subset of the features of the other embodiments so long as that feature, variation, method of use, or method of fabrication being incorporated does not completely remove or complete inhibit each beneficial functionality or feature of the embodiment incorporating the feature, variation, method of use, or method of fabrication.

FURTHER COMMENTS AND CONCLUSIONS

Various other embodiments of the present invention exist. Some of these embodiments may be based on a combination of the teachings herein with various teachings incorporated herein by reference. For example, some embodiments may not use any blanket deposition process. Some embodiments may use selective deposition processes or blanket deposition processes on some layers that are not electrodeposition processes. Some embodiments may use nickel as a structural material while other embodiments may use different materials. For example, structural materials include nickel (Ni), copper (Cu), beryllium copper (BeCu), nickel phosphorous (Ni—P), nickel manganese (N—Mn), tungsten (W), aluminum copper (Al—Cu), steel, P7 alloy, palladium, molybdenum, manganese, brass, chrome, chromium copper (Cr—Cu), and combinations of these. Some embodiments may use copper as the structural material with or without a sacrificial material.

Structural or sacrificial dielectric materials may be incorporated into embodiments of the present invention in a variety of different ways. Such materials may form a third material or higher deposited material on selected layers or may form one of the first two materials deposited on some layers. Additional teachings concerning the formation of structures on dielectric substrates and/or the formation of structures that incorporate dielectric materials into the formation process and possibility into the final structures as formed are set forth in a number of patent applications filed Dec. 31, 2003. The first of these filings is U.S. Patent Application No. 60/534,184 which is entitled "Electrochemical Fabrication Methods Incorporating Dielectric Materials and/or Using Dielectric Substrates". The second of these filings is U.S. Patent Application No. 60/533,932, which is entitled "Electrochemical Fabrication Methods Using Dielectric Substrates". The third of these filings is U.S. Patent Application No. 60/534,157, which is entitled "Electrochemical Fabrication Methods Incorporating Dielectric Materials". The fourth of these filings is U.S. Patent Application No. 60/533,891, which is entitled "Methods for Electrochemically Fabricating Structures Incorporating Dielectric Sheets and/or Seed layers That Are Partially Removed Via Planarization". A fifth such filing is U.S. Patent Application No. 60/533,895, which is entitled "Electrochemical Fabrication Method for Producing Multi-layer Three-Dimensional Structures on a Porous Dielectric". Additional patent filings that provide teachings concerning incorporation of dielectrics into the MICA Freeform process include U.S. patent application Ser. No. 11/139,262, filed May 26, 2005, now U.S. Pat. No. 7,501,328, by Lockard, et al., and which is entitled "Methods for Electrochemically Fabricating Structures Using Adhered Masks, Incorporating Dielectric Sheets, and/or Seed Layers that are Partially Removed Via Planarization"; and U.S. patent application Ser. No. 11/029,216, filed Jan. 3, 2005 by Cohen, et al., now abandoned, and which is entitled "Electrochemical Fabrication Methods Incorporating Dielectric Materials and/or Using Dielectric Substrates". These patent filings are each hereby incorporated herein by reference as if set forth in full herein.

Some embodiments may employ diffusion bonding or the like to enhance adhesion between successive layers of material. Various teachings concerning the use of diffusion bonding in electrochemical fabrication processes are set forth in U.S. patent application Ser. No. 10/841,384 which was filed May 7, 2004 by Cohen et al., now abandoned, which is entitled "Method of Electrochemically Fabricating Multilayer Structures Having Improved Interlayer Adhesion" and which is hereby incorporated herein by reference as if set forth in full. This application is hereby incorporated herein by reference as if set forth in full.

Though the embodiments explicitly set forth herein have considered multi-material layers to be formed one after another. In some embodiments, it is possible to form structures on a layer-by-layer basis but to deviate from a strict planar layer on planar layer build up process in favor of a process that interlaces material between the layers. Such alternative build processes are disclosed in U.S. application Ser. No. 10/434,519, filed on May 7, 2003, now U.S. Pat. No. 7,252,861, entitled "Methods of and Apparatus for Electrochemically Fabricating Structures Via Interlaced Layers or Via Selective Etching and Filling of Voids". The techniques disclosed in this referenced application may be combined with the techniques and alternatives set forth explicitly herein to derive additional alternative embodiments. In particular, the structural features are still defined on a planar-layer-by-planar-layer basis but material associated with some layers are formed along with material for other layers such that interlacing of deposited material occurs. Such interlacing may lead to reduced structural distortion during formation or improved interlayer adhesion. This patent application is herein incorporated by reference as if set forth in full.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| U.S. Pat. No., Filing Date U.S. application Pub No., Pub Date U.S. Pat. No., Pub Date | Inventor, Title |
|---|---|
| 09/493,496 - Jan. 28, 2000 -- 6,790,377 - Sep. 14, 2004 | Cohen, "Method For Electrochemical Fabrication" |
| 10/677,556 - Oct. 1, 2003 2004-0134772 - Jul. 15, 2004 -- | Cohen, "Monolithic Structures Including Alignment and/or Retention Fixtures for Accepting Components" |
| 10/830,262 - Apr. 21, 2004 2004-0251142A - Dec. 16, 2004 7,198,704 - Apr. 3, 2007 | Cohen, "Methods of Reducing Interlayer Discontinuities in Electrochemically Fabricated Three-Dimensional Structures" |
| 10/271,574 - Oct. 15, 2002 2003-0127336A - July 10, 2003 7,288,178 - Oct. 30, 2007 | Cohen, "Methods of and Apparatus for Making High Aspect Ratio Microelectromechanical Structures" |
| 10/697,597 - Dec. 20, 2002 2004-0146650A - Jul. 29, 2004 -- | Lockard, "EFAB Methods and Apparatus Including Spray Metal or Powder Coating Processes" |
| 10/677,498 - Oct. 1, 2003 2004-0134788 - Jul. 15, 2004 7,235,166 - Jun. 26, 2007 | Cohen, "Multi-cell Masks and Methods and Apparatus for Using Such Masks To Form Three-Dimensional Structures" |
| 10/724,513 - Nov. 26, 2003 2004-0147124 - Jul. 29, 2004 7,368,044 - May 6, 2008 | Cohen, "Non-Conformable Masks and Methods and Apparatus for Forming Three-Dimensional Structures" |
| 10/607,931 - Jun. 27, 2003 2004-0140862 - Jul. 22, 2004 7,239,219 - Jul. 3,2007 | Brown, "Miniature RF and Microwave Components and Methods for Fabricating Such Components" |
| 10/841,100 - May 7,2004 2005-0032362 - Feb. 10, 2005 7,109,118 Sep. 19, 2006 | Cohen, "Electrochemical Fabrication Methods Including Use of Surface Treatments to Reduce Overplating and/or Planarization During Formation of Multi-layer Three-Dimensional Structures" |
| 10/387,958 - Mar. 13, 2003 2003-022168A - Dec. 4, 2003 -- | Cohen, "Electrochemical Fabrication Method and Application for Producing Three-Dimensional Structures Having Improved Surface Finish" |
| 10/434,494 - May 7, 2003 2004-0000489A - Jan. 1, 2004 -- | Zhang, "Methods and Apparatus for Monitoring Deposition Quality During Conformable Contact Mask Plating Operations" |
| 10/434,289 - May 7, 2003 2004-0065555A - Apr. 8, 2004 -- | Zhang, "Conformable Contact Masking Methods and Apparatus Utilizing In Situ Cathodic Activation of a Substrate" |
| 10/434,294 - May 7, 2003 2004-0065550A - Apr. 8, 2004 -- | Zhang, "Electrochemical Fabrication Methods With Enhanced Post Deposition Processing" |
| 10/841,006 - May 7, 2004 2005-0067292 - May 31, 2005 -- | Thompson, "Electrochemically Fabricated Structures Having Dielectric or Active Bases and Methods of and Apparatus for Producing Such Structures" |
| 10/841,347 - May 7, 2004 2005-0072681 - Apr. 7, 2005 -- | Cohen, "Multi-step Release Method for Electrochemically Fabricated Structures" |

-continued

| U.S. Pat. No., Filing Date U.S. application Pub No., Pub Date U.S. Pat. No., Pub Date | Inventor, Title |
|---|---|
| 60/533,947 - Dec. 31, 2003 -- -- | Kumar, "Probe Arrays and Method for Making" |
| 60/534,183 - Dec. 31, 2003 -- -- | Cohen, "Method and Apparatus for Maintaining Parallelism of Layers and/or Achieving Desired Thicknesses of Layers During the Electrochemical Fabrication of Structures" |
| 11/733,195 - Apr. 9, 2007 2008-0050524 - Feb. 28, 2008 -- | Kumar, "Methods of Forming Three-Dimensional Structures Having Reduced Stress and/or Curvature" |
| 11/506,586 - Aug. 8, 2006 2007-0039828 - Feb. 22, 2007 7,611,616 - Nov. 3, 2009 | Cohen, "Mesoscale and Microscale Device Fabrication Methods Using Split Structures and Alignment Elements" |
| 10/949,744 - Sep. 24, 2004 2005-0126916 - Jun. 16, 2005 7,498,714 - Mar. 3, 2009 | Lockard, "Three-Dimensional Structures Having Feature Sizes Smaller Than a Minimum Feature Size and Methods for Fabricating" |
| 10/434,295 - May 7, 2003 2004-0004001A - Jan. 8, 2004 -- | Cohen, "Method of and Apparatus for Forming Three-Dimensional Structures Integral With Semiconductor Based Circuitry" |
| 10/434,315 - May 7, 2003 2003-0234179 A - Dec. 25, 2003 7,229,542 - Jun. 12, 2007 | Bang, "Methods of and Apparatus for Molding Structures Using Sacrificial Metal Patterns" |

Though various portions of this specification have been provided with headers, it is not intended that the headers be used to limit the application of teachings found in one portion of the specification from applying to other portions of the specification. For example, alternatives acknowledged in association with one embodiment, are intended to apply to all embodiments to the extent that the features of the different embodiments make such application functional and do not otherwise contradict or remove all benefits of the adopted embodiment. Various other embodiments of the present invention exist. Some of these embodiments may be based on a combination of the teachings set forth herein with various teachings incorporated herein by reference.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

We claim:

1. An improved fuel injector, including: (a) a body that includes at least one fluid flow channel and at least one nozzle having an orifice, wherein the improvement comprises a nozzle including one or more features selected from the group consisting of:
    (1) a multi-layer structure comprising a plurality of adhered electrodeposited layers with each layer representing a cross-section of the nozzle;
    (2) a plurality of stair-stepped features defining a plurality of discrete layer levels that are stacked along a build axis (e.g. the Z-axis);
    (3) a plurality of inlets connected to a corresponding plurality of outlets where the inlets have on average a wider cross-sectional spacing than do the outlets;
    (4) a plurality of inlets connected to a corresponding plurality of outlets where the inlets have on average a spacing from a central axis of the nozzle that is larger than an average spacing of the outlets from the central axis;
    (5) a plurality of inlets connected to a corresponding plurality of outlets where the inlets have on average a narrower cross-sectional spacing than do the outlets;
    (6) a plurality of inlets connected to a corresponding plurality of outlets where the inlets have on average a spacing from a central axis of the nozzle that is smaller than an average spacing of the outlets from the central axis;
    (7) a plurality of channels connecting a plurality of inlets to a plurality of outlets where each of the channels comprises a plurality of stair-step transitions along a channel path between a respective inlet and the outlet;
    (8) a monolithic body structure formed without assembly of discrete components;
    (9) a plurality of inlets each with a maximum cross-sectional dimension selected from the group consisting of: (i) <=40 ums, (ii) <=30 ums, (iii) <=20 ums, (iv) <=10 ums, (v) <=5 ums;
    (10) a plurality of outlets each with a maximum cross-sectional dimension selected from the group consisting of: (i) <=40 ums, (ii) <=30 ums, (iii) <=20 ums, (iv) <=10 ums, (v) <=5 ums;
    (11) stair steps defined by the tops and bottoms of layers that are stacked along an axis extending from an inlet to an outlet;
    (12) a plurality of air injection or air flow passages that each extend from a surface of the nozzle to at least one fuel flow channel within the nozzle;
    (13) a plurality of air injection or air flow passages that each extend from a surface of the nozzle to at least one fuel flow channel within the nozzle, wherein each of the air injection or air flow passages has a cross-sectional dimension, which is nominally perpendicular to an air flow direction, that is smaller than that of the at least one fuel flow channel, and wherein each air injection or air flow passage and the at least one fuel flow channel have an orientation relative to each other that provides for a common velocity component of fluid flow;
    (14) a plurality of air injection or air flow passages with air inlets that are larger than air outlets;

(15) a stair stepped fuel inlet with a narrowing cross-section;
(16) a stair stepped fuel flow path with a restriction along the fuel flow path and an air inlet located downstream of the restriction and recessed from the restriction;
(17) a fuel flow path that extends along a plurality of paths with each path forming a spiral path from the inlet to the outlet;
(18) a fuel flow path that is bounded on the sides for a majority of the length of the path by a first metal and by a second more abrasion resistive metal at the outlet of the path;
(19) a fuel flow path that is bounded on the sides for a majority of the length of the path by a first metal and by a second higher melting temperature material in an outlet region of the path;
(20) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers, wherein the relatively large fuel flow channel has a cross-sectional area that is selected from the group consisting of: (i) at least 4 times larger than the relatively small cross-sectional outlet paths, (ii) at least 10 times larger than the relatively small cross-sectional outlet paths; (iii) at least 20 times larger than the relatively small cross-sectional outlet paths, and (iv) at least 50 times larger than the relatively small cross-sectional outlet paths;
(21) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relatively large fuel flow channel is larger than an MFS while the size of the relatively small cross-sectional outlets is smaller than an MFS for a given layer thickness and build process that was used in forming the nozzles; and
(22) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relatively large flow channel is at least 10 times larger than the relatively small cross-sectional outlet paths which have at least one cross-sectional dimension selected from the group consisting of: (i) <=20 ums, (ii) <=10 ums, and (iii) <=5 ums;
(23) a multi-layer structure comprising a plurality of adhered electrodeposited layers with each layer representing a cross-section of the nozzle wherein at least one layer containing an outlet has a surface defined by at least one planarization operation; and
(24) a plurality of stair-stepped features defining a plurality of discrete layer levels that are stacked along a build axis (e.g. the Z-axis) wherein at least one layer containing an outlet has a surface that is defined by at least one planarization operation.

2. An improved internal combustion engine using a fuel injector of claim 1, comprising:
at least one combustion chamber; an energy transfer mechanism to convert the force of combustion into rotatory motion;
a source of oxygen; and
an ignition system for combusting the fuel in the combustion chamber; the improvement comprising a fuel injection system comprising the improved fuel injector of claim 1.

3. The improved internal combustion engine of claim 2 wherein the engine is selected from the group consisting of (1) a piston engine comprising one or more cylinders with fuel ignited by a spark plug, (2) a piston engine comprising one or more cylinders with fuel ignited by pressure, (3) a Wankel engine, (4) a jet engine, and (5) a turbojet engine.

4. The improved internal combustion engine of claim 2 wherein the fuel injector ejects fluid into a location selected from the group consisting of: (1) directly into a combustion chamber, and (2) indirectly behind an intake valve.

5. An improved fuel injector including: (a) a body that includes a fluid flow channel, a spring stop region, a spring seat region, a valve seat, and a dispensing nozzle; (b) a filter located in the fluid flow channel between an inlet of the channel and the nozzle; (c) a power input; (d) an actuation element functionally connected to the power input; (e) a movable plunger that includes a shaft body, an actuator responsive element, a spring stop, and a valve plug, wherein the plunger is biased by the spring to cause the fluid flow path to be blocked by the valve plug being in contact with the valve seat, and wherein upon excitation the actuation element can move the plunger to open the fluid flow path by separating the valve plug from the valve seat to allow fuel to flow from the inlet of the channel through the nozzle, wherein the improvement comprises a nozzle including one or more features selected from the group consisting of:
(1) a nozzle orifice including at least one rifling protrusion;
(2) a nozzle orifice including a plurality of rifling protrusions;
(3) a nozzle orifice including a plurality of stair stepped rifling protrusions
(4) at least two orifices with each including at least one a rifling protrusion, and wherein at least two different rifling orientations are used;
(5) a nozzle orifice having an inlet in proximity to at least two sac guide elements that direct fluid flow over a common orifice;
(6) a plurality of orifices wherein a single sac guide element directs fluid over at least two of the orifices;
(7) a plurality of orifices wherein a single sac guide is used in directing fluid over a given orifice;
(8) at least one orifices wherein at least one sac guide is used in directing fluid over a given orifice of the at least one orifice wherein the sac guide comprises a stair stepped structure; and
(9) a nozzle including at least one orifice having a counterbore region near an exit of the orifice wherein air is directed from an outlet side inlet channel to introduce air into a fluid flow coming from the orifice via a venturi effect.

6. An improved internal combustion engine using a fuel injector of claim 5, comprising:
at least one combustion chamber; an energy transfer mechanism to convert the force of combustion into rotatory motion; a source of oxygen; and
an ignition system for combusting the fuel in the combustion chamber; the improvement comprising a fuel injection system comprising the improved fuel injector of claim 5.

7. The improved internal combustion engine of claim 6 wherein the engine is selected from the group consisting of:

(1) a piston engine comprising one or more cylinders with fuel ignited by a spark plug, (2) a piston engine comprising one or more cylinders with fuel ignited by pressure, and (3) a Wankel engine.

8. The improved internal combustion engine of claim 6 wherein the fuel injector ejects fluid into a location selected from the group consisting of: (1) directly into a combustion chamber, and (2) indirectly behind an intake valve.

9. The improved internal combustion engine of claim 2, wherein the source of oxygen is selected from the group consisting of: (1) the atmosphere, and (2) a container or oxygen and wherein the ignition system comprises a source selected from the group consisting of: (1) a spark source, (2) a pressure source, (3) a flame source, and (4) a laser.

10. The improved internal combustion engine of claim 6 wherein the source of oxygen is selected from the group consisting of: (1) the atmosphere, and (2) a container or oxygen and wherein the ignition system comprises a source selected from the group consisting of: (1) a spark source, (2) a pressure source, (3) a flame source and (4) a laser.

11. An improved fuel injector, including: (a) a body that includes at least one fluid flow channel and at least one nozzle having an orifice, wherein the improvement comprises a nozzle including one or more features selected from the group consisting of:
  (1) a nozzle orifice including at least one rifling protrusion;
  (2) a nozzle orifice including a plurality of rifling protrusions;
  (3) a nozzle orifice including a plurality of stair stepped rifling protrusions;
  (4) at least two orifices with each including at least one rifling protrusion, and wherein at least two different rifling orientations are used;
  (5) a nozzle orifice having an inlet in proximity to at least two sac guide elements that direct fluid flow over a common orifice;
  (6) a plurality of orifices wherein a single sac guide element directs fluid over at least two of the orifices;
  (7) a plurality of orifices wherein a single sac guide is used in directing fluid over a given orifice;
  (8) at least one orifice wherein at least one sac guide is used in directing fluid over a given orifice of the at least one orifice wherein the sac guide comprises a stair stepped structure; and
  (9) at least one orifice having a counterbore region near an exit of the orifice wherein air is directed from an outlet side inlet channel to introduce air into a fluid flow coming from the orifice via a venturi effect.

12. An improved internal combustion engine using a fuel injector of claim 11, comprising:
  at least one combustion chamber; an energy transfer mechanism to convert the force of combustion into rotatory motion;
  a source oxygen; and
  an ignition system for combusting the fuel in the combustion chamber; the improvement comprising a fuel injection system comprising the improved fuel injector of claim 11.

13. The improved internal combustion engine of claim 12, wherein the engine is selected from the group consisting of: (1) a piston engine comprising one or more cylinders with fuel ignited by a spark plug, (2) a piston engine comprising one or more cylinders with fuel ignited by pressure, (3) a Wankel engine, (4) a jet engine, (5) a turbojet engine, (6) a ram jet engine, and (7) a rocket engine.

14. The improved internal combustion engine of claim 12 wherein the fuel injector ejects fluid into a location selected from the group consisting of: (1) directly into a combustion chamber, and (2) indirectly behind an intake valve.

15. The improved internal combustion engine of claim 12 wherein the source of oxygen is selected from the group consisting of (1) the atmosphere, and (2) a container or oxygen and the ignition system comprises a source selected from the group consisting of: (1) a spark source, (2) a pressure source, (3) a flame source, and (4) a laser.

16. An improved fuel injector including: (a) a body that includes a fluid flow channel, a spring stop region, a spring seat region, a valve seat, and a dispensing nozzle; (b) a filter located in the fluid flow channel between an inlet of the channel and the nozzle; (c) a power input; (d) an actuation element functionally connected to the power input; and (e) a movable plunger that includes a shaft body, an actuator responsive element, a spring stop, and a valve plug, wherein the plunger is biased by the spring to cause the fluid flow path to be blocked by the valve plug being in contact with the valve seat, and wherein upon excitation the actuation element can move the plunger to open the fluid flow path by separating the valve plug from the valve seat to allow fuel to flow from the inlet of the channel through the nozzle, wherein the improvement comprises a nozzle including one or more features selected from the group consisting of:
  (1) a multi-layer structure comprising a plurality of adhered electrodeposited layers with each layer representing a cross-section of the nozzle;
  (2) a plurality of stair-stepped features defining a plurality of discrete layer levels that are stacked along a build axis (e.g. the Z-axis);
  (3) a plurality of inlets connected to a corresponding plurality of outlets where the inlets have on average a wider cross-sectional spacing than do the outlets;
  (4) a plurality of inlets connected to a corresponding plurality of outlets where the inlets have on average a spacing from a central axis of the nozzle that is larger than an average spacing of the outlets from the central axis;
  (5) a plurality of inlets connected to a corresponding plurality of outlets where the inlets have on average a narrower cross-sectional spacing than do the outlets;
  (6) a plurality of inlets connected to a corresponding plurality of outlets where the inlets have on average a spacing from a central axis of the nozzle that is smaller than an average spacing of the outlets from the central axis;
  (7) a plurality of channels connecting a plurality of inlets to a plurality of outlets where each of the channels comprises a plurality of stair-step transitions along a channel path between a respective inlet and outlet;
  (8) a monolithic body structure formed without assembly of discrete components;
  (9) a plurality of inlets each with a maximum cross-sectional dimension selected from the group consisting of: (i) <=40 ums, (ii) <=30 ums, (iii) <=20 ums, (iv) <=10 ums, (v) <=5 ums;
  (10) a plurality of outlets each with a maximum cross-sectional dimension selected from the group consisting of: (i) <=40 ums, (ii) <=40 ums, (iii) <=20 ums, (iv) <=10 ums, (v) <=5 ums;
  (11) stair steps defined by tops and bottoms of layers that are stacked along an axis extending from an inlet to an outlet;

(12) a plurality of air injection or air flow passages that each extend from a surface of the nozzle to at least one fuel flow channel within the nozzle;

(13) a plurality of air injection or air flow passages that each extend from a surface of the nozzle to at least one fuel flow channel within the nozzle, wherein each of the air injection or air flow passages has a cross-sectional dimension, which is nominally perpendicular to an air flow direction, that is smaller than that of the at least one fuel flow channel, and wherein each air injection or air flow passage and the at least one fuel flow channel have an orientation relative to each other that provides for a common velocity component of fluid flow;

(14) a plurality of air injection or air flow passages with air inlets that are larger than air outlets;

(15) a stair stepped fuel inlet with a narrowing cross-section;

(16) a stair stepped fuel flow path with a restriction along the fuel flow path and an air inlet located downstream of the restriction and recessed from the restriction;

(17) a fuel flow path that extends along a plurality paths with each path forming a spiral path from the inlet to the outlet;

(18) a fuel flow path that is bounded on the sides for a majority of the length of the path by a first metal and by a second more abrasion resistive metal at the outlet of the path;

(19) a fuel flow path that is bounded on the sides for a majority of the length of the path by a first metal and by a second higher melting temperature material in an outlet region of the path;

(20) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers, wherein the relatively large fuel flow channel has a cross-sectional area that is selected from the group consisting of: (i) at least 4 times larger than the relatively small cross-sectional outlet paths; (ii) at least 10 times larger than the relatively small cross-sectional outlet paths; (iii) at least 20 times larger than the relatively small cross-sectional outlet paths, and (iv) at least 50 times larger than the relatively small cross-sectional outlet paths;

(21) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relatively large fuel flow channel is larger than an MFS while the size of the relatively small cross-sectional outlets is smaller than an MFS for a given layer thickness and build process that was used in forming the nozzles;

(22) a fuel flow path that is defined by a relatively large fuel flow channel in cross-sectional dimensional which terminates in a plurality of relatively small cross-sectional outlet paths where the size of each of the outlet paths is defined by the lack of overlap of structural material on two consecutive layers and wherein the relatively large flow channel is at least 10 times larger than the relatively small cross-sectional outlet paths which have at least one cross-sectional dimension selected from the group consisting of: (i) <=20 ums, (ii) <=10 ums, and (iii) <=5 ums;

(23) a multi-layer structure comprising a plurality of adhered electrodeposited layers with each layer representing a cross-section of the nozzle wherein at least one layer containing an outlet has a surface defined by at least one planarization operation; and

(24) a plurality of stair-stepped features defining a plurality of discrete layer levels that are stacked along a build axis (e.g. the Z-axis) wherein at least one layer containing an outlet has a surface that is defined by at least one planarization operation.

17. An improved internal combustion engine using a fuel injector of claim 16, comprising:
at least one combustion chamber; an energy transfer mechanism to convert the force of combustion into rotatory motion; a source of oxygen; and
an ignition system for combusting the fuel in the combustion chamber; the improvement comprising a fuel injection system comprising the improved fuel injector of claim 11.

18. The improved internal combustion engine of claim 17 wherein the engine is selected from the group consisting of: (1) a piston engine comprising one or more cylinders with fuel ignited by a spark plug, (2) a piston engine comprising one or more cylinders with fuel ignited by pressure, (3) a Wankel engine, (4) a jet engine, and (5) a turbojet engine.

19. The improved internal combustion engine of claim 17 wherein the fuel injector ejects fluid into a location selected from the group consisting of: (1) directly into a combustion chamber, and (2) indirectly behind an intake valve.

20. The improved internal combustion engine of claim 17 wherein the source of oxygen is selected from the group consisting of: (1) the atmosphere, and (2) a container or oxygen and the ignition system comprises a source selected from the group consisting of: (1) a spark source, (2) a pressure source, (3) a flame source, and (4) a laser.

* * * * *